(12) United States Patent
Carrigan et al.

(10) Patent No.: US 11,294,539 B2
(45) Date of Patent: Apr. 5, 2022

(54) MUSIC NOW PLAYING USER INTERFACE

(71) Applicant: Apple Inc., Cupertino, CA (US)

(72) Inventors: Taylor G. Carrigan, San Francisco, CA (US); Joe Howard, San Jose, CA (US); Joshua McGlinn, Moorsville, NC (US); Jonathan Lochhead, Scotts Valley, CA (US); Benjamin W. Keighran, Palo Alto, CA (US); William M. Bachman, San Jose, CA (US); Elbert D. Chen, Cupertino, CA (US); Jeffrey L. Robbin, Los Altos, CA (US); Jennifer L. C. Folse, San Francisco, CA (US); Lynne Kress, Seattle, WA (US); Kory M. Westerhold, Brooklyn, NY (US); Monika E. Gromek, Oakland, CA (US); Policarpo Bonilla Wood, Jr., San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/013,281

(22) Filed: Sep. 4, 2020

(65) Prior Publication Data
US 2020/0401283 A1 Dec. 24, 2020

Related U.S. Application Data

(63) Continuation of application No. 16/430,364, filed on Jun. 3, 2019, now Pat. No. 10,768,792, which is a (Continued)

(51) Int. Cl.
*G06F 3/048* (2013.01)
*G06F 3/0482* (2013.01)
(Continued)

(52) U.S. Cl.
CPC ......... *G06F 3/0482* (2013.01); *G06F 3/0485* (2013.01); *G06F 3/0488* (2013.01);
(Continued)

(58) Field of Classification Search
CPC ............... G06F 3/0482; G06F 3/04817; G06F 3/04845; G06F 3/0488; G06F 3/0486;
(Continued)

(56) References Cited

U.S. PATENT DOCUMENTS 5,483,261 A 1/1996 Yasutake
5,488,204 A 1/1996 Mead et al.
(Continued)

FOREIGN PATENT DOCUMENTS

CN 102037437 A 4/2011
CN 102419690 A 4/2012
(Continued)

OTHER PUBLICATIONS

International Search Report received for PCT Patent Application No. PCT/US2015/037260, dated Oct. 14, 2015, 4 pages.
(Continued)

*Primary Examiner* — Duc Q Dinh
(74) *Attorney, Agent, or Firm* — Kubota & Basol LLP

(57) ABSTRACT

The invention is directed to an electronic device. The electronic device generates for presentation on a display a user interface including a plurality of content items, a first heading, and a second heading. While the user interface is presented on the display, the electronic device receives input scrolling the plurality of content items. In response to the input, the electronic device scrolls the plurality of content items including: scrolling the first heading with a first content item of the plurality of content items that is currently
(Continued)

playing; and scrolling the second heading with a second content item of the plurality of content items that is next in a queue of content items.

18 Claims, 56 Drawing Sheets

Related U.S. Application Data continuation of application No. 15/808,774, filed on Nov. 9, 2017, now Pat. No. 10,310,711, which is a continuation of application No. 14/748,067, filed on Jun. 23, 2015, now Pat. No. 9,841,876.

(60) Provisional application No. 62/016,600, filed on Jun. 24, 2014.

(51) Int. Cl.
*G06F 3/04842* (2022.01)
*G06F 3/0485* (2022.01)
*G06F 3/0488* (2022.01)
*G11B 27/34* (2006.01)
*G06F 3/04883* (2022.01)
*G06F 3/04886* (2022.01)
*G06F 3/04812* (2022.01)
*G11B 27/031* (2006.01)
*G11B 27/10* (2006.01)

(52) U.S. Cl.
CPC ...... *G06F 3/04812* (2013.01); *G06F 3/04842* (2013.01); *G06F 3/04883* (2013.01); *G06F 3/04886* (2013.01); *G11B 27/34* (2013.01); *G11B 27/031* (2013.01); *G11B 27/102* (2013.01)

(58) Field of Classification Search
CPC ....... G06F 3/04842; G06F 2203/04806; G06F 3/04855; G06F 40/106; G06F 3/0484; G06F 2203/04803; G06F 3/167; G06F 3/0485; G06F 16/438; G06F 3/04815; G06F 16/40; G06F 2201/81
USPC ........ 345/156, 173, 174, 175; 715/819, 820, 715/828, 829, 830, 845
See application file for complete search history.

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,248,946 B1 | 6/2001 | Dwek | |
| 6,310,610 B1 | 10/2001 | Beaton et al. | |
| 6,323,846 B1 | 11/2001 | Westerman et al. | |
| 6,570,557 B1 | 5/2003 | Westerman et al. | |
| 6,580,442 B1 | 6/2003 | Singh et al. | |
| 6,677,932 B1 | 1/2004 | Westerman | |
| 6,690,387 B2 | 2/2004 | Zimmerman et al. | |
| 6,690,391 B1 | 2/2004 | Proehl et al. | |
| 7,015,894 B2 | 3/2006 | Morohoshi | |
| 7,184,064 B2 | 2/2007 | Zimmerman et al. | |
| 7,216,008 B2 | 5/2007 | Sakata | |
| 7,302,647 B2 | 11/2007 | Sekiguchi et al. | |
| 7,614,008 B2 | 11/2009 | Ording | |
| 7,631,274 B2 | 12/2009 | Kumagai et al. | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,844,914 B2 | 11/2010 | Andre et al. | |
| 7,900,228 B2 | 3/2011 | Stark et al. | |
| 7,957,762 B2 | 6/2011 | Herz et al. | |
| 8,006,002 B2 | 8/2011 | Kalayjian et al. | |
| 8,148,622 B2 | 4/2012 | Rothkopf et al. | |
| 8,239,784 B2 | 8/2012 | Hotelling et al. | |
| 8,279,180 B2 | 10/2012 | Hotelling et al. | |
| 8,381,135 B2 | 2/2013 | Hotelling et al. | |
| 8,384,672 B2 | 2/2013 | Sakai et al. | |
| 8,479,122 B2 | 7/2013 | Hotelling et al. | |
| 8,615,716 B2 | 12/2013 | Kagaya | |
| 9,348,458 B2 | 5/2016 | Hotelling et al. | |
| 9,542,058 B2 | 1/2017 | Emery et al. | |
| 9,544,369 B2 | 1/2017 | Kiilerich et al. | |
| 9,762,948 B2* | 9/2017 | Arriola | H04N 21/42204 |
| 9,841,876 B2 | 12/2017 | Carrigan et al. | |
| 9,933,937 B2 | 4/2018 | Lemay et al. | |
| 10,120,531 B2 | 11/2018 | Lochhead et al. | |
| 2002/0015024 A1 | 2/2002 | Westerman et al. | |
| 2003/0146915 A1 | 8/2003 | Brook et al. | |
| 2004/0095379 A1 | 5/2004 | Ghang et al. | |
| 2004/0158555 A1 | 8/2004 | Seedman et al. | |
| 2005/0190059 A1 | 9/2005 | Wehrenberg | |
| 2005/0235209 A1 | 10/2005 | Morita et al. | |
| 2006/0017692 A1 | 1/2006 | Wehrenberg et al. | |
| 2006/0020904 A1 | 1/2006 | Aaltonen et al. | |
| 2006/0033724 A1 | 2/2006 | Chaudhri et al. | |
| 2006/0059535 A1 | 3/2006 | D'avello | |
| 2006/0197753 A1 | 9/2006 | Hotelling | |
| 2007/0083911 A1 | 4/2007 | Madden et al. | |
| 2007/0150830 A1 | 6/2007 | Ording et al. | |
| 2007/0229465 A1* | 10/2007 | Sakai | G08C 17/00 345/173 |
| 2007/0233377 A1 | 10/2007 | Salay et al. | |
| 2008/0016446 A1 | 1/2008 | Aonuma et al. | |
| 2008/0062127 A1 | 3/2008 | Brodersen et al. | |
| 2008/0062137 A1 | 3/2008 | Brodersen et al. | |
| 2008/0062141 A1 | 3/2008 | Chandhri | |
| 2008/0165147 A1 | 7/2008 | Christie et al. | |
| 2008/0189318 A1 | 8/2008 | Bourke et al. | |
| 2008/0222546 A1 | 9/2008 | Mudd et al. | |
| 2009/0007012 A1 | 1/2009 | Mandic et al. | |
| 2009/0093276 A1* | 4/2009 | Kim | G06F 3/0482 455/566 |
| 2009/0100494 A1 | 4/2009 | Teal | |
| 2009/0172532 A1 | 7/2009 | Chaudhri | |
| 2009/0172598 A1* | 7/2009 | Yamanaka | H04N 21/4312 715/841 |
| 2010/0157157 A1 | 6/2010 | Yi | |
| 2010/0269068 A1 | 10/2010 | Labrador | |
| 2011/0004330 A1 | 1/2011 | Rothkopf et al. | |
| 2011/0145764 A1* | 6/2011 | Higuchi | G06F 3/0485 715/835 |
| 2011/0234480 A1 | 9/2011 | Fino et al. | |
| 2012/0117042 A1 | 5/2012 | Durante et al. | |
| 2012/0290933 A1 | 11/2012 | Rajaraman et al. | |
| 2012/0311444 A1 | 12/2012 | Chaudhri | |
| 2013/0014059 A1* | 1/2013 | Nakayama | H04N 21/4312 715/835 |
| 2013/0135221 A1 | 5/2013 | Ainslie et al. | |
| 2013/0321340 A1 | 12/2013 | Seo et al. | |
| 2013/0346859 A1 | 12/2013 | Bates et al. | |
| 2013/0346867 A1 | 12/2013 | Woods et al. | |
| 2014/0089802 A1 | 3/2014 | Wang | |
| 2014/0108929 A1 | 4/2014 | Garmark et al. | |
| 2014/0123006 A1 | 5/2014 | Chen et al. | |
| 2014/0143725 A1 | 5/2014 | Lee | |
| 2014/0160078 A1 | 6/2014 | Seo et al. | |
| 2014/0178047 A1 | 6/2014 | Apodaca et al. | |
| 2014/0310316 A1 | 10/2014 | Coburn, IV et al. | |
| 2014/0317573 A1 | 10/2014 | Hyeon et al. | |
| 2014/0331133 A1 | 11/2014 | Coburn, IV et al. | |
| 2014/0368734 A1 | 12/2014 | Hoffert et al. | |
| 2015/0067513 A1 | 3/2015 | Zambetti et al. | |
| 2015/0370426 A1 | 12/2015 | Carrigan et al. | |
| 2017/0068402 A1 | 3/2017 | Lochhead et al. | |

(56) References Cited

U.S. PATENT DOCUMENTS

2018/0067617 A1 3/2018 Carrigan et al.
2019/0286287 A1 9/2019 Carrigan et al.

FOREIGN PATENT DOCUMENTS

| CN | 102426507 A | 4/2012 |
| CN | 102693077 A | 9/2012 |
| CN | 102707866 A | 10/2012 |
| CN | 102707899 A | 10/2012 |
| CN | 102880399 A | 1/2013 |
| CN | 103067569 A | 4/2013 |
| CN | 106415722 B | 12/2019 |
| EP | 1511040 A1 | 3/2005 |
| EP | 2439631 A2 | 4/2012 |
| EP | 2741176 A2 | 6/2014 |
| JP | 2000-163031 A | 6/2000 |
| JP | 2002-342033 A | 11/2002 |
| JP | 2008-18189 A | 1/2008 |
| JP | 2009-500761 A | 1/2009 |
| JP | 2009-532806 A | 9/2009 |
| WO | 2013/169849 A2 | 11/2013 |
| WO | 2014/105276 A1 | 7/2014 |
| WO | 2015/200371 A1 | 12/2015 |
| WO | 2017/044320 A1 | 3/2017 |

OTHER PUBLICATIONS

International Search Report received for PCT Patent Application No. PCT/US2016/048731, dated Nov. 4, 2016, 7 pages.
Non-Final Office Action received for U.S. Appl. No. 14/748,067, dated Feb. 8, 2017, 9 pages.
Non-Final Office Action received for U.S. Appl. No. 15/808,774, dated Jan. 25, 2018, 6 pages.
Non-Final Office Action received for U.S. Appl. No. 16/430,364, dated Aug. 7, 2019, 8 pages.
Notice of Allowance received for U.S. Appl. No. 14/748,067, dated Aug. 10, 2017, 5 pages.
Notice of Allowance received for U.S. Appl. No. 15/017,530, dated Jun. 28, 2018, 9 pages.
Notice of Allowance received for U.S. Appl. No. 15/808,774, dated Jan. 14, 2019, 9 pages.
Notice of Allowance received for U.S. Appl. No. 15/808,774, dated Jul. 6, 2018, 10 pages.
Notice of Allowance received for U.S. Appl. No. 15/808,774, dated Oct. 18, 2018, 9 pages.
Notice of Allowance received for U.S. Appl. No. 16/430,364, dated Jan. 8, 2020, 9 pages.
Notice of Allowance received for U.S. Appl. No. 16/430,364, dated Apr. 23, 2020, 9 pages.
Notification to Grant received for Chinese Patent Application No. 201580028396.3, dated Sep. 27, 2019,1 page (Official copy only).
Office Action received for Australian Patent Application No. 2018202335, dated Sep. 27, 2019, 4 pages.
Office Action received for Chinese Patent Application No. 201610798253.7, dated Sep. 18, 2019, 18 pages (6 pages of English Translation and 12 pages of Official copy).
Office Action received for Chinese Patent Application No. 201911270085.4, dated Nov. 12, 2020, 7 pages (Official Copy Only).
Search Report received for Danish Patent Application No. 201670623, dated Oct. 18, 2016, 4 pages.
Search Report received for European Patent Application No. 1574528.2, dated Mar. 22, 2019, 2 pages.
Supplemental Notice of Allowance received for U.S. Appl. No. 15/017,530, dated Oct. 4, 2018, 2 pages.
Bohn, Dieter, "Rebooting WebOS: How LG Rethought The Smart TV", The Verge, Available online at: <http://www.theverge com/2014/1/6/5279220/rebooting-webos-how-lg-rethought-the-smart-tv>, Jan. 6, 2014, 5 pages.
Grey, Melissa, "Comcast's New X2 Platform Moves your DVR Recordings from the Box to the Cloud", Engadget, Available online at: <http://www.engadget.com/2013/06/11/comcast-x2-platform/>, Jun. 11, 2013, 15 pages.
Lee et al., "A Multi-Touch Three Dimensional Touch-Sensitive Tablet", CHI'85 Proceedings, Apr. 1985, pp. 21-25.
Rubine, Dean, "Combining Gestures and Direct Manipulation", CHI'92, May 3-7, 1992, pp. 659-660.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Search Report received for Chinese Patent Application No. 201911270085.4, dated Jul. 29, 2021, 3 pages (1 page of English Translation and 2 page of Official Copy).

* cited by examiner

History 604-1

602-1 Heart of Glass Blondie 602-2 Fake Plastic Trees Radiohead

Out There
Dinosaur Jr.

Funkentelechy
Parliament

Play Next
Add to Up Next
Get Info

New Station from Artist
New Station from Song

Go to Artist
Go to Album

606

Display 514

Figure 6D 604-2　604-3

Now Playing　Up Next

| 602-3 | 602-4 | 602-5 | 602-6 | 602-7 |

Like Teen Spirit —608
Nirvana

Modern Guilt
Beck

Boogie Stop Shuffle
Charles Mingus

Play Next
Move
Delete from Up Next
Get Info

New Station from Artist
New Station from Song

Go to Artist

—606

The Wire
Haim

Cherry Bomb
Kylie Minogue

← Display 514

Figure 6F

Now Playing | Up Next

| 604-2 | 604-3 | | | | |
|---|---|---|---|---|---|
| 602-3 | 602-4 | | 602-5 | 602-6 | 602-7 |
| Smells Like Teen Spirit<br>Nirvana | Modern Guilt<br>Beck | | Boogie Stop Shuffle<br>Charles Mingus | The Wire<br>Haim | Cher<br>Kylie |

624

Play Next
Move
Delete from Up Next
Get Info

New Station from Artist
New Station from Song

Go to Artist

Display 514

Figure 6O

Up Next 604-3

| 602-4 | 602-5 | 602-6 | 602-7 | 602-8 | 602-9 |
|---|---|---|---|---|---|
| Modern Guilt<br>Beck | Boogie Stop Shuffle<br>Charles Mingus | The Wire<br>Haim | Cherry Bomb<br>Kylie Minogue | Rabiosa<br>Shakira | Horse Guitar<br>John Lurie |

Display 514

Figure 6P 604-3

Up Next

| 602-5 | 602-4 | 602-6 | 602-7 | 602-8 | 602-9 |
| --- | --- | --- | --- | --- | --- |
| Boogie Stop Shuffle<br>Charles Mingus | Modern Guilt<br>Beck | The Wire<br>Haim | Cherry Bomb<br>Kylie Minogue | Rabiosa<br>Shakira | Horse Guitar<br>John Lurie |

Display 514

Figure 6Q

Up Next 604-3

| 602-5 | 602-6 | 602-4 | 602-7 | 602-8 | 602-9 |
|---|---|---|---|---|---|
| Boogie Stop Shuffle<br>Charles Mingus | The Wire<br>Haim | Modern Guilt<br>Beck | Cherry Bomb<br>Kylie Minogue | Rabiosa<br>Shakira | Horse Guitar<br>John Lurie |

Display 514

Figure 6R

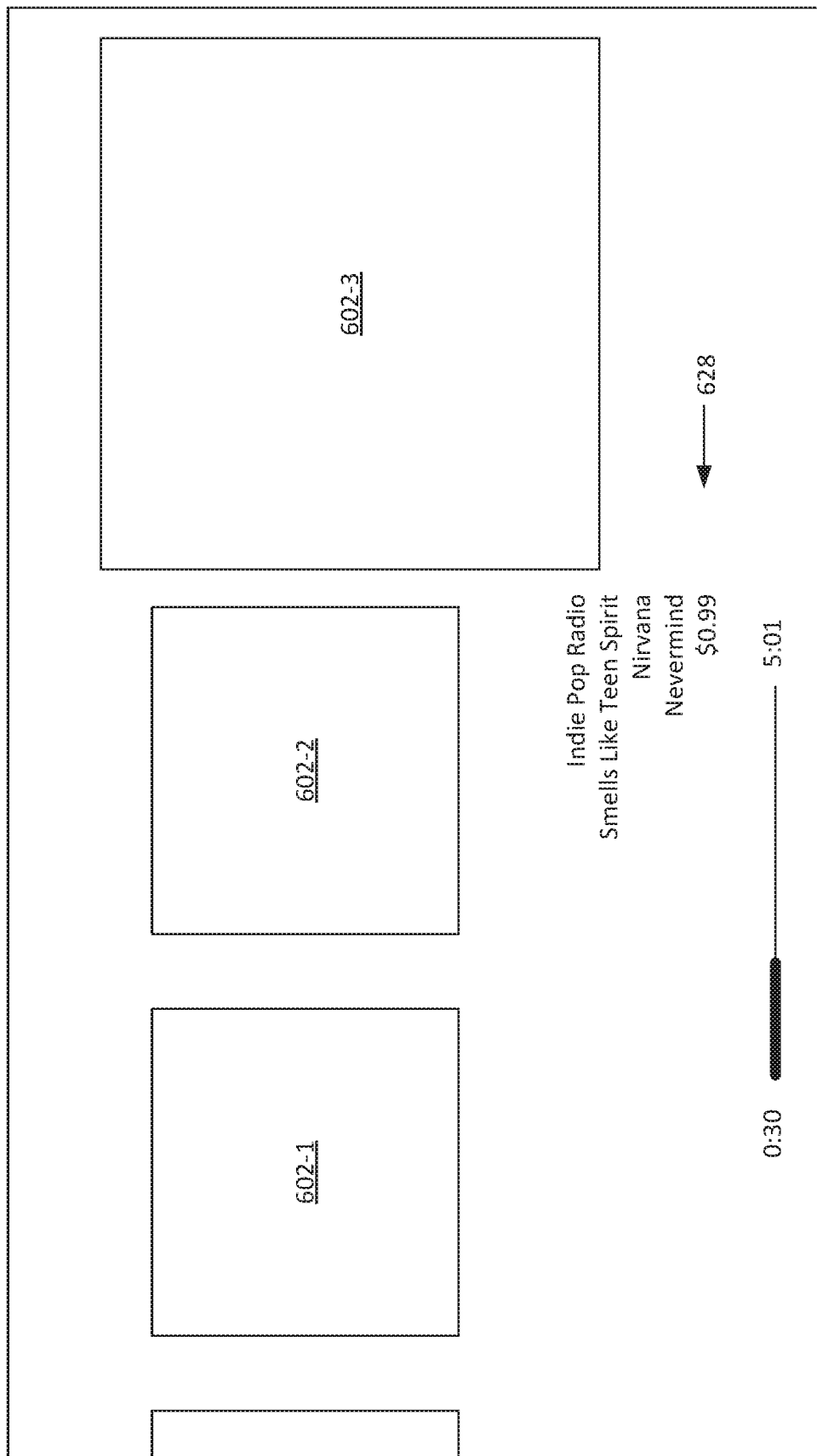

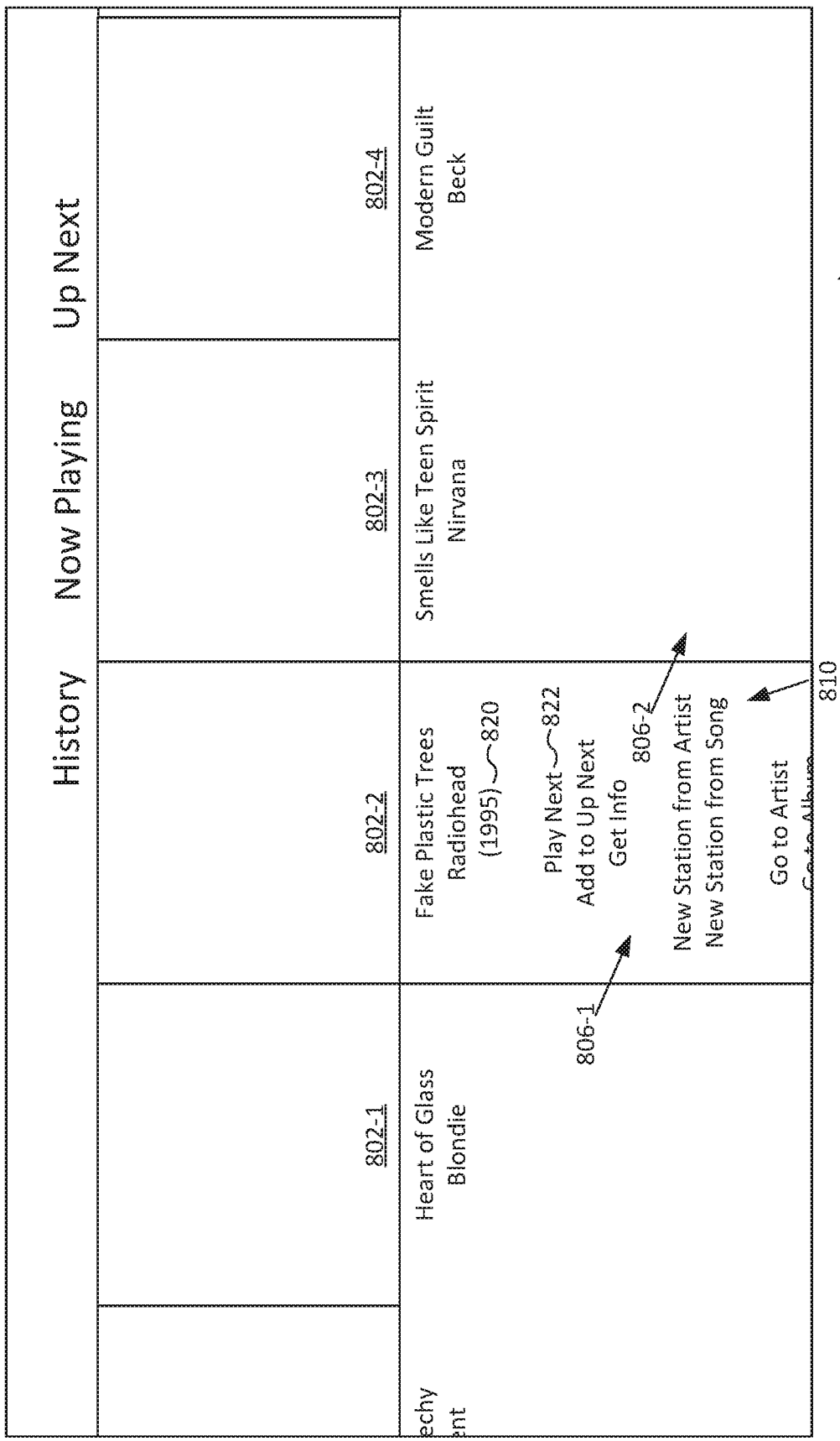

Up Next

| 802-4 | 802-5 | 802-6 | 802-7 | |
|---|---|---|---|---|
| Modern Guilt<br>Beck | Boogie Stop Shuffle<br>Charles Mingus | The Wire<br>Haim | Cherry Bomb<br>Kylie Minogue<br>(2008) | Rabiosa<br>Shakira |

Play Next
Move
Delete from Up Next ← 806-4
Get Info

New Station from Artist
New Station from Song ← 814

← 806-3

Display 514

Figure 8D

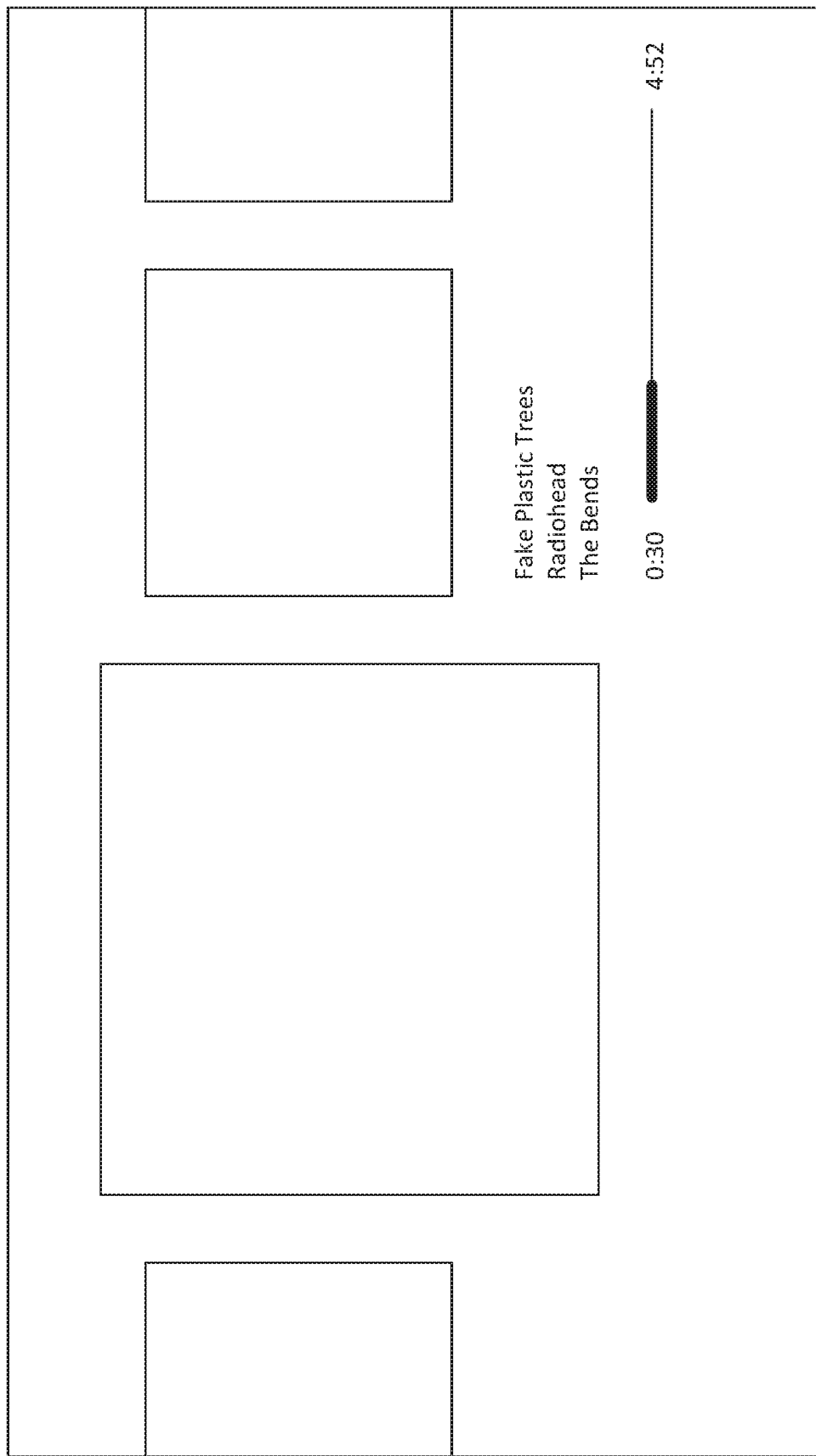

| w Playing | Up Next | | | | |
|---|---|---|---|---|---|
| 802-3 | 802-4 | 802-5 | | 802-6 | 802-7 |
| Like Teen Spirit<br>Nirvana | Modern Guilt<br>Beck | Boogie Stop Shuffle<br>Charles Mingus<br>(1959)<br><br>Play Next<br>Move<br>Delete from Up Next<br>Get Info<br>New Station from Artist<br>New Station from Song | | The Wire<br>Haim | Cherry Bomb<br>Kylie Minogue |

806-3, 812, Display 514

Figure 8I

Up Next

| 802-4 | 802-5 | 802-6 | 802-7 | |
|---|---|---|---|---|
| ...ern Guilt<br>Beck | Boogie Stop Shuffle<br>Charles Mingus | The Wire<br>Haim | Cherry Bomb<br>Kylie Minogue<br>(2008) | Rabiosa<br>Shakira |

Menu (806-4) on 802-7:
- Play Next
- Move
- Delete from Up Next
- Get Info
- New Station from Artist
- New Station from Song
- Go to Artist 814 → Display 514

Figure 8K

Up Next

| 802-4 | 802-5 | 802-6 | 802-7 | |
|---|---|---|---|---|
| ...ern Guilt<br>Beck | Boogie Stop Shuffle<br>Charles Mingus | The Wire<br>Haim | Kylie Minogue<br>(2008) | Rabiosa<br>Shakira |

806-4 →

Play Next
Move
Delete from Up Next
Get Info

New Station from Artist
New Station from Song

Go to Artist ← 814
Go to Album

Display 514

Figure 8L

MUSIC NOW PLAYING USER INTERFACE

CROSS REFERENCE TO RELATED APPLICATIONS

This Application is a continuation of U.S. application Ser. No. 16/430,364 (now U.S. Publication No. 2019-0286287, published on Sep. 19, 2019), filed Jun. 3, 2019, which is a continuation of U.S. application Ser. No. 15/808,774 (now issued as U.S. Pat. No. 10,310,711 on Jun. 4, 2019), filed Nov. 9, 2017, which is a continuation of U.S. application Ser. No. 14/748,067 (now issued as U.S. Pat. No. 9,841,876 on Dec. 12, 2017), filed Jun. 23, 2015, which claims the benefit of U.S. Provisional Application No. 62/016,600 filed on Jun. 24, 2014, the entire disclosures of which are incorporated herein by reference for all purposes.

FIELD OF THE DISCLOSURE

The present disclosure relates generally to user interfaces for a music application.

BACKGROUND OF THE DISCLOSURE

Many electronic devices provide cluttered and unintuitive user interfaces for viewing and selecting. There is a need to provide an intuitive way to cleanly and simply display and navigate among content items in a queue of upcoming items and a history of recently played items (e.g., songs in an album, playlist, or streaming radio).

SUMMARY OF THE DISCLOSURE

Many electronic devices provide cluttered and unintuitive user interfaces for viewing and selecting content. There is a need to provide an intuitive way to cleanly and simply display and navigate among content items in a queue of upcoming items and a history of recently played items (e.g., songs in an album, playlist, or streaming radio). The embodiments described below provide a fast, efficient, and convenient way for users to navigate through and select various content items for consumption.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 8A-8L illustrate an exemplary simplified content user interface in accordance with some embodiments of the disclosure.

DETAILED DESCRIPTION

Figure 1A:
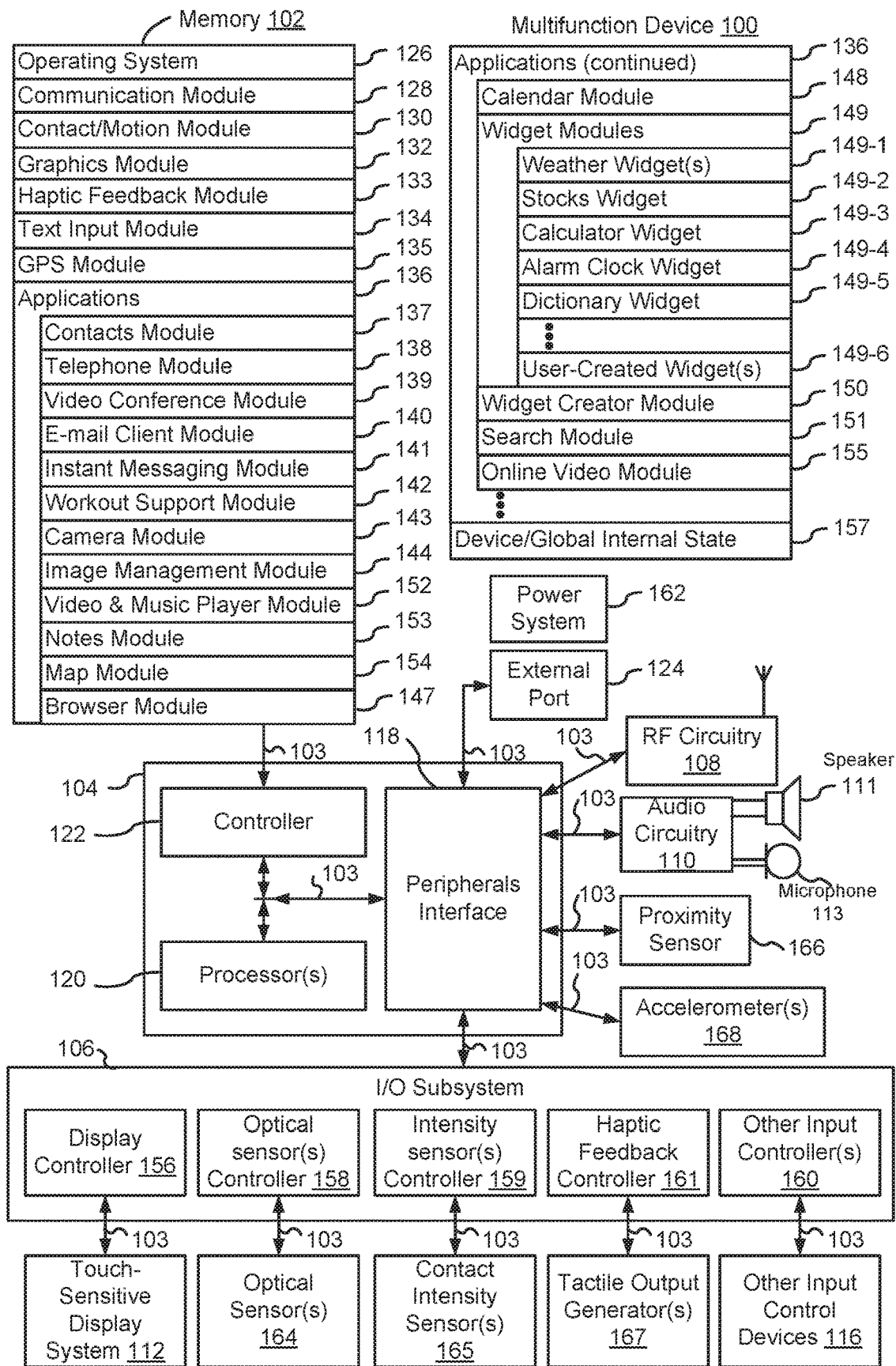
FIG. 1A is a block diagram illustrating a multifunction device with a touch-sensitive display in accordance with some embodiments.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

EXEMPLARY DEVICES

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
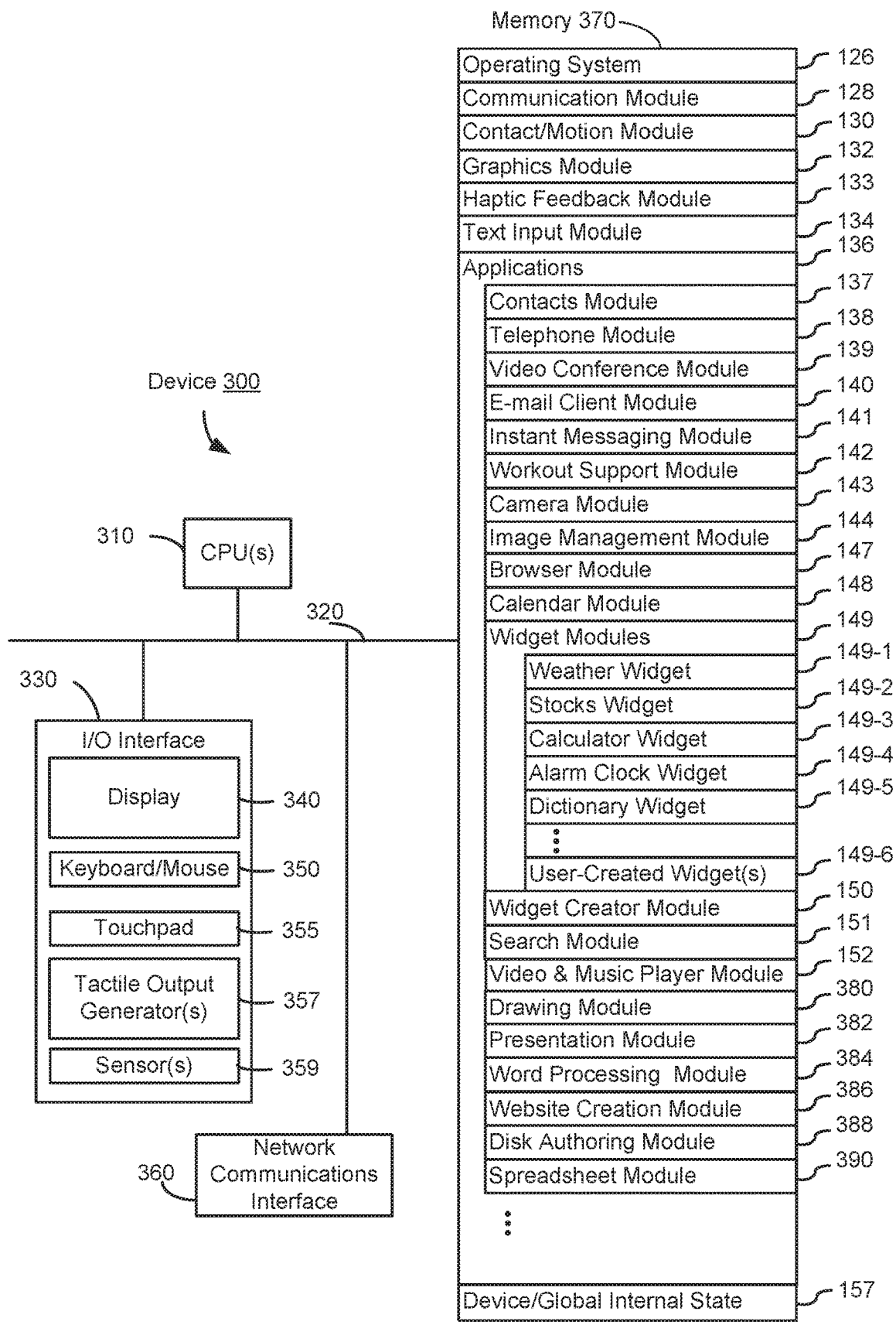
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns and intensities. Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
    contacts module 137 (sometimes called an address book or contact list);

telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154;
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad (whether included in device 100 or on a separate device, such as an input device). By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
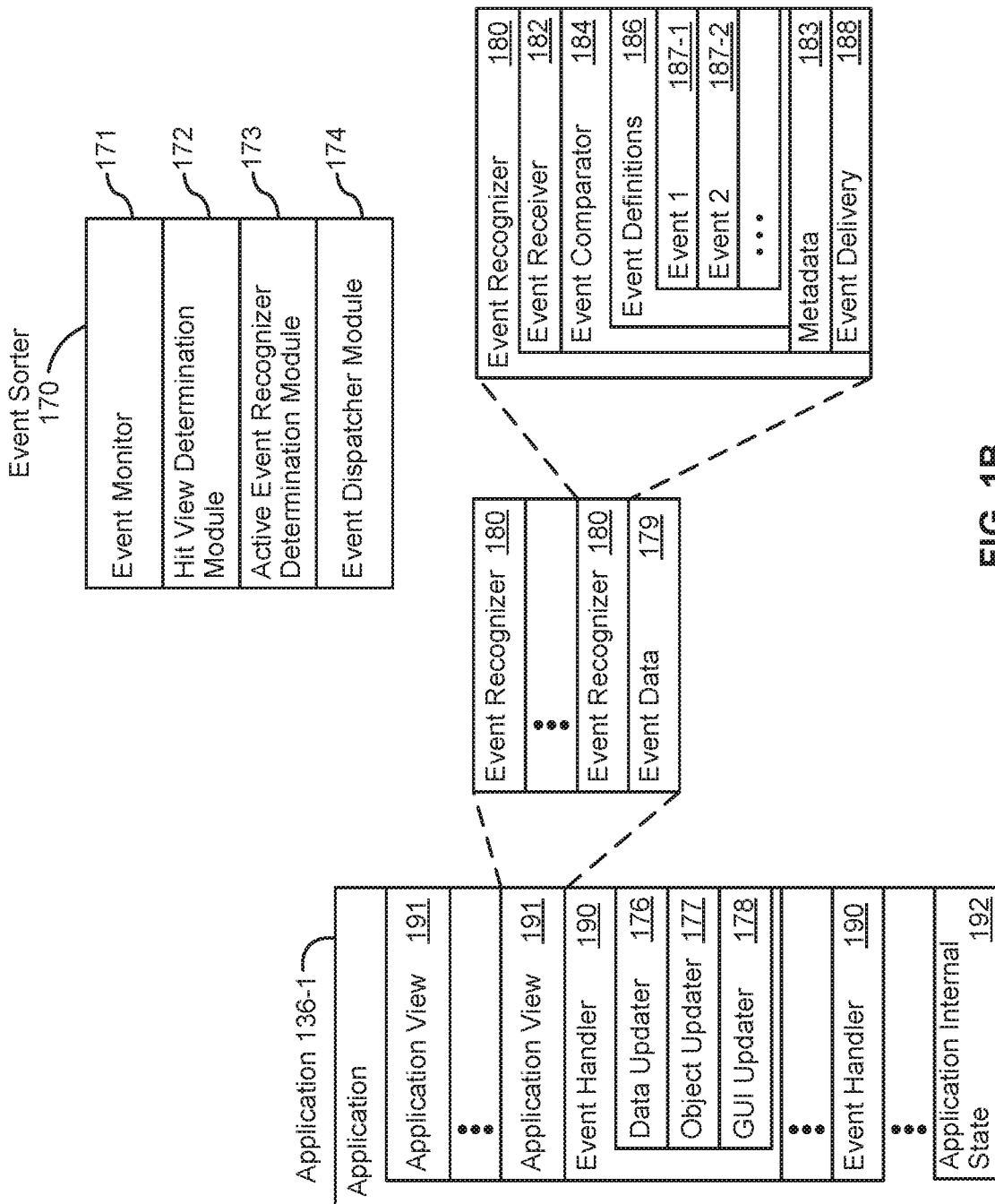
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays and/or touchpads also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
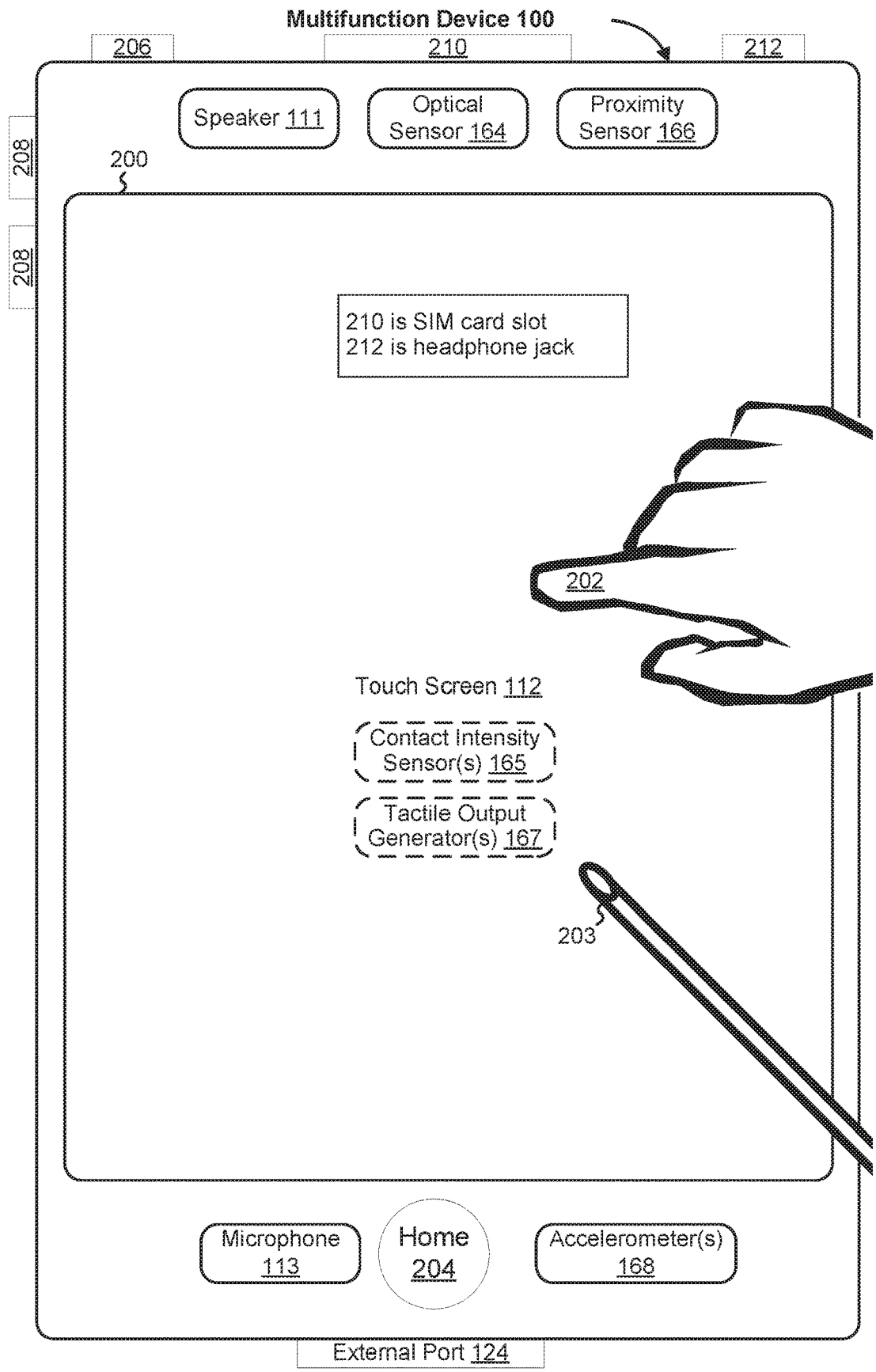
FIG. 2 illustrates a multifunction device having a touch screen in accordance with some embodiments.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 4:
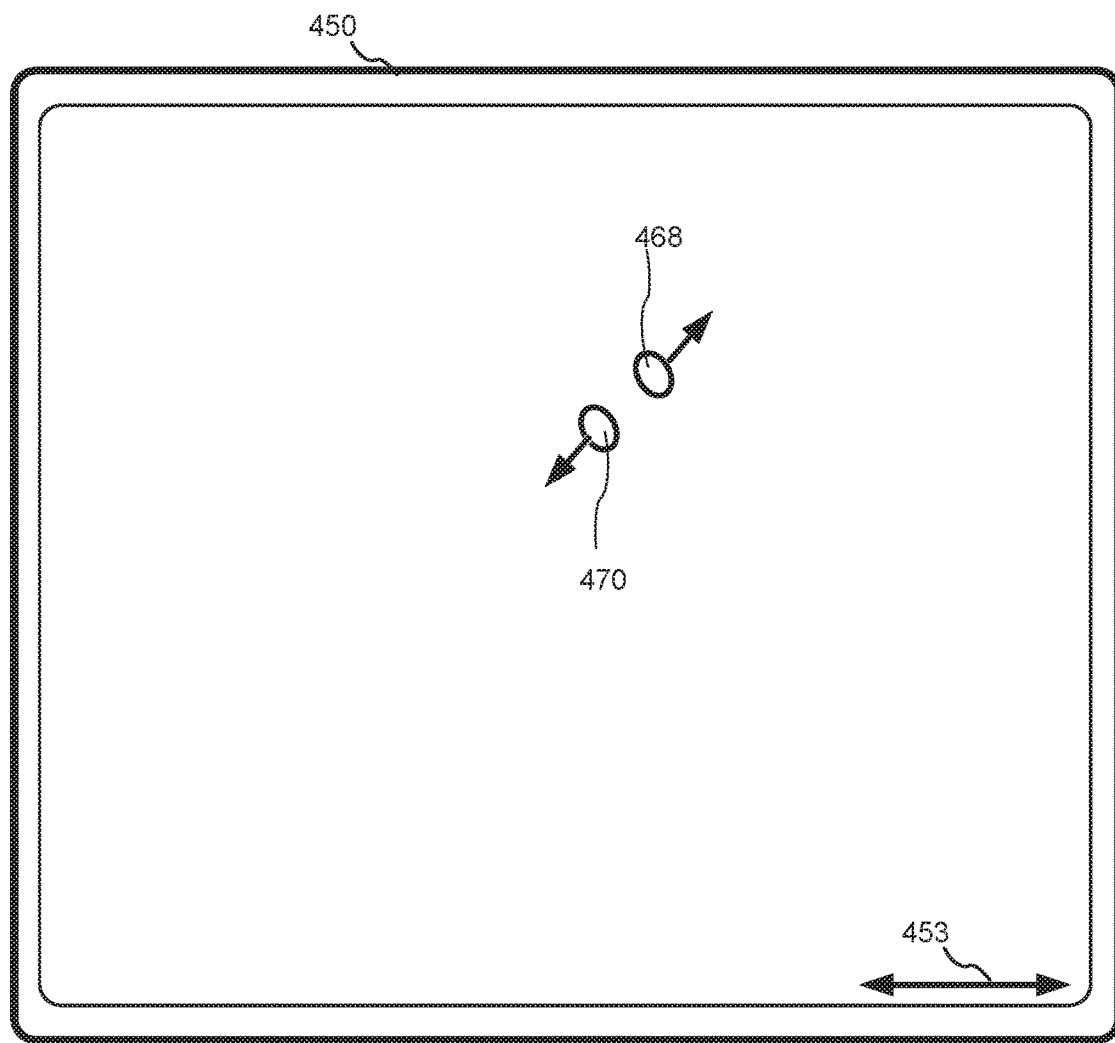
FIG. 4 illustrates an exemplary user interface for a multifunction device with a touch-sensitive surface that is separate from the display in accordance with some embodiments.
Figure 4:
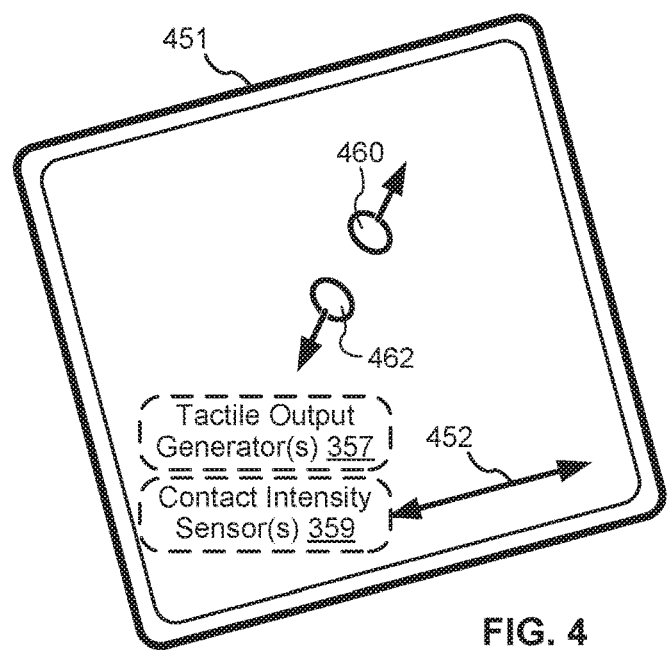

FIG. 4 illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4. In some embodiments the touch sensitive surface (e.g., 451 in FIG. 4) has a primary axis (e.g., 452 in FIG. 4) that corresponds to a primary axis (e.g., 453 in FIG. 4) on the display (e.g., 450). In accordance with these embodiments, the device detects contacts (e.g., 460 and 462 in FIG. 4) with the touch-sensitive surface 451 at locations that correspond to respective locations on the display (e.g., in FIG. 4, 460 corresponds to 468 and 462 corresponds to 470). In this way, user inputs (e.g., contacts 460 and 462, and movements thereof) detected by the device on the touch-sensitive surface (e.g., 451 in FIG. 4) are used by the device to manipulate the user interface on the display (e.g., 450 in FIG. 4) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5:
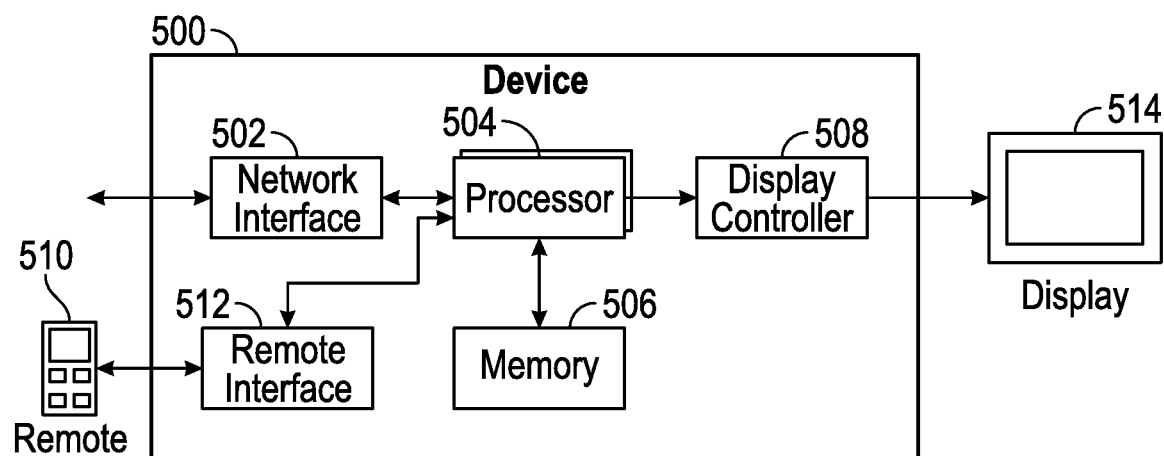
FIG. 5 illustrates a block diagram of an exemplary architecture for the device according to some embodiments of the disclosure.

FIG. 5 illustrates a block diagram of an exemplary architecture for the device 500 according to some embodiments of the disclosure. In the embodiment of FIG. 5, media content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., methods 700, 900, 1100, 1300, and/or 1500).

In some embodiments, display controller 508 causes the various user interfaces of the disclosure to be displayed on display 500. Further, input to device 500 is optionally provided by remote 510 via remote interface 512, which is optionally a wireless or a wired connection. It is understood that the embodiment of FIG. 5 is not meant to limit the features of the device of the disclosure, and that other components to facilitate other features described in the disclosure are optionally included in the architecture of FIG. 5 as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 512 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 514 optionally corresponds to one or more of touch-sensitive display system 112 in FIGS. 1A and 2, and display 340 in FIG. 3.

USER INTERFACES AND ASSOCIATED PROCESSES

Content User Interface

Many electronic devices provide user interfaces for viewing and selecting content. There is a need to provide an intuitive way to display and navigate among content items in a queue of upcoming items and a history of recently played items (e.g., songs in an album, playlist, or streaming radio). The embodiments described below provide a fast, efficient, and convenient way for users to navigate through and select various content items for consumption.

Figure 6A:
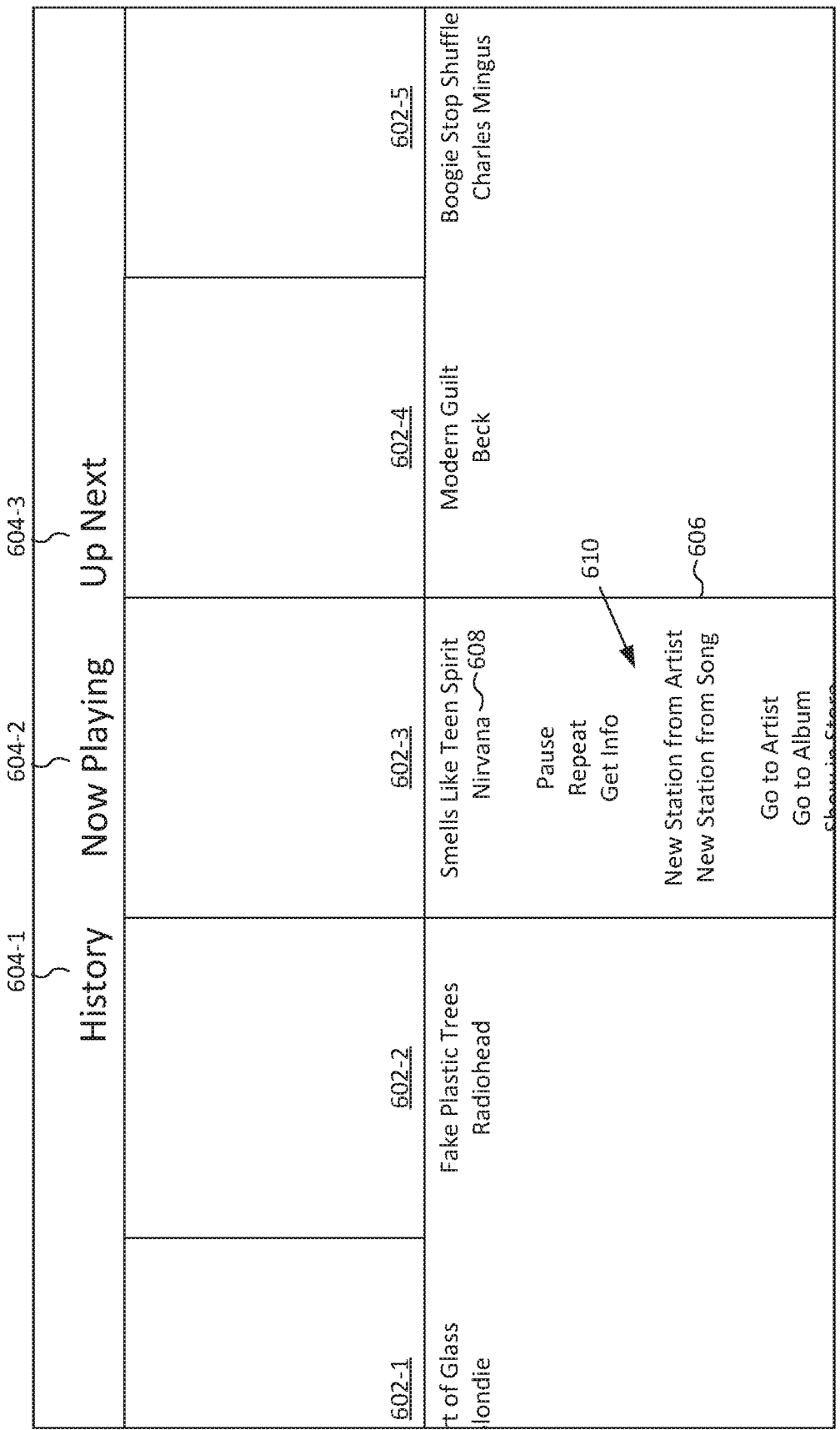
FIGS. 6A-6Y illustrate an exemplary content user interface in accordance with some embodiments of the disclosure.
Figure 6B:
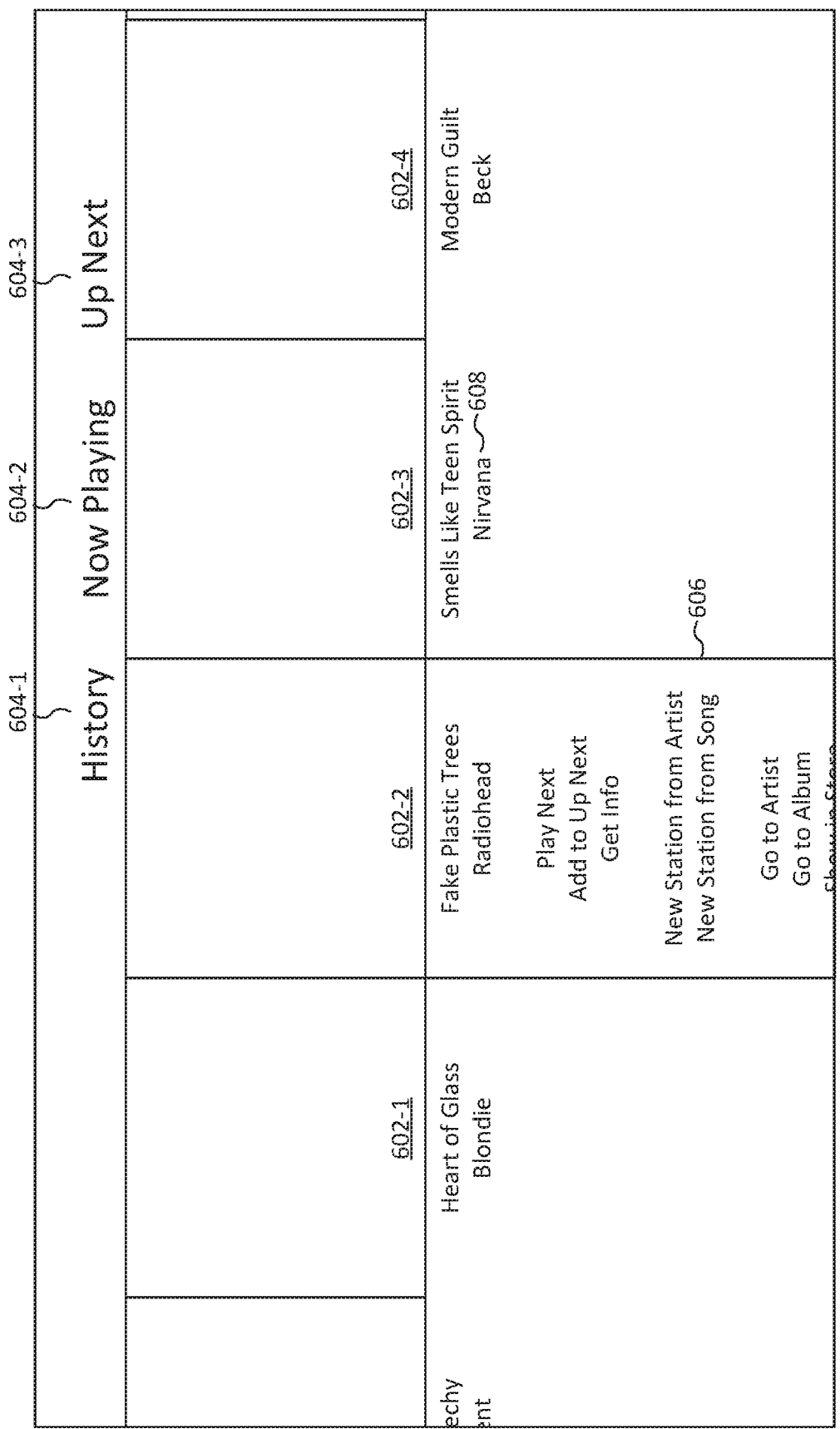
Figure 6C:
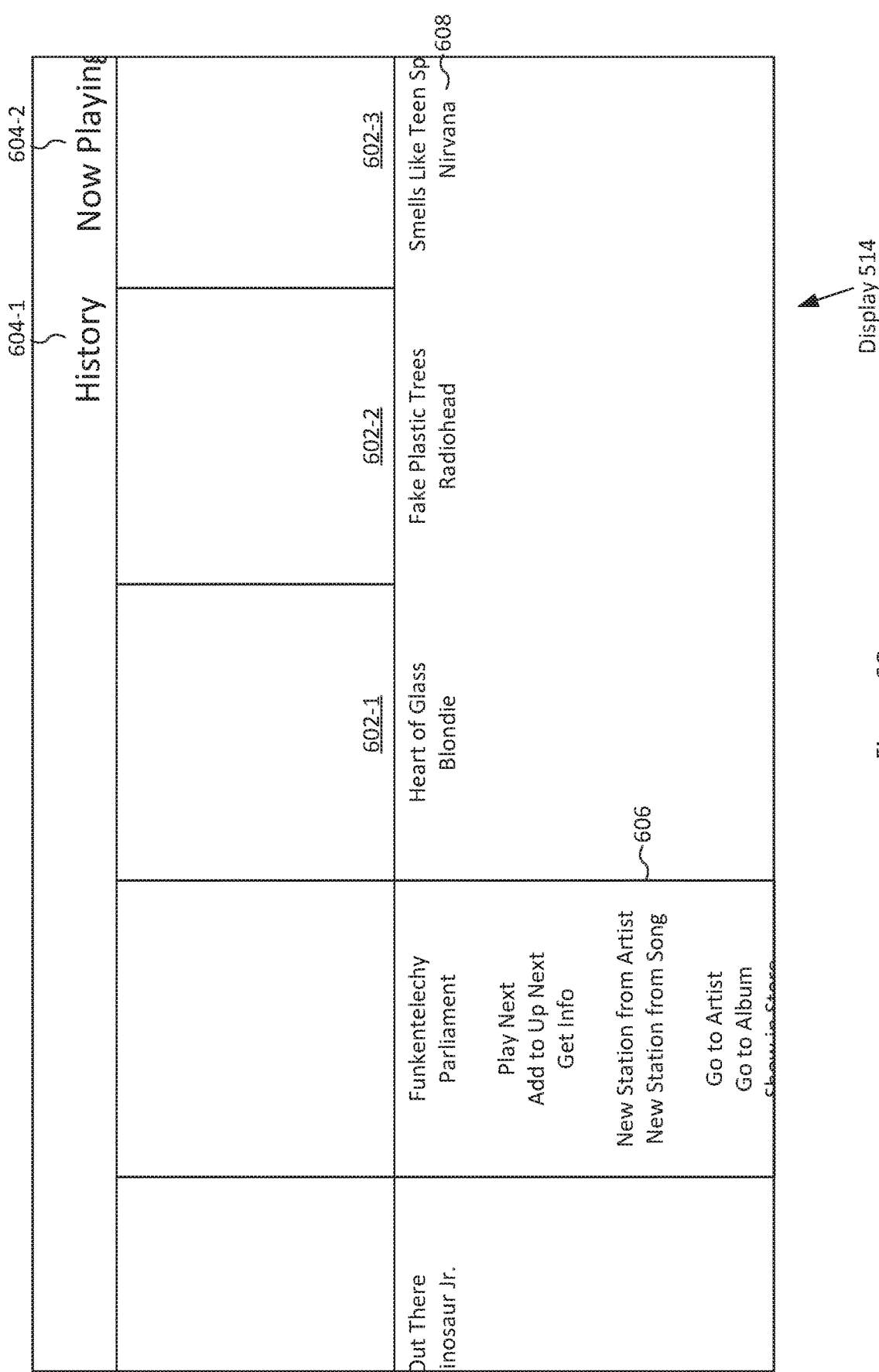
Figure 6E:
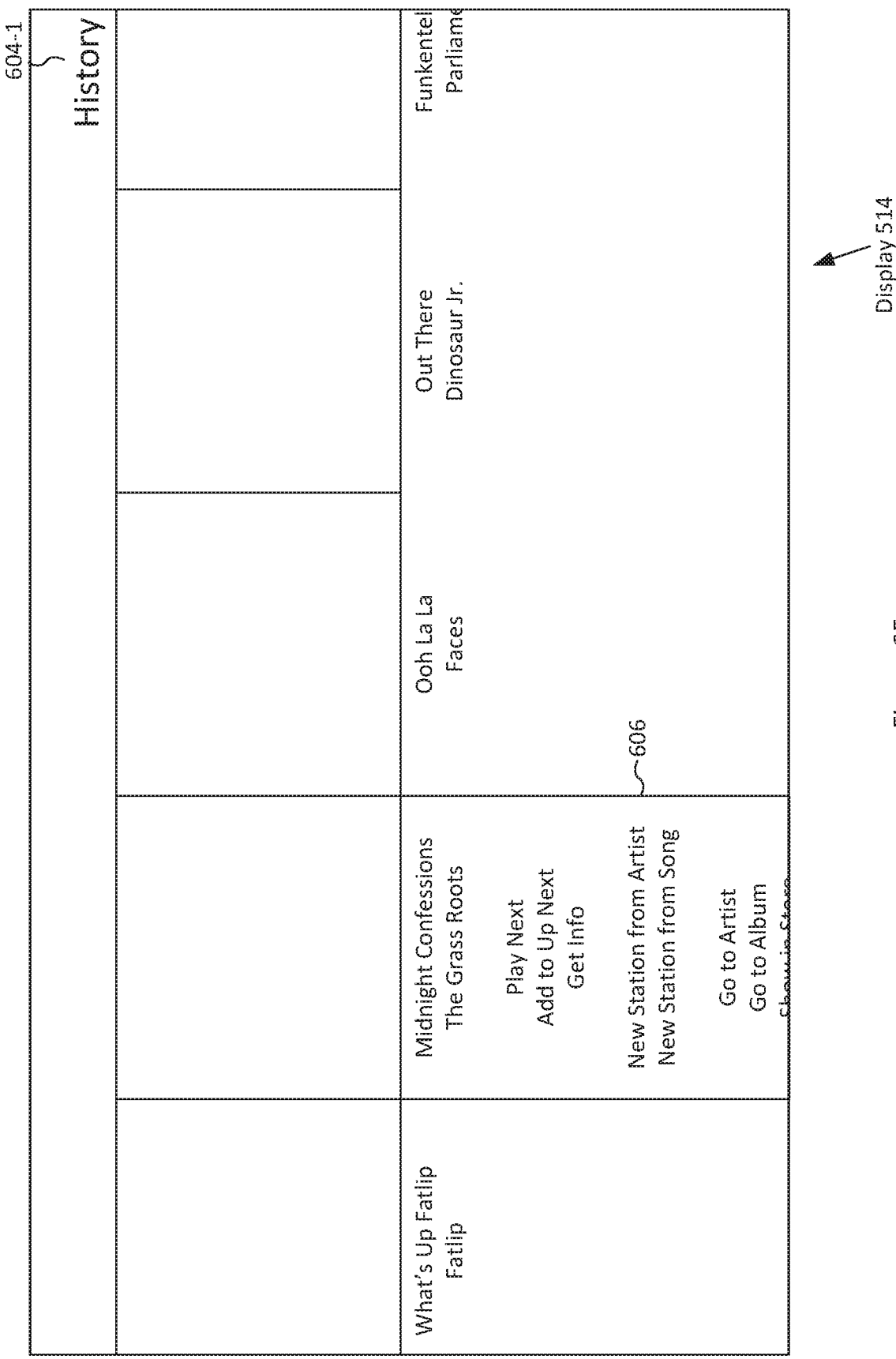
Figure 6G:
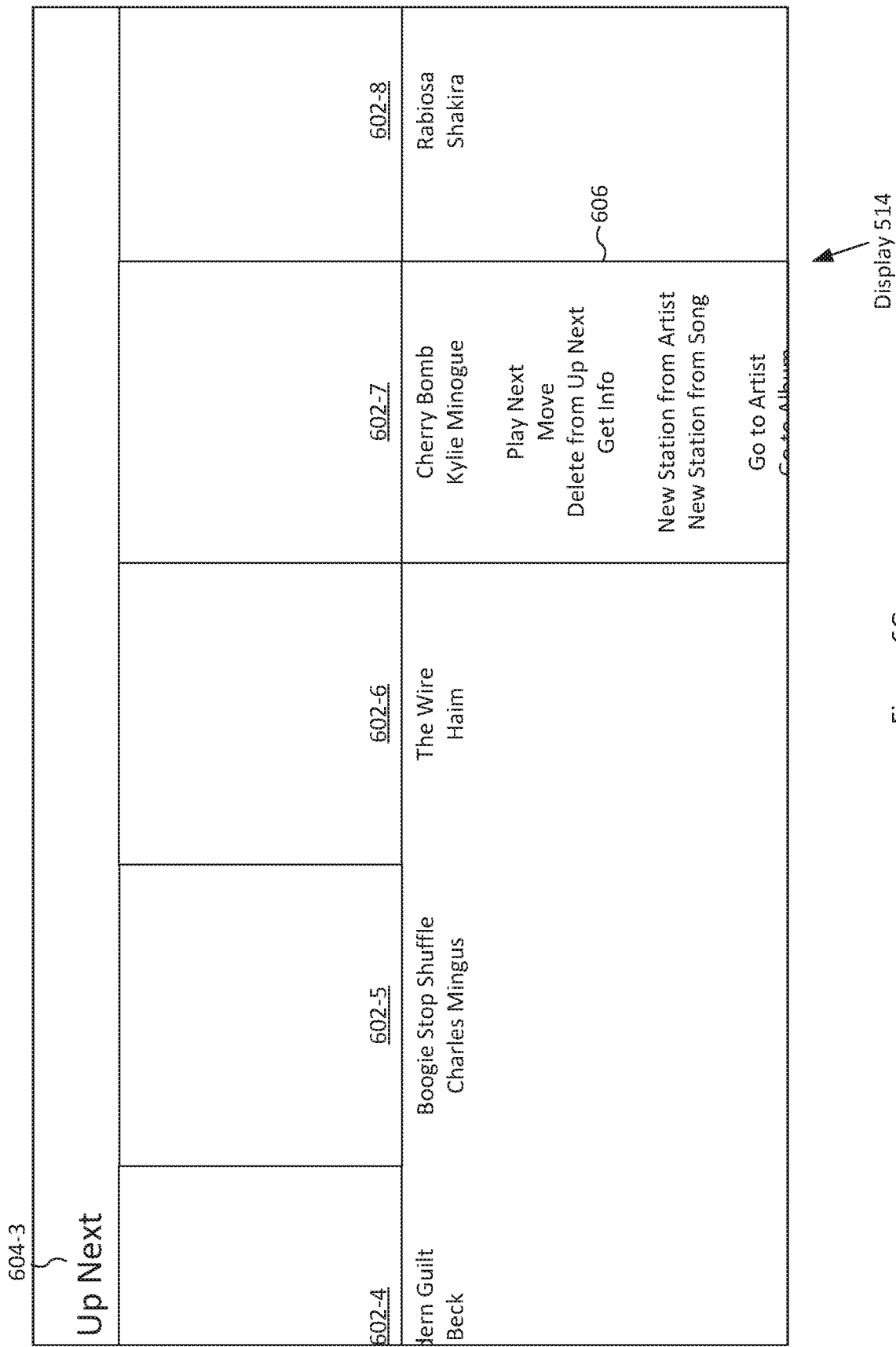
Figure 6H:
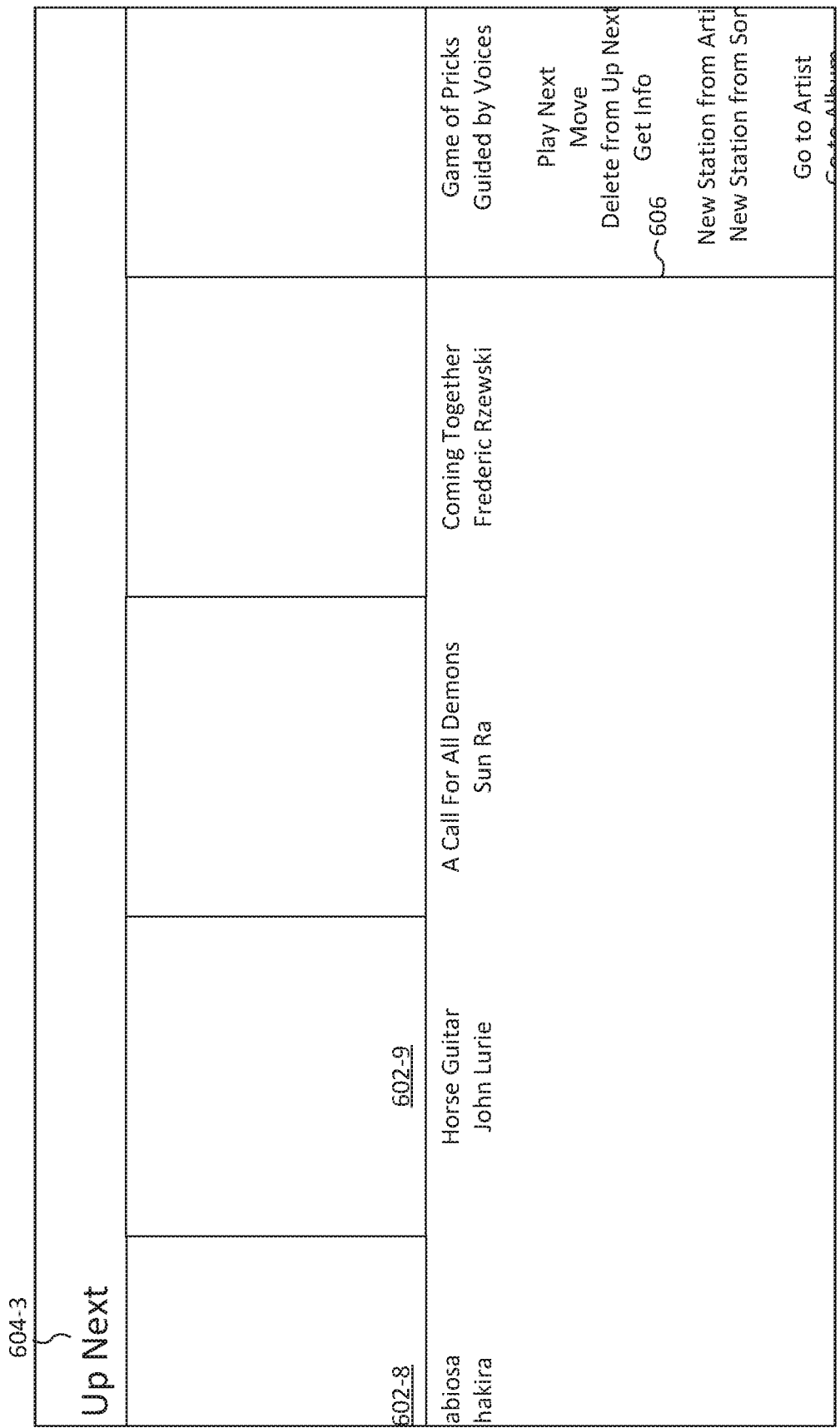
Figure 6I:
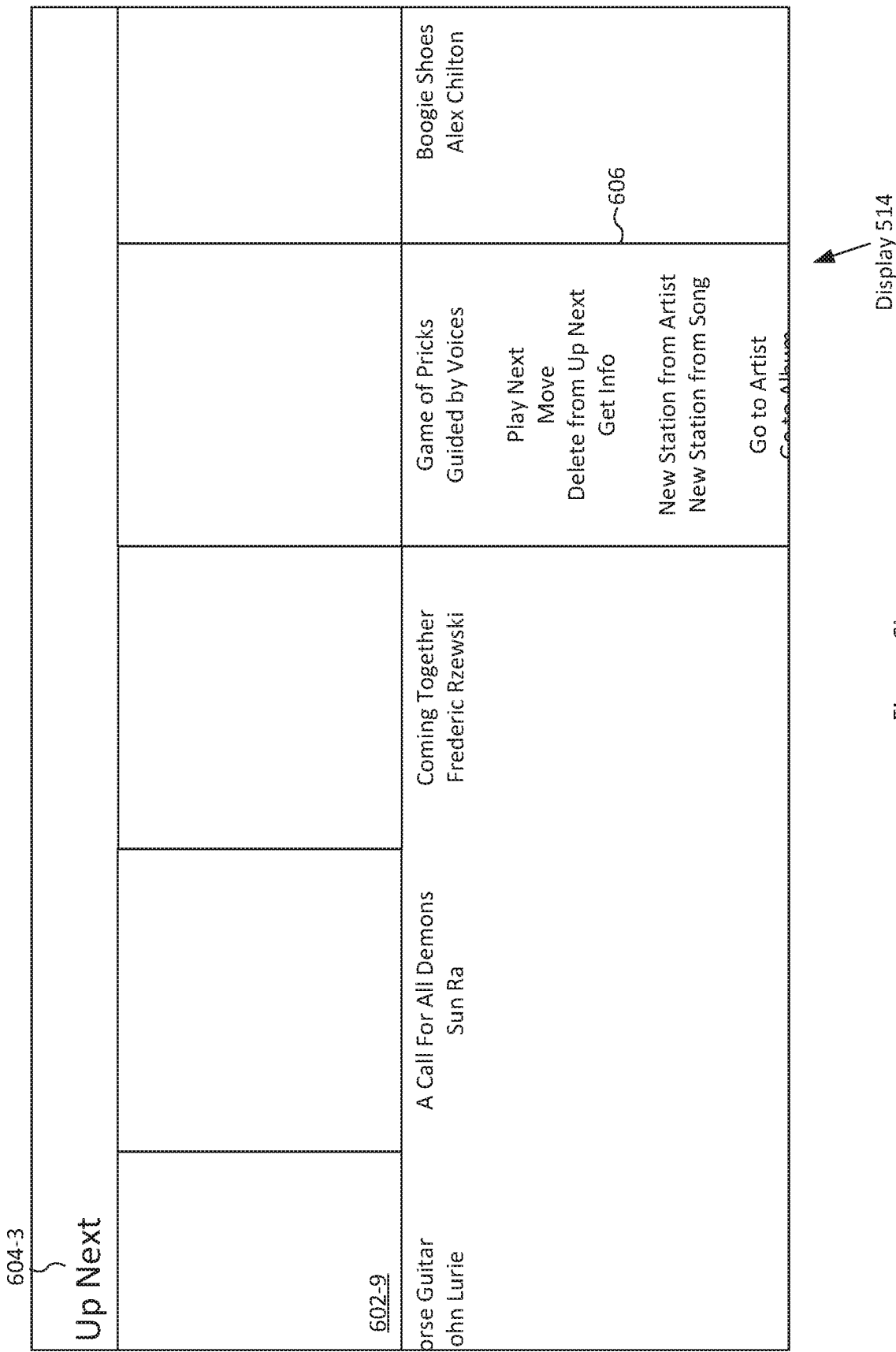
Figure 6J:
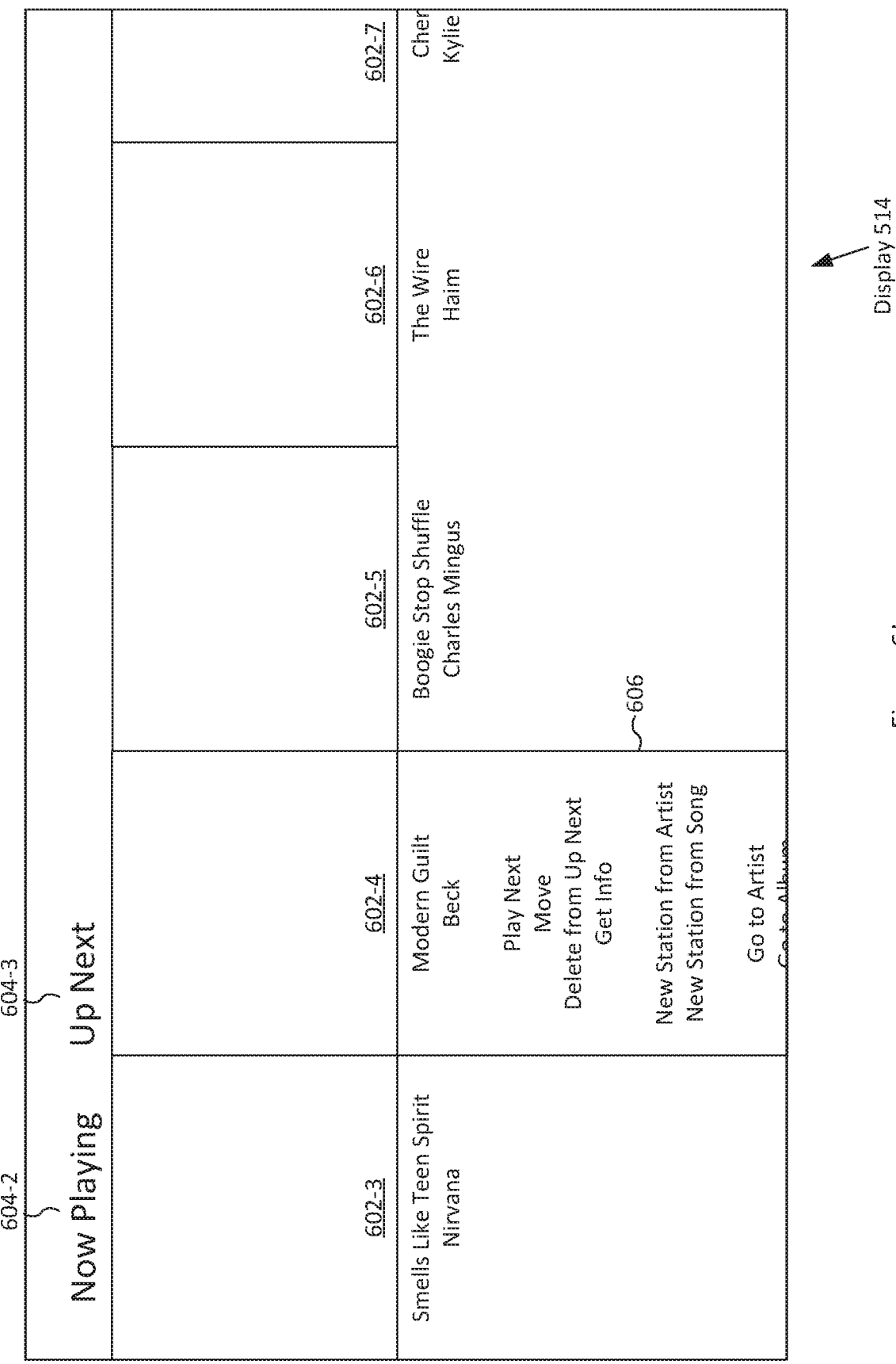
Figure 6K:
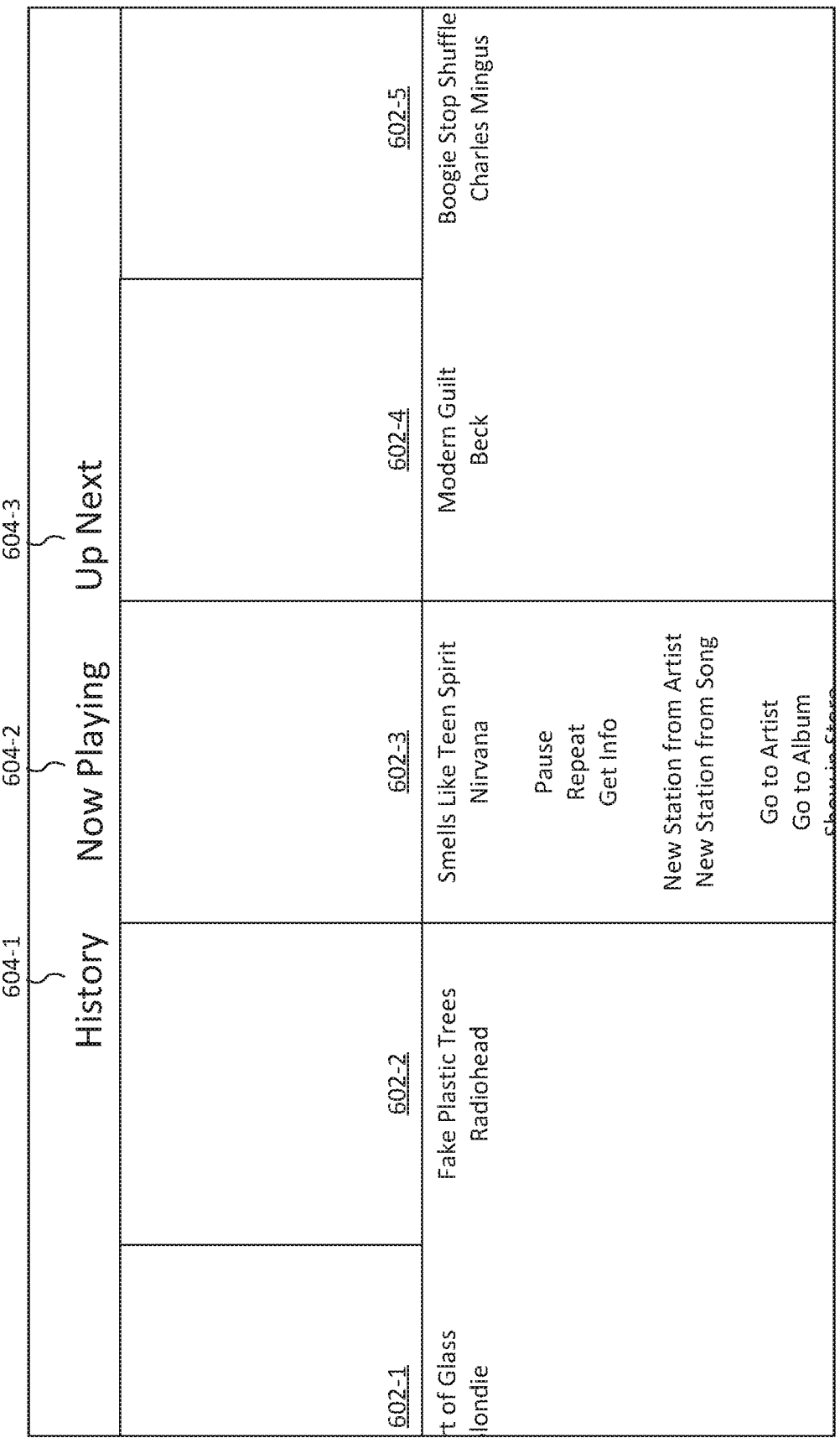
Figure 6L:
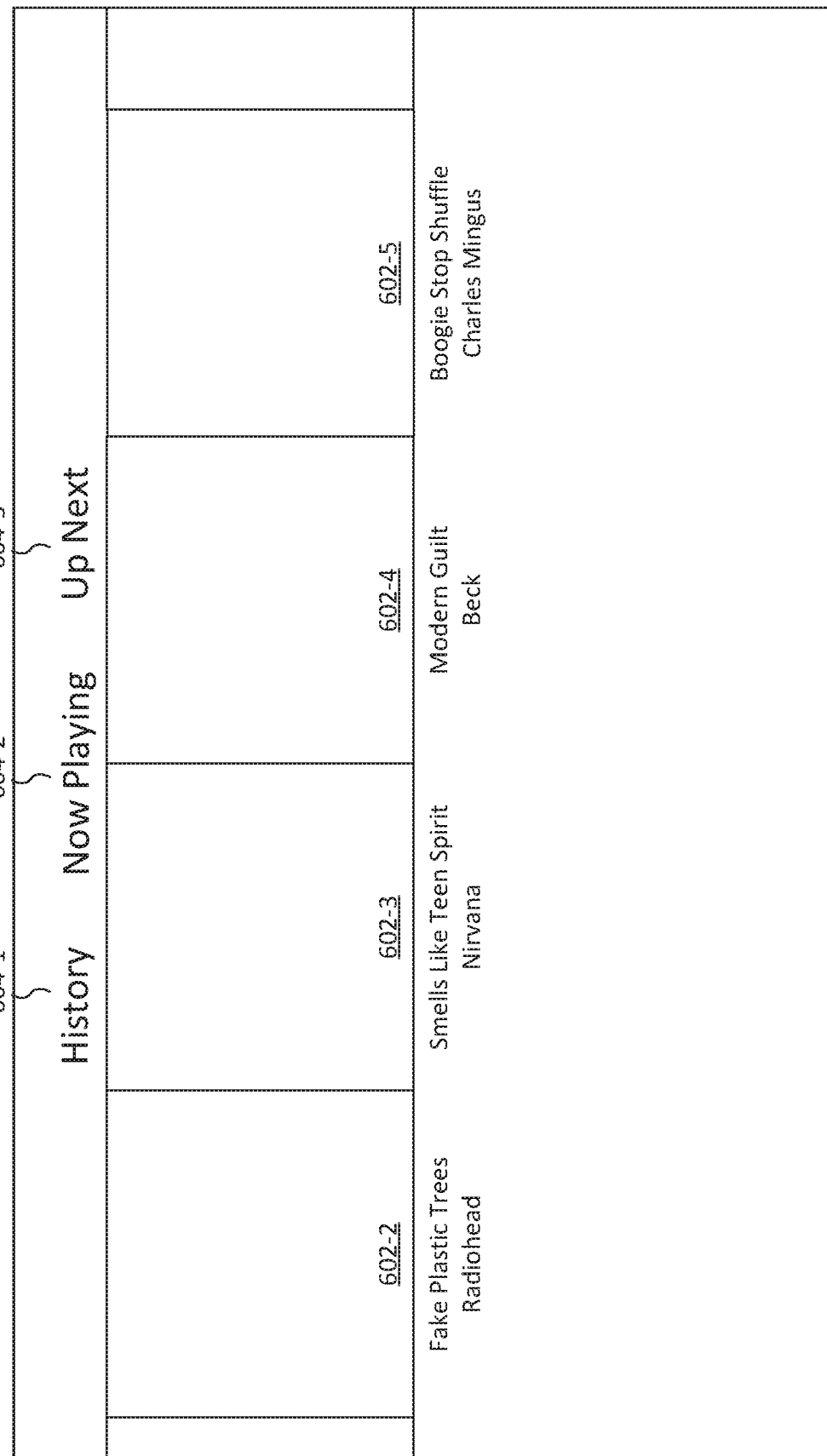
Figure 6M:
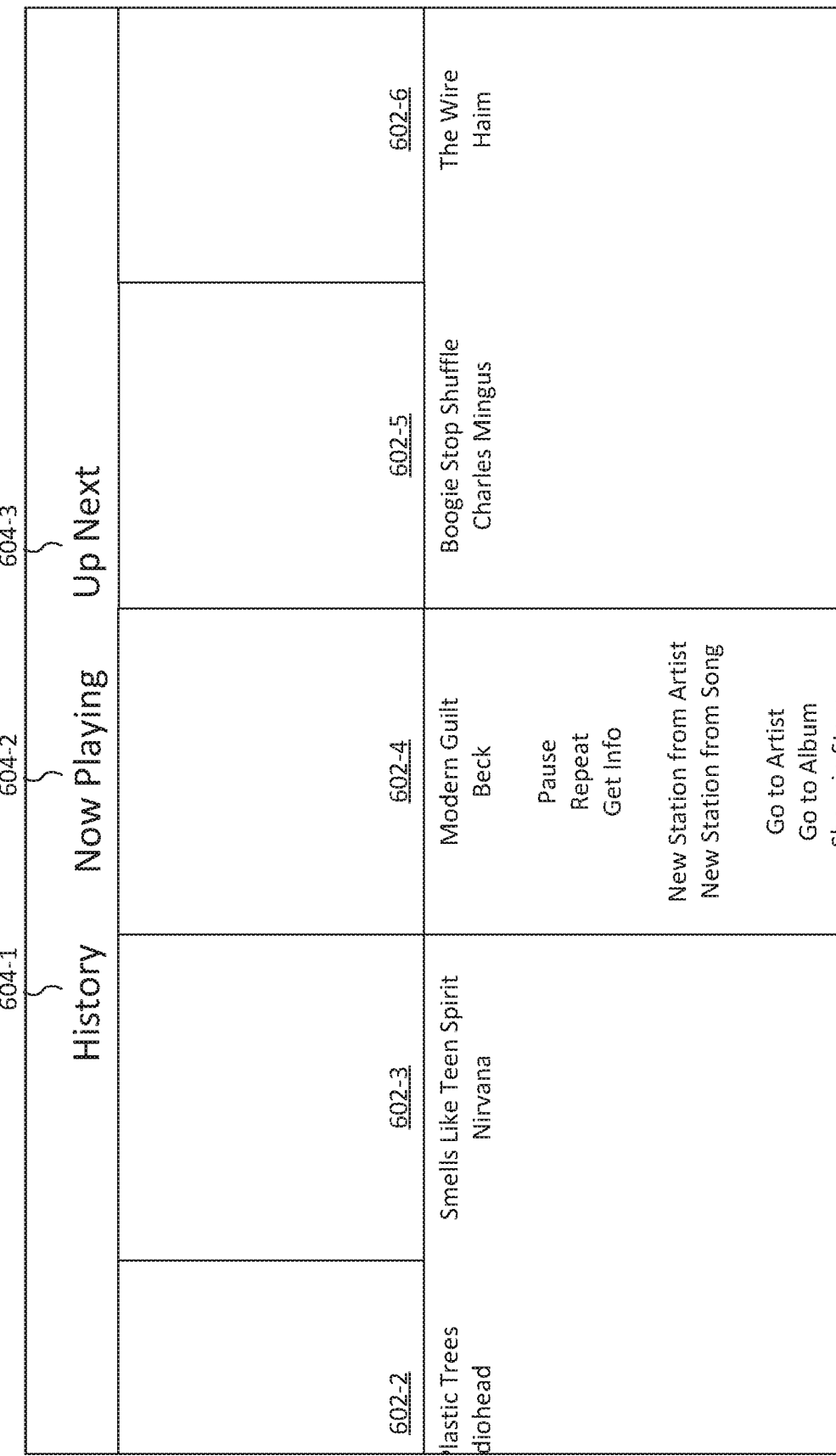
Figure 6N:
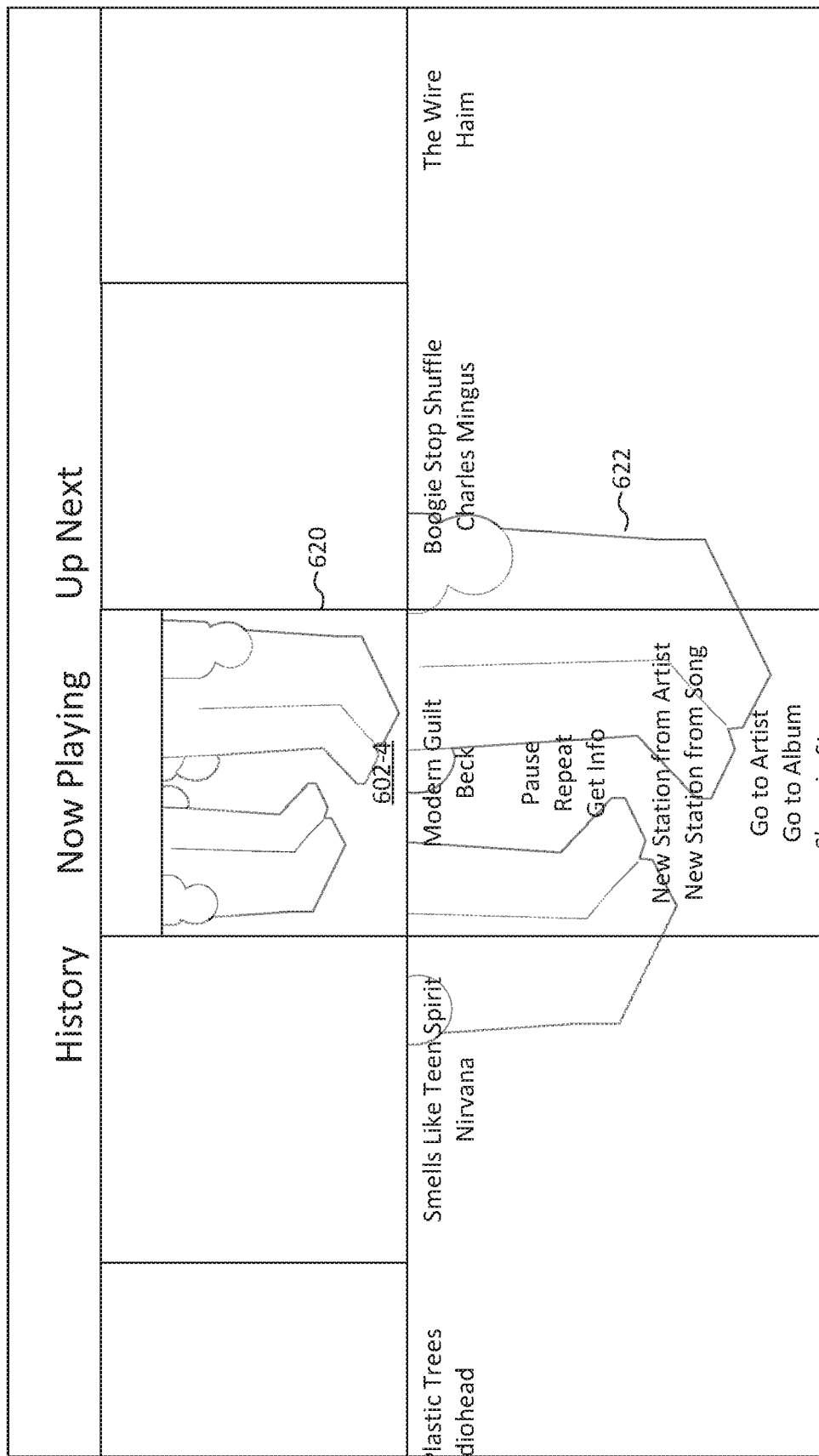
Figure 6S:
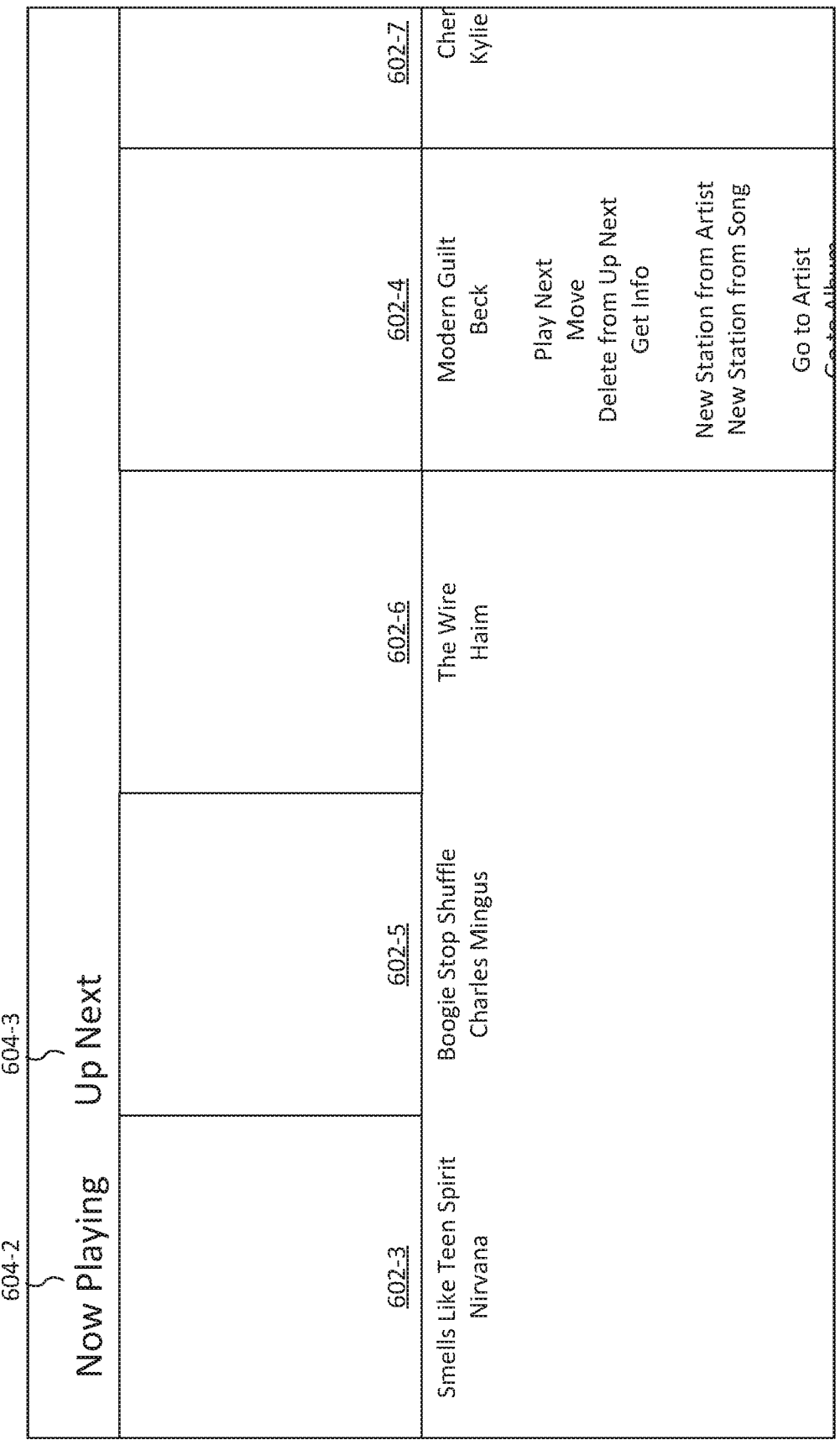
Figure 6T:
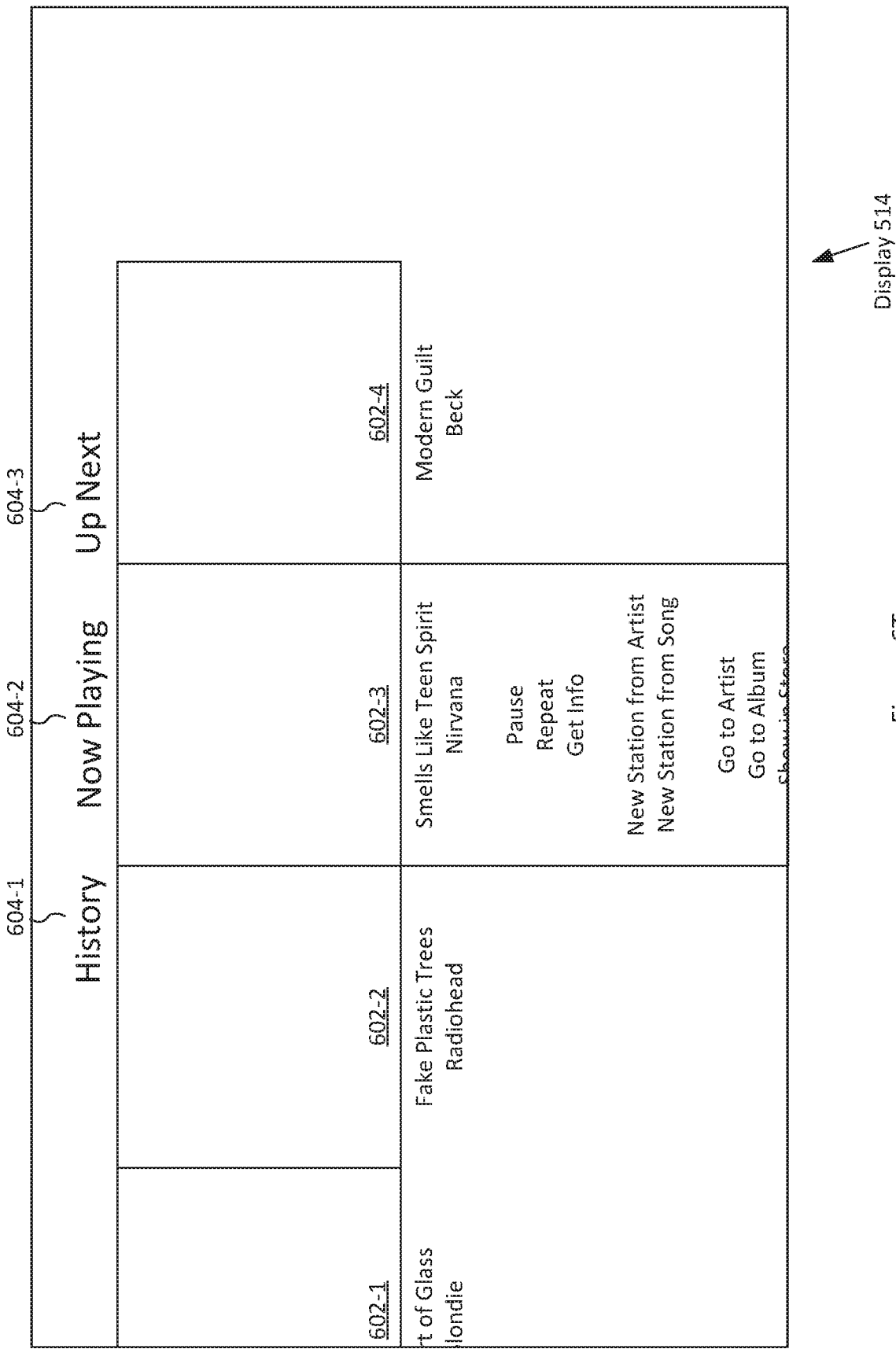
Figure 6U:
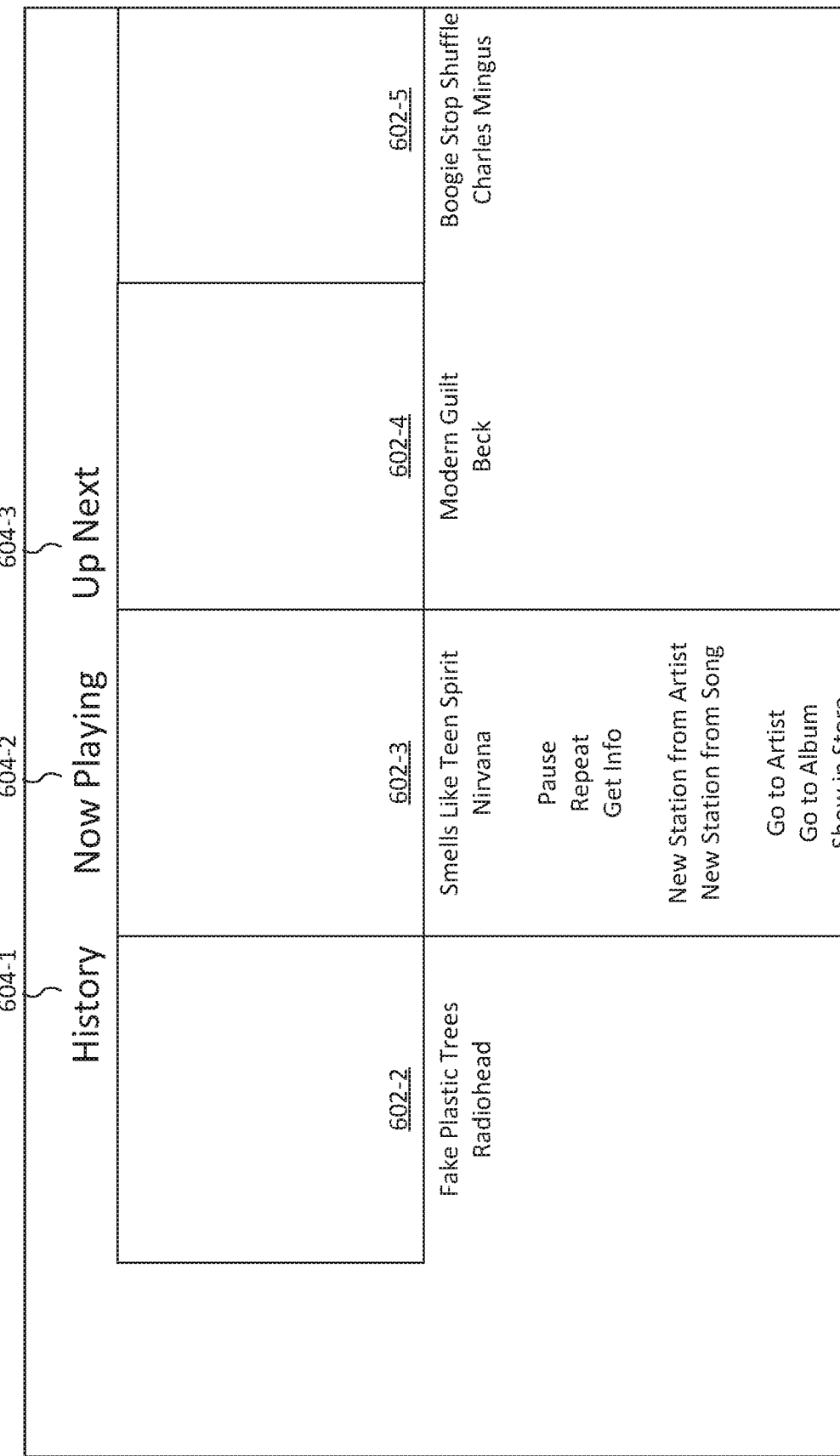
Figure 6V:
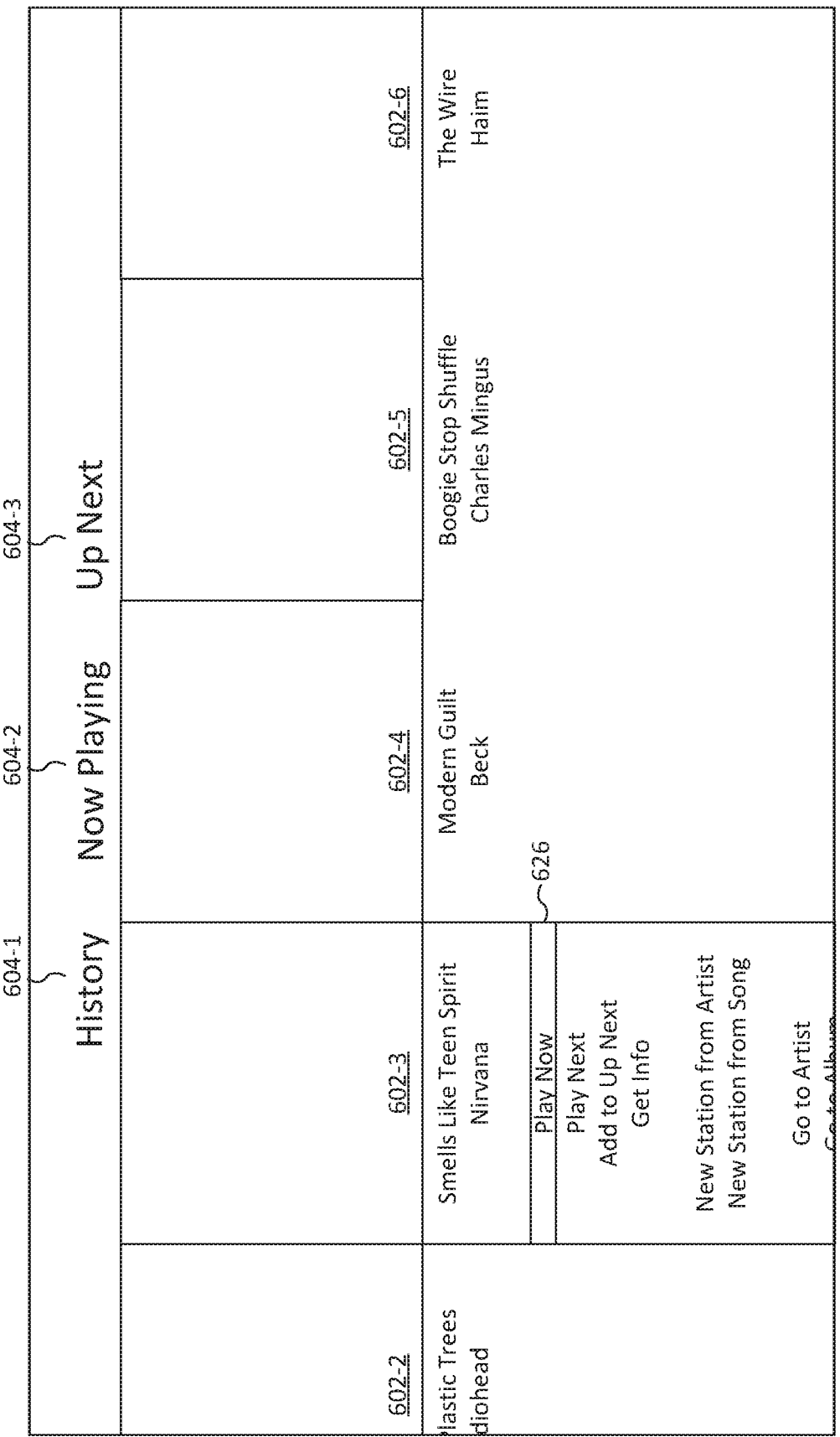
Figure 6W:
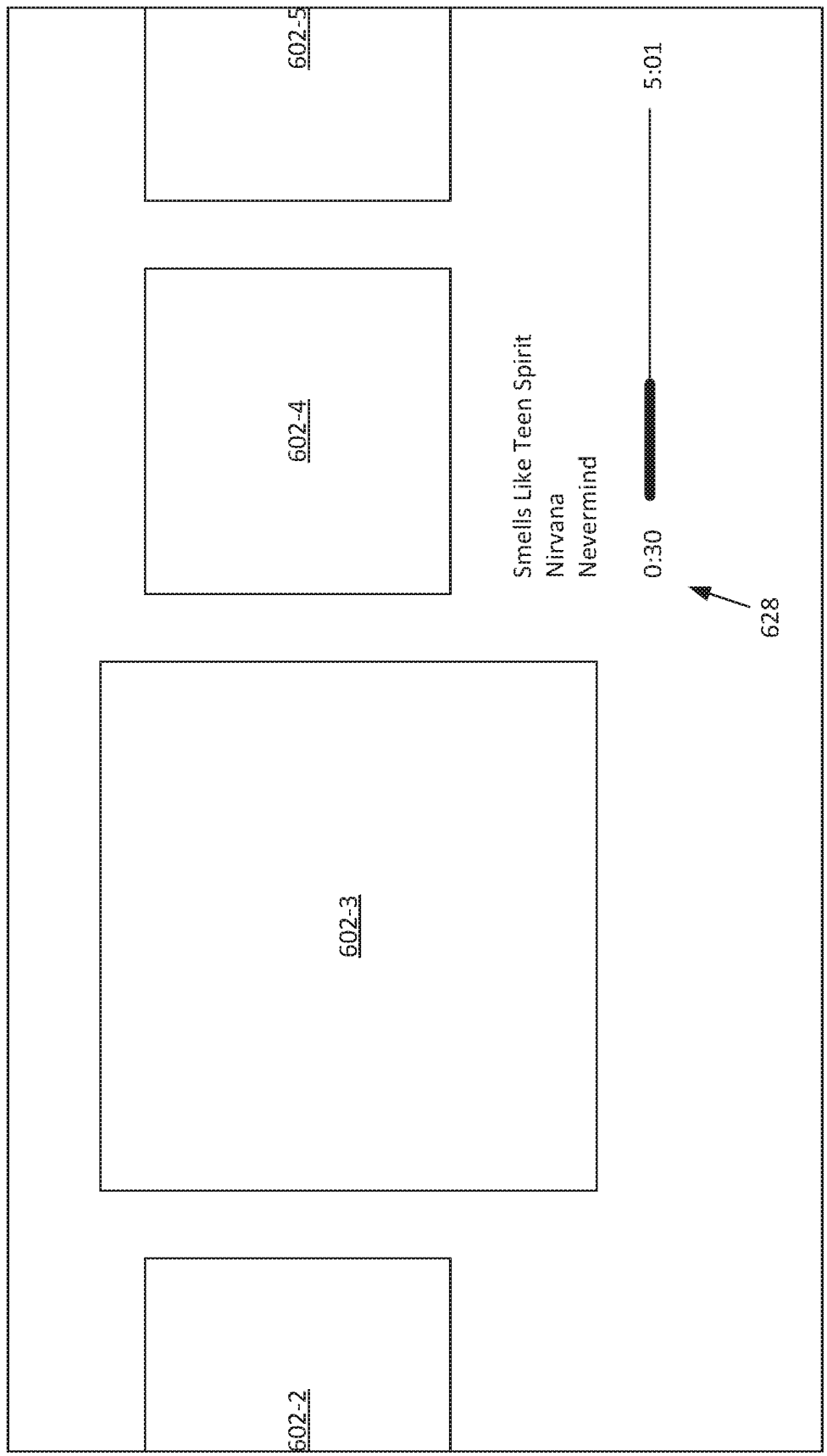
Figure 6Y:
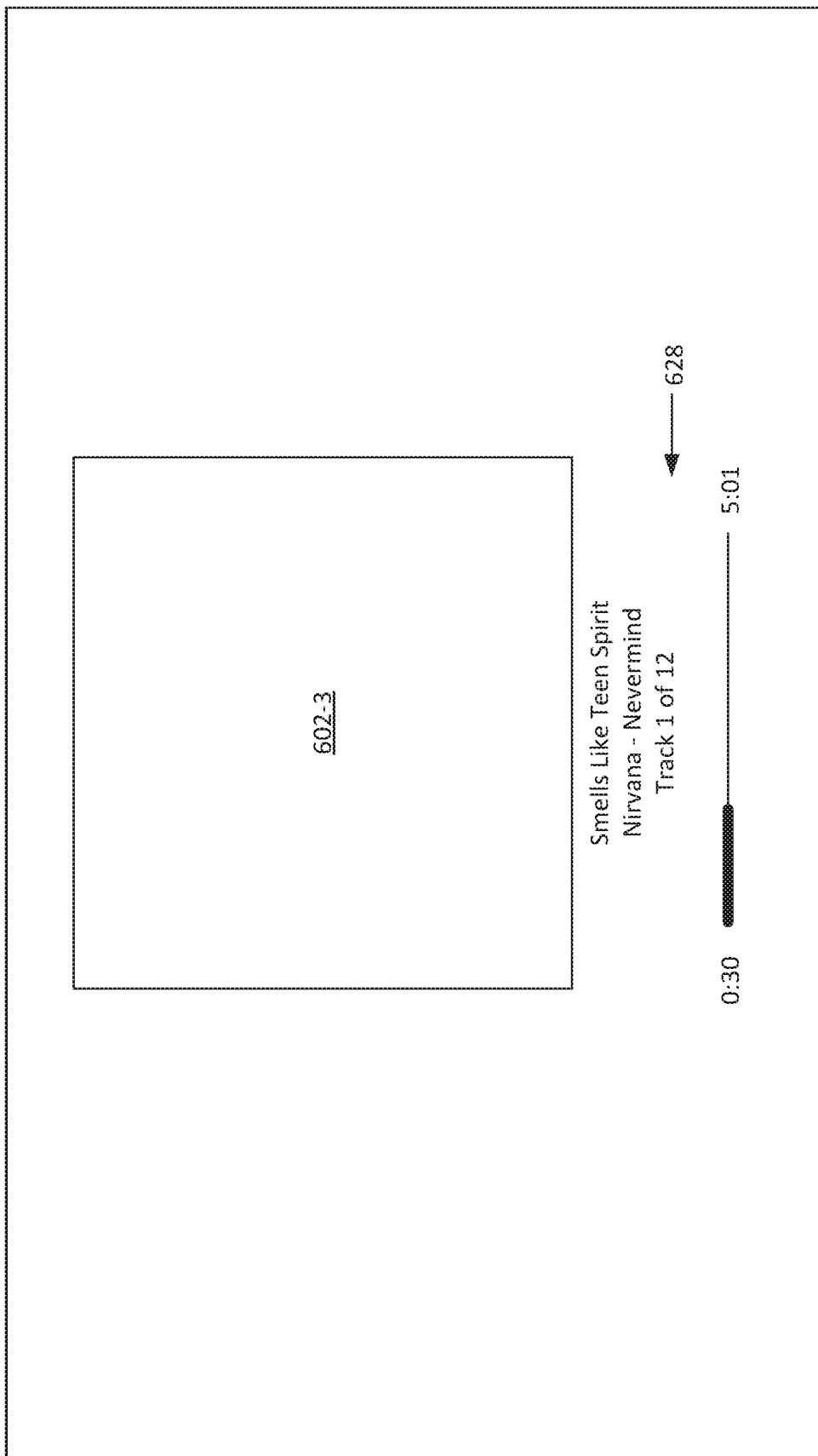
Figure 7A:
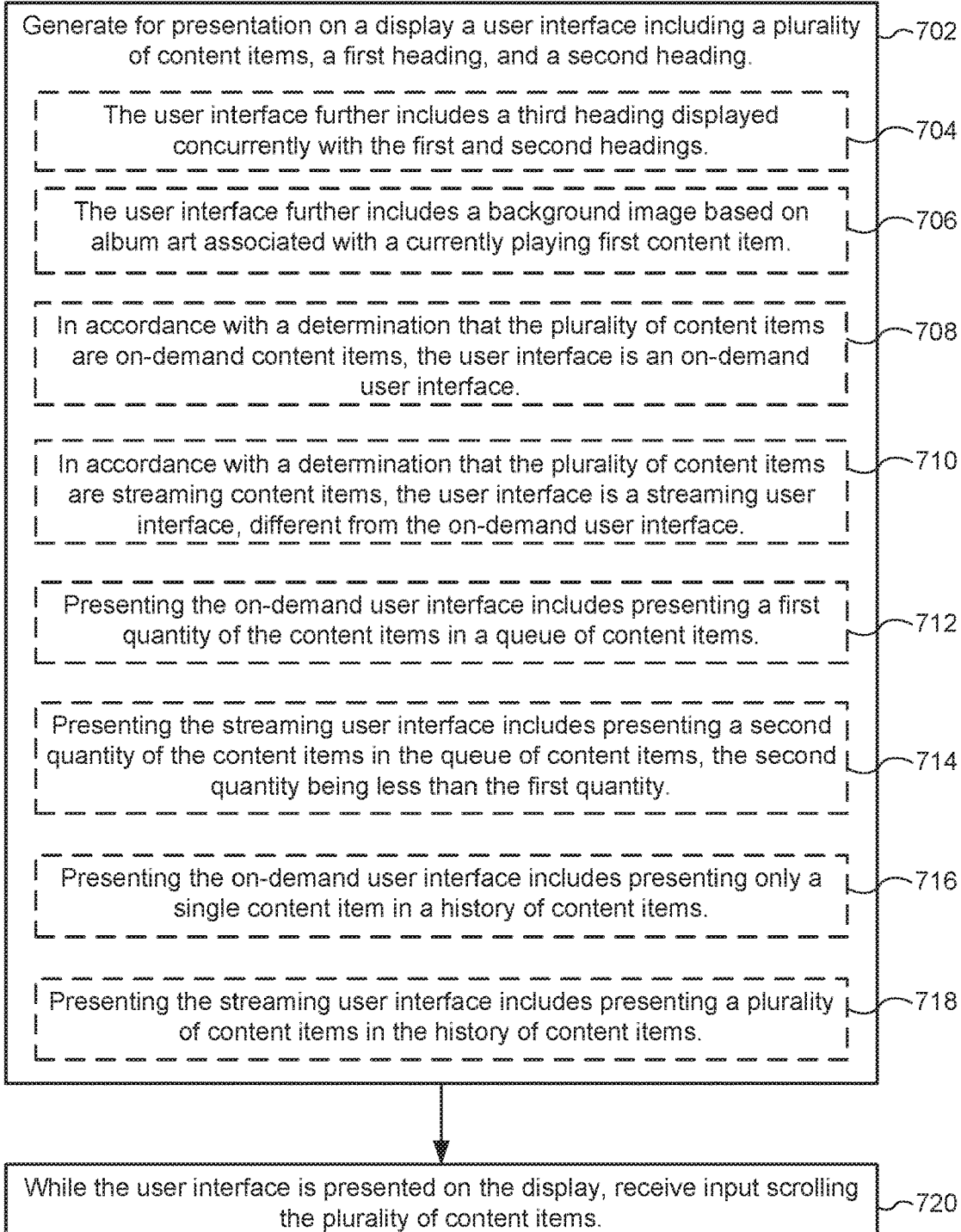
FIGS. 7A-7F are flow diagrams illustrating one or more methods of a content user interface in accordance with some embodiments.
Figure 7B:
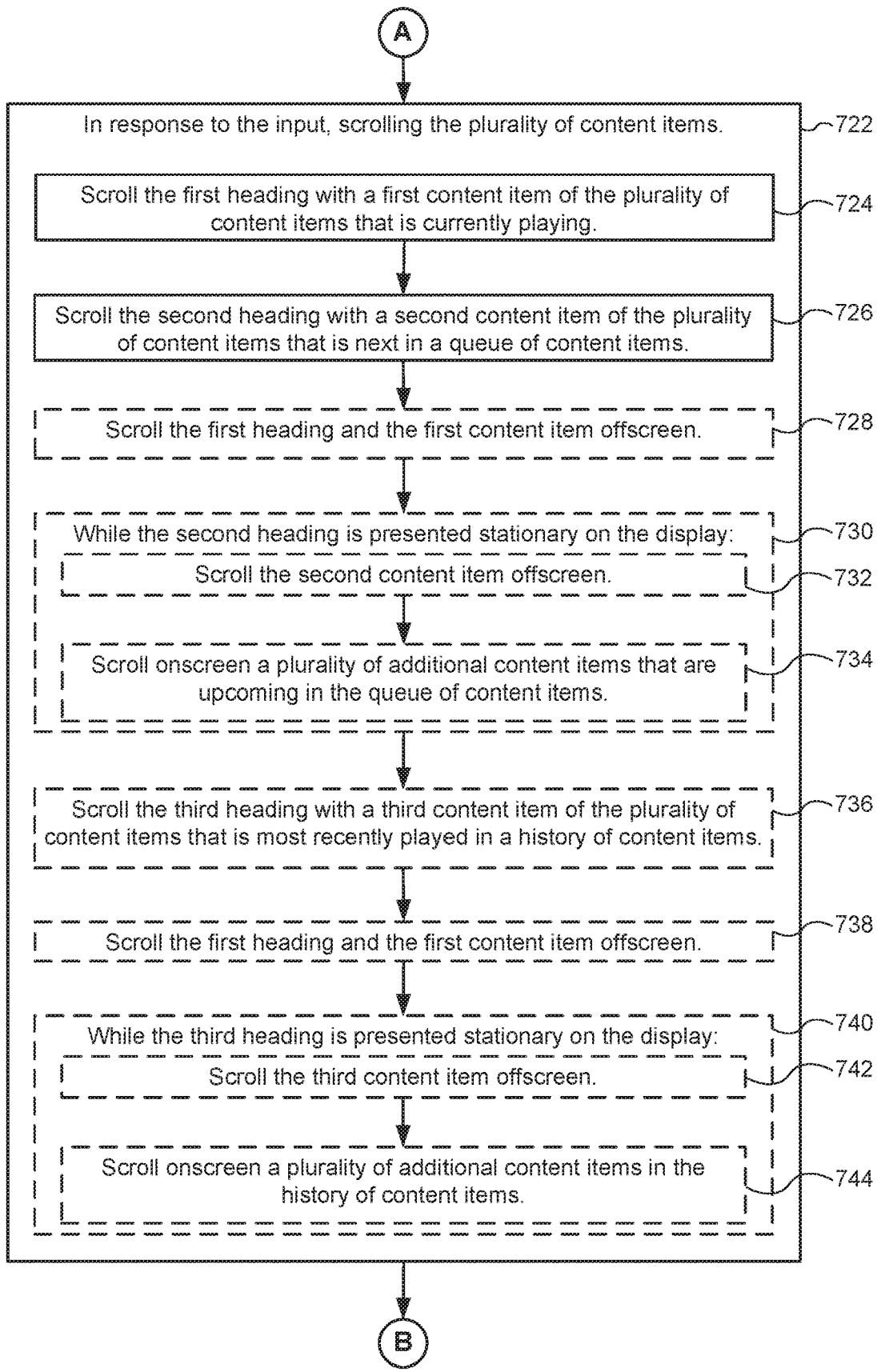
Figure 7C:
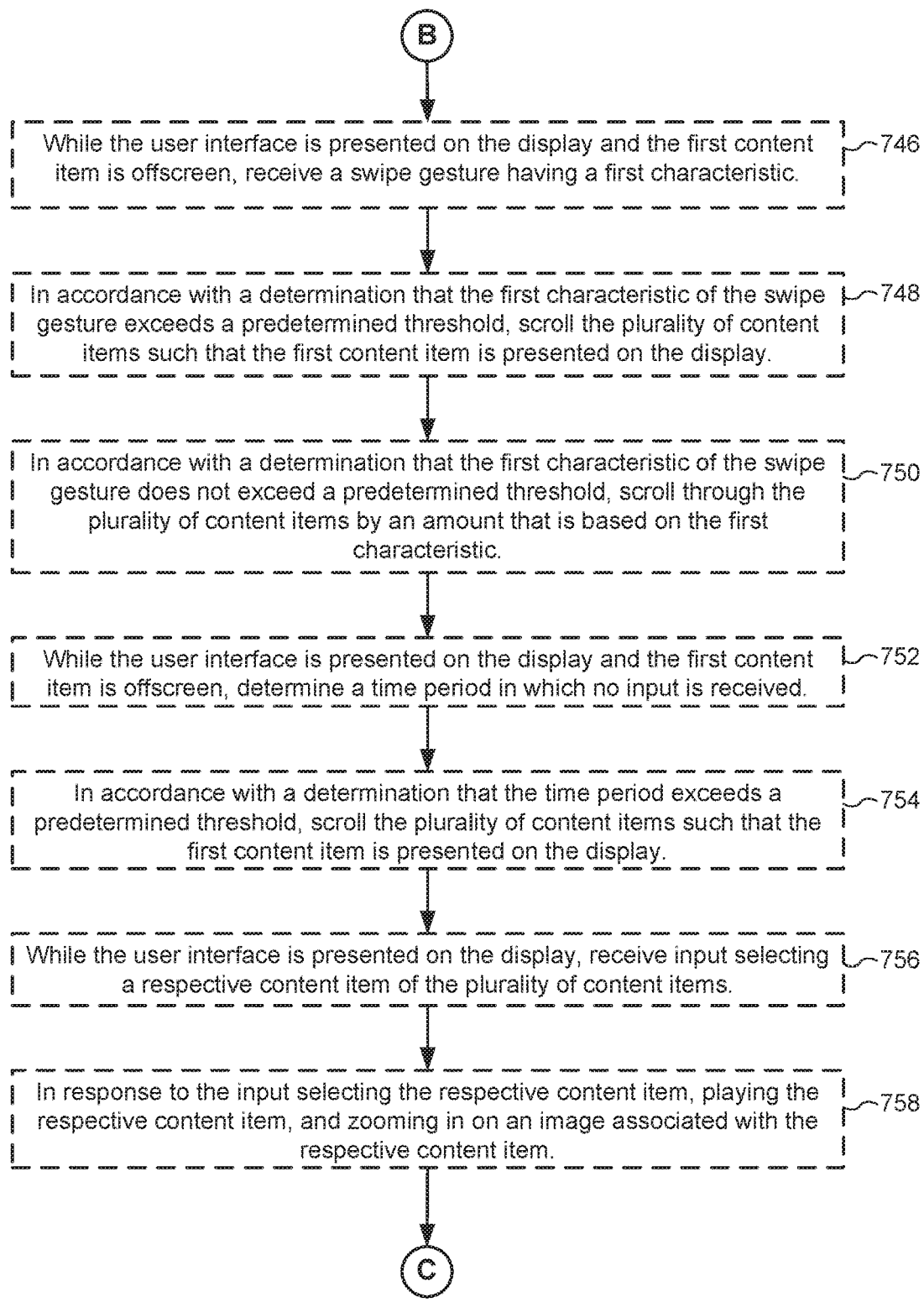
Figure 7D:
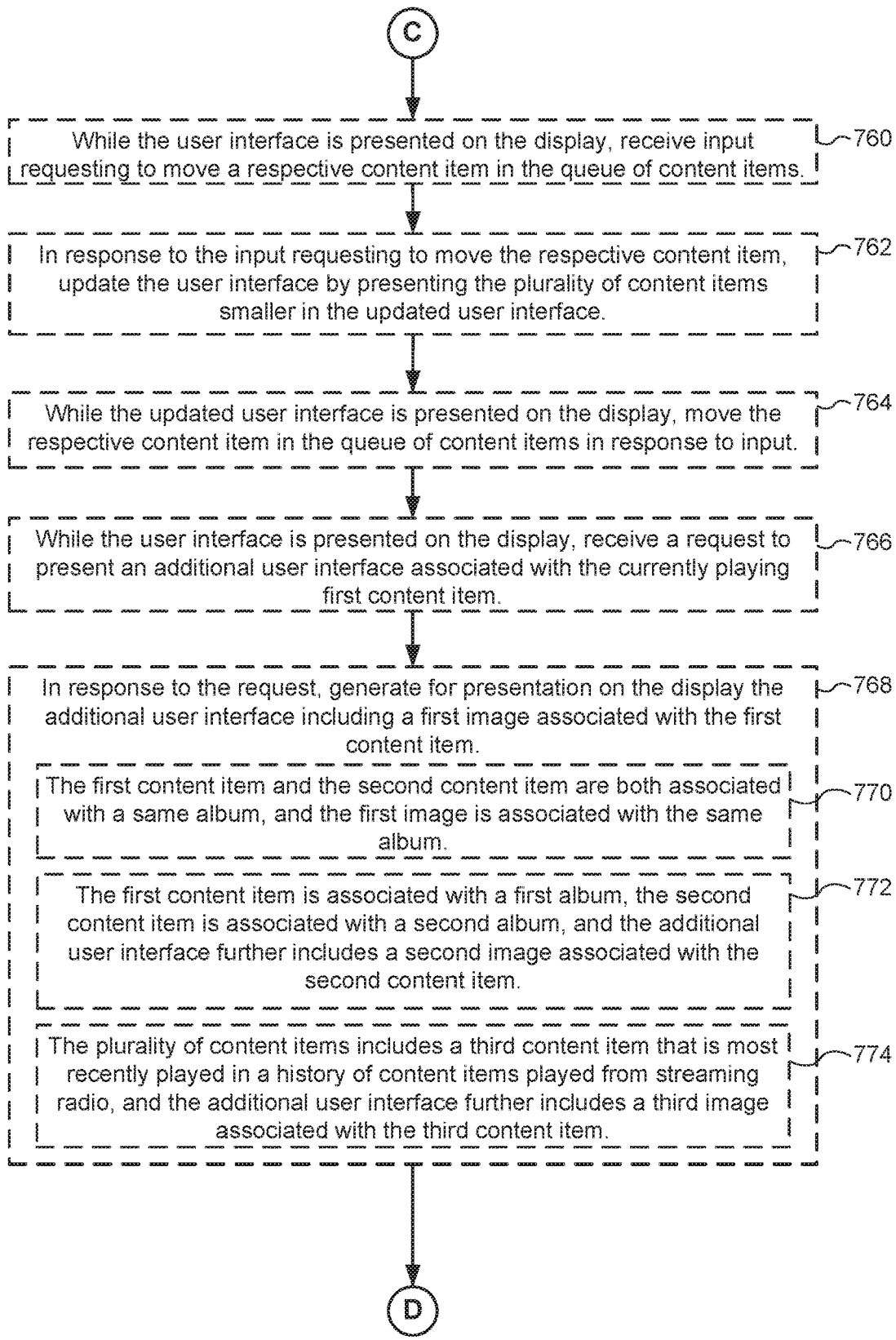
Figure 7E:
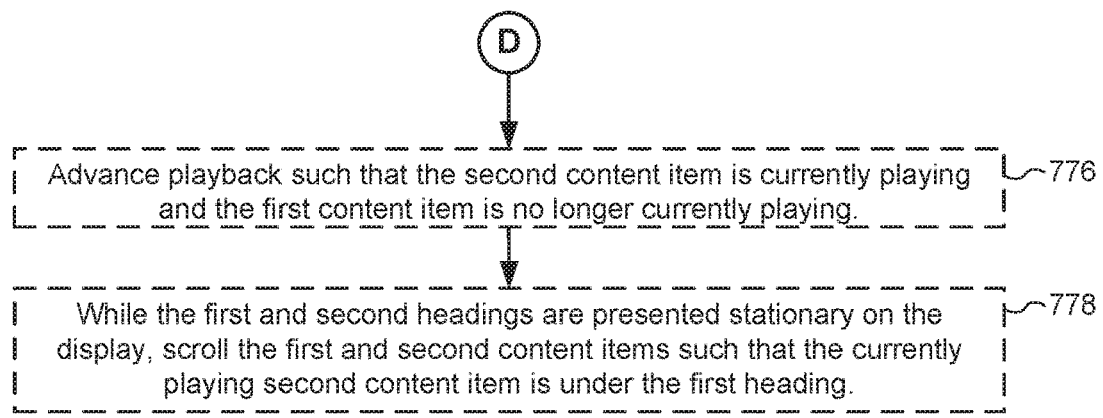
Figure 7F:
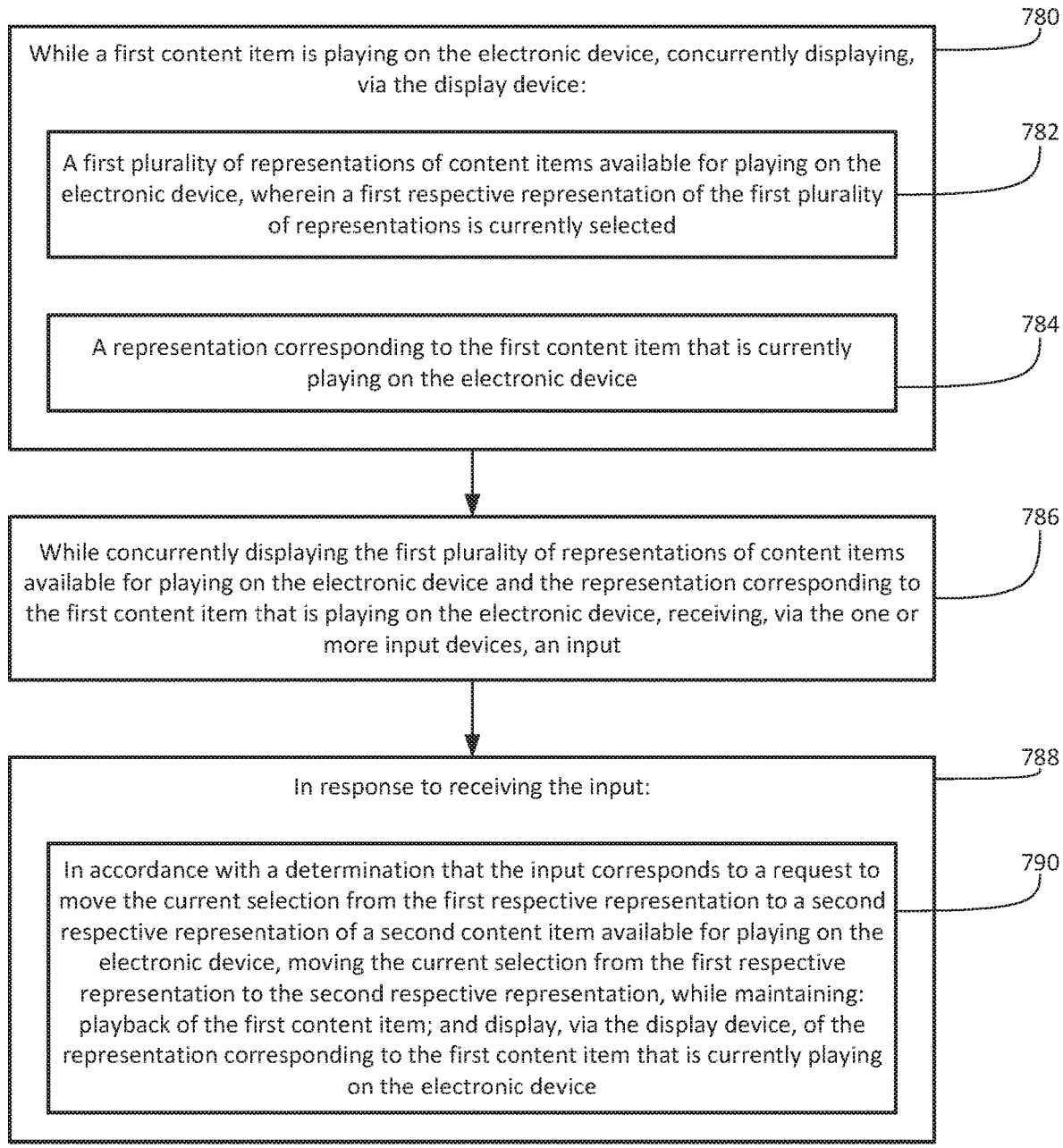

FIGS. 6A-6Y illustrate an exemplary content user interface in accordance with some embodiments of the disclosure. The user interfaces in these figures are used to illustrate the processes described below, including the processes described below with reference to FIGS. 7A-7E.

FIG. 6A illustrates an exemplary content user interface of an electronic device 500, presented on a display (e.g., display 514 of device 500). The content user interface includes a plurality of content items 602-1, 602-2, 602-3, 602-4, and 602-5, each corresponding to a song. The content items illustrated in the figures can each include an image associated with the content item (e.g., the album art 620 in FIG. 6N). The content user interface further includes a "History" heading 604-1, a "Now Playing" heading 604-2, and an "Up Next" heading 604-3. The "History" heading 604-1 is associated with a plurality of content items in a history of content items (e.g., content items 602-1 and 602-2), and the "History" heading is displayed adjacent to the most recently played content item in the history, content item 602-2. The "Now Playing" heading 604-2 is displayed adjacent to the currently playing content item 602-3. The "Up Next" heading 604-3 is associated with a queue of content items (e.g., content items 602-4 and 602-5), and the "Up Next" heading is displayed adjacent to the content item 602-4 that is next in the queue of content items. Content item 602-3 is highlighted, as indicated by selection indicator 606. Information 608 and options 610 related to the content item 602-3 are displayed in a region adjacent to the content item 602-3. In some embodiments, some or all information and/or options are only displayed adjacent to a selected content item, and in some embodiments, limited information (e.g., artist and song title) is displayed for unselected content items, as illustrated in FIG. 6A.

FIGS. 6A-6D illustrate an example in which, as the plurality of content items are scrolled, each of headings 604-1, 604-2, and 604-3 scroll along with their associated content items 602-2, 602-3, and 602-4, respectively. FIGS. 6C-6E illustrate that once the currently playing content item 602-3 and the content items 602-4 and 602-5 in the queue of content items are scrolled off screen, the "History" heading 604-1 remains stationary at the right edge of the display 514 as the user interface scrolls through the history of recently played content items. Similarly, FIGS. 6F-6I illustrate an example in which, once the currently playing content item 602-3 and the content items 602-1 and 602-2 in the history of content items are scrolled off screen, the "Up Next" heading 604-3 remains stationary at the left edge of the display 514 as the user interface scrolls through the queue of upcoming content items. After scrolling away from the currently playing content item, the user interface can skip back to the currently playing content item 602-3 (e.g., in response to a swipe gesture or a period of inactivity), as illustrated in FIG. 6J.

In some embodiments, the "Now Playing" heading 604-2 and the currently playing content item 602-3 remain on screen during scrolling. For example, while scrolling through the upcoming queue of content items, heading 604-2 and content item 602-3 optionally remain stationary on the left edge of the display 514 while the content items in the queue of upcoming content items scroll behind the content item 602-3. Similarly, while scrolling through the history of content items, heading 604-2 and content item 602-3 optionally remain stationary on the right edge of the display 514 while the content items in the history scroll behind the content item 602-3.

FIGS. 6K-6M illustrate advancing playback from the content item 602-3 to the content item 602-4 (e.g., in response to the content item 602-3 reaching the end of its playback or user input skipping the content item 602-3). The headings 604-1, 604-2, and 604-3 remain stationary as the plurality of content items 602-1, 602-2, 602-3, 602-4, and 602-5 scroll such that the no longer playing content item 602-3 is under the "History" heading 604-1 and the newly playing content item 602-4 is under the "Now Playing" heading 604-2, as illustrated in FIG. 6M. FIG. 6N illustrates a background image 622 based on album art 620 associated with the currently playing content item 602-4.

FIGS. 6O-6S illustrate a user interface for moving a content item in the queue of content items. In FIG. 6O, input is received selecting a menu item 624 for moving content item 602-4 in the queue. In response to the input, the plurality of content items 602-5, 602-6, 602-7, 602-8, and 602-9 are presented smaller in an updated user interface illustrated in FIGS. 6P-6R. While the updated user interface is presented, input is received moving the content item 602-4 between content items 602-5 and 602-6 (in FIG. 6Q) and then between content items 602-6 and 602-7 (in FIG. 6R). Returning to the main user interface in FIG. 6S, the new ordering of the queue of content items is represented, with content item 602-4 displayed between content items 602-6 and 602-7.

FIG. 6T illustrates a streaming user interface, including a plurality of content items 602-1 and 602-2 in the history and only a single content item 602-4 in the queue. In contrast, FIG. 6U illustrates an on-demand user interface, including a single content item 602-2 in the history and a plurality of content items 602-4 and 602-5 in the queue. Licensing restrictions for a streaming radio service, for example, optionally prohibit showing more than one or two items in the "Up Next" queue, and the user interfaces optionally differ accordingly, as illustrated in FIGS. 6T and 6U.

FIG. 6V illustrates a selection of a menu item 626 for playing the associated content item 602-3. In response to the selection, playback of the content item 602-3 begins, and an additional user interface is presented with a zoomed in view of the content item 602-3, as illustrated in FIG. 6W. The additional user interface in FIG. 6W includes the currently playing content item 602-3 displayed larger than other content items 602-2, 602-4, and 602-5. The user interface also includes additional information 628, including artist, song title, album title, and playback time information.

FIG. 6X illustrates an additional user interface for content items from streaming radio, including a currently playing content item 602-3, and content items in the history 602-1 and 602-2, without any content items in an upcoming queue. FIG. 6Y illustrates an additional user interface for content items from a playlist including only items from a single album, and thus only one image associated with a content item 602-3 is displayed to reduce redundancy and clutter in the user interface.

FIGS. 7A-7E are flow diagrams illustrating a method of a content user interface in accordance with some embodiments of the disclosure. The method is optionally performed at an electronic device as described above with reference to FIGS. 1A-B and 2-5 (e.g., electronic device 100, 300, or 500, etc.). Some operations in method 700 are, optionally, combined and/or the order of some operations is, optionally, changed.

As described below, the method 700 provides ways in which a device can display a content user interface. The method reduces the cognitive burden on a user when interacting with a user interface on the device by providing an intuitive user interface for selecting content items, thereby creating a more efficient human-machine interface. For battery-operated electronic devices, increasing the efficiency of the user's interaction with the user interfaces conserves power and increases the time between battery charges.

In some embodiments, an electronic device 500 with one or more processors and memory generates (702) for presentation on a display (e.g., a remote display device or a display that is integrated into the electronic device) a user interface including a plurality of content items (e.g., album art associated with individual songs and/or albums or playlists, such as content items 602-1, 602-2, 602-3, 602-4, and 602-5 in FIG. 6A), a first heading (e.g., "Now Playing" heading 604-2 in FIG. 6A), and a second heading (e.g., "Up Next" heading 604-3 in FIG. 6A).

While the user interface is presented on the display, the electronic device receives (720) input scrolling the plurality of content items (e.g., a swipe, a tap, button press, etc.). In response to the input, the electronic device scrolls (722) the plurality of content items including: scrolling (724) the first heading with a first content item of the plurality of content items that is currently playing; and scrolling (726) the second heading with a second content item of the plurality of content items that is next in a queue of content items (e.g., the second content item will play following the first content item that is currently playing). For example, the first content item optionally remains under the first heading during the scrolling, and the second content item optionally remains under the second heading during the scrolling, as illustrated with headings 604-1, 604-2, and 604-3 and corresponding content items 602-2, 602-3, and 602-4, respectively, in FIGS. 6A-6D and 6F.

In some embodiments, scrolling the plurality of content items further includes scrolling (728) the first heading and the first content item offscreen (as illustrated with heading 604-2 and content item 602-3 from FIGS. 6F-6G). While the second heading is presented (730) stationary on the display, the electronic device optionally scrolls (732) the second content item offscreen, and optionally scrolls (734) onscreen a plurality of additional content items that are upcoming in the queue of content items (e.g., the additional content items will play following the second content item). For example, in FIGS. 6F-6I, the content item 602-4 is scrolled offscreen while the heading 604-3 is presented stationary on the left edge of the display 514.

In some embodiments, while the user interface is presented on the display and the first content item is offscreen, the electronic device optionally receives (746) a swipe gesture having a first characteristic (e.g., a finger speed, a duration, etc.). In accordance with a determination that the first characteristic of the swipe gesture exceeds a predetermined threshold, the electronic device optionally scrolls (748) the plurality of content items such that the first content item is presented on the display (e.g., the content items snap back to the currently playing content item). For example, the user interface optionally snaps back to the currently playing content item 602-3, as illustrated in FIG. 6J. In accordance with a determination that the first characteristic of the swipe gesture does not exceed a predetermined threshold, the electronic device optionally scrolls (750) through the plurality of content items by an amount (e.g., a number of content items or a distance on the display) that is based on the first characteristic.

In some embodiments, while the user interface is presented on the display and the first content item is offscreen, the electronic device optionally determines (752) a time period in which no input is received. In accordance with a determination that the time period exceeds a predetermined threshold, the electronic device optionally scrolls (754) the plurality of content items such that the first content item is presented on the display (e.g., the content items snap back to the currently playing content item so that if the user is exploring up next content and then walks away from the display, when the user walks back to the display the now playing content will be displayed). For example, the user interface optionally snaps back to the currently playing content item 602-3, as illustrated in FIG. 6J.

In some embodiments, the user interface further includes (704) a third heading (e.g., "History" heading 604-1) that is displayed concurrently with the first heading (e.g., "Now Playing" heading 604-2) and the second heading (e.g., "Up Next" 604-3) before receiving the input. Scrolling the plurality of content items optionally further includes scrolling (736) the third heading with a third content item of the plurality of content items that is most recently played in a history of content items (e.g., the second content item was played prior to the first content item being played), and scrolling (738) the first heading and the first content item offscreen. While the third heading is presented (740) stationary on the display, the electronic device optionally scrolls (742) the third content item offscreen, and optionally scrolls (744) onscreen a plurality of additional content items in the history of content items (e.g., the additional content items were played before the third content item). For example, in FIGS. 6A-6E, the content item 602-2 is scrolled offscreen while the heading 604-1 is presented stationary on the right edge of the display 514.

In some embodiments, while the user interface is presented on the display, the electronic device optionally receives (756) input selecting a respective content item of the plurality of content items. In response to the input selecting the respective content item, the electronic device optionally plays (758) the respective content item, and optionally zooms in on an image associated with the respective content item. For example, FIG. 6V illustrates a selection of a menu item 626 for playing the associated content item 602-3. An additional user interface is illustrated in FIG. 6W including a zoomed in view of the content item 602-3.

In some embodiments, while the user interface is presented on the display, the electronic device optionally receives (760) input requesting to move a respective content item of the queue of content items (e.g., moving an item in the "Up Next" queue). In response to the input requesting to move the respective content item, the electronic device optionally updates (762) the user interface by presenting the plurality of content items smaller in the updated user interface (e.g., in FIGS. 6O-6P, zooming out on the content items 602-4, 602-5, 602-6, 602-7, 602-8, and 602-9; hiding the "Now Playing" content item 602-3; only presenting the "Up Next" queue of content items; etc.). While the updated user interface is presented on the display, the electronic device optionally moves (764) the respective content item in the queue of content items in response to input (e.g., in FIGS. 6P-6R, moving the respective content item 602-4 left or right in the queue in response to a left or right swipe or button press).

In some embodiments, while the user interface is presented on the display, the electronic device optionally receives (766) a request to present an additional user interface associated with the currently playing first content item. In response to the request, the electronic device optionally generates (768) for presentation on the display the additional user interface including a first image (e.g. content item 602-3 in FIGS. 6W-6Y) associated with the first content item (e.g., the album art for the first content item is displayed larger in the now playing interface than in the queue interface). In some embodiments, the now playing interface includes information about the currently playing content item not included in the queue interface (e.g., the now playing interface optionally includes a current playback time and a total duration of the currently playing content item, as illustrated in FIGS. 6W-6Y).

In some embodiments, the first content item and the second content item are both associated (770) with a same album, and the first image is associated with the same album (e.g., when all the songs in the queue are from the same album, that album art is displayed and no other album art is displayed, as illustrated in FIG. 6Y). In some embodiments, the first content item is optionally associated (772) with a first album, the second content item is optionally associated with a second album (different from the first album), and the additional user interface optionally further includes a second image associated with the second content item (e.g., when the playlist includes content items from multiple albums, the now playing interface optionally includes one or more images showing album art for upcoming songs and/or songs in the history, as illustrated in FIG. 6W).

In some embodiments, the plurality of content items further includes (774) a third content item that is most recently played in a history of content items played from streaming radio (e.g., songs streamed over the Internet or other network in a playlist wherein the precise order and content of the playlist is not chosen by a user of the electronic device and is instead selected by an intelligent algorithm or a remote user such as a disc jockey (DJ)), and the additional user interface optionally further includes a third image associated with the third content item (e.g., when the content items are from a streaming radio station/playlist, the now playing interface optionally includes one or more images showing album art for songs in the history). In some embodiments, the now playing interface for streaming radio optionally does not include upcoming songs due to contractual obligations (as illustrated in FIG. 6X), although some embodiments optionally include upcoming songs for streaming radio. In some embodiments, the now playing interface for streaming radio optionally includes a purchase price for the currently playing content item.

In some embodiments, the user interface further includes (706) a background image based on album art associated with the currently playing first content item (e.g., the album art is optionally zoomed in such that portions of the album art are not visible onscreen, as with the background image 622 in FIG. 6N, and/or some or all of the album art is optionally blurred or otherwise visually distorted, etc.). This provides a subtle cue as to the current audio that is playing, and optionally changes as the audio that is playing changes. In some embodiments, the album art in the background image optionally changes to album art associated with the second content item as playback advances to the second content item. In some embodiments, the album art is used as the background even when the content items are scrolled so that the first content item is no longer displayed in the user interface.

In some embodiments, the electronic device advances (776) playback such that the second content item is currently playing and the first content item is no longer currently playing, and, while the first and second headings are presented stationary on the display, the electronic device optionally scrolls (778) the first and second content items such that the currently playing second content item is under the first heading (and, optionally, changing a background image including album art associated with the first content item to album art associated with the second content item). Thus, in some embodiments, when a first song that is currently playing ends and a second song (that is after the first song) starts playing, the content items shift over while the headers remain in place (e.g., because the first song is no longer a now playing song and thus is moved to the history section, while the next song is now a now playing song and is removed from the up next section). For example, FIGS. 6K-6M illustrate advancing playback from the content item 602-3 to the content item 602-4, as both content items scroll while the headings 604-1, 604-2, and 604-3 remain stationary.

In some embodiments, in accordance with a determination that the plurality of content items are on-demand content items, the user interface is optionally (708) an on-demand user interface (e.g., a user of the device has requested to play content from a media library of the user such as a media database that includes locally stored content). In accordance with a determination that the plurality of content items are streaming content items, the user interface is optionally (710) a streaming user interface (e.g., the user of the device has requested to play streaming audio such as from a subscription music service such as internet radio or on-demand streaming audio), different from the on-demand user interface.

In some embodiments, presenting the on-demand user interface on the display includes presenting (712) a first quantity of the content items in the queue of content items, and presenting the streaming user interface on the display optionally includes (714) presenting a second quantity of the content items in the queue of content items, the second quantity being less than the first quantity. For example, licensing restrictions for a streaming radio service optionally prohibit showing more than one or two items in the "Up Next" queue, and the user interfaces optionally differ accordingly. FIG. 6T illustrates a streaming user interface including a single content item 602-4 in an "Up Next"

queue, whereas FIG. 6U illustrates an on-demand user interface with a plurality of content items 602-4 and 602-5 in the queue.

In some embodiments, presenting the on-demand user interface on the display includes presenting (716) only a single content item in a history of content items (with more content items in the history optionally presented in response to scrolling), and presenting the streaming user interface on the display optionally includes (718) presenting a plurality of content items in the history of content items. For example, licensing restrictions for a streaming radio service optionally prohibit showing more than one or two items in the "Up Next" queue, so the streaming radio user interface can show more of the history. FIG. 6T illustrates a streaming user interface including a plurality of content items 602-1 and 602-2 in the history, whereas FIG. 6U illustrates an on-demand user interface with only a single content item 602-2 in the history (e.g., for an on-demand audio stream, the upcoming tracks are all known while for a streaming radio user interface, frequently only one or two upcoming tracks are known).

In some embodiments, while a first content item is playing on an electronic device in communication with a display device and one or more input devices, the electronic device concurrently displays (780), via the display device, a first plurality of representations of content items available for playing on the electronic device, wherein a first respective representation of the first plurality of representations is currently selected (782), and a representation corresponding to the first content item that is currently playing on the electronic device (784). In some embodiments, while concurrently displaying the first plurality of representations of content items available for playing on the electronic device and the representation corresponding to the first content item that is playing on the electronic device, the electronic device receives (786), via the one or more input devices, an input. In some embodiments, in response to receiving the input (788), in accordance with a determination that the input corresponds to a request to move the current selection from the first respective representation to a second respective representation of a second content item available for playing on the electronic device, the electronic device moves (790) the current selection from the first respective representation to the second respective representation, while maintaining playback of the first content item, and display, via the display device, of the representation corresponding to the first content item that is currently playing on the electronic device.

The operations in the information processing methods described above are, optionally, implemented by running one or more functional modules in an information processing apparatus such as general purpose processors (e.g., as described above with respect to FIGS. 1A and 3) or application specific chips.

The operations described above with reference to FIGS. 7A-7E are, optionally, implemented by components depicted in FIGS. 1A-1B. For example, generating operation 702, receiving operation 720, scrolling operation 722, scrolling operation 724, and scrolling operation 726 are, optionally implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

It should be understood that the particular order in which the operations in FIGS. 7A-7E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 900) are also applicable in an analogous manner to method 700 described above with respect to FIGS. 7A-7E. For example, the user interfaces, user interface objects, queue, history, headings, regions, album art, content items, information, menu items, and electronic devices described above with reference to method 700 optionally have one or more of the characteristics of the user interfaces, user interface objects, queue, history, headings, regions, album art, content items, information, menu items, and electronic devices described herein with reference to other methods described herein (e.g., method 900). For brevity, these details are not repeated here.

Simplified Content User Interface

Many electronic devices provide cluttered and unintuitive user interfaces for viewing and selecting content. There is a need to provide an intuitive way to cleanly and simply display and navigate among content items in a queue of upcoming items and a history of recently played items (e.g., songs in an album, playlist, or streaming radio). The embodiments described below provide a fast, efficient, and convenient way for users to navigate through and select various content items for consumption by hiding information and menu items for unselected content items.

FIGS. 8A-8L illustrate an exemplary simplified content user interface in accordance with some embodiments of the disclosure. The user interfaces in these figures are used to illustrate processes described below, including the processes described below with reference to FIGS. 9A-9E.

Figure 8A:
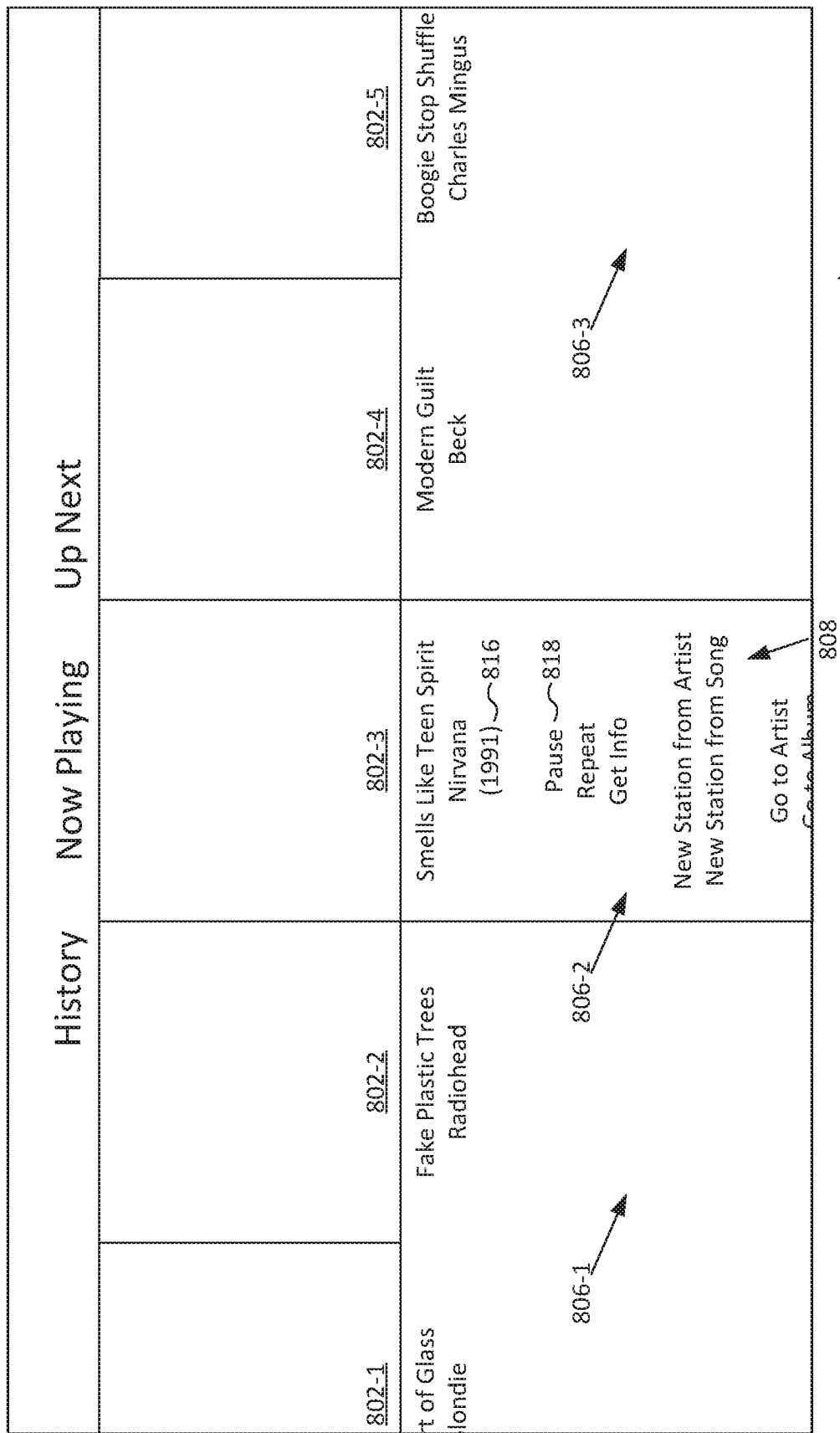

FIG. 8A illustrates an exemplary simplified content user interface of an electronic device 500, presented on a display (e.g., display 514 of device 500). The simplified content user interface includes user interface objects 802-1, 802-2, 802-3, 802-4, and 802-5, each corresponding to a content item (e.g., a song, a movie, etc.). User interface object 802-2 is displayed adjacent to the associated region 806-1, user interface object 802-3 is displayed adjacent to the associated region 806-2, and user interface object 802-5 is displayed adjacent to the associated region 806-3. Information associated with the user interface object is displayed in the associated region when the user interface object is selected.

Figure 8C:
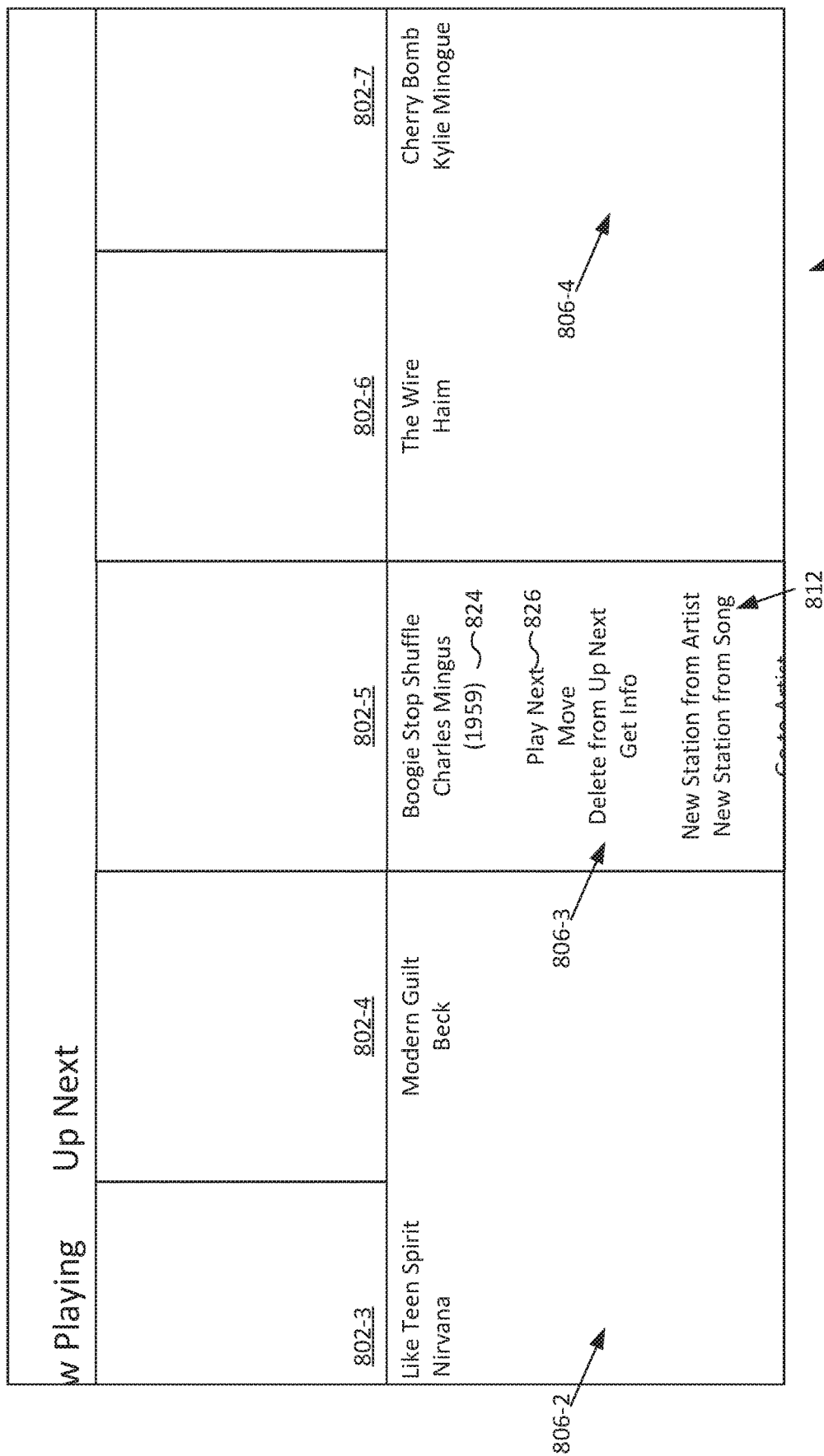

For example, user interface object 802-3 is selected in FIG. 8A, and information 808 associated with the user interface object 802-3 is displayed in the associated region 806-2. In FIG. 8B, user interface object 802-2 is selected, information 810 associated with the selected user interface object 802-2 is displayed in the associated region 806-1, and the information 808 is no longer displayed in region 806-2. In FIG. 8C, user interface object 802-5 is selected, information 812 associated with the selected user interface object 802-5 is displayed in the associated region 806-3, and the information 810 is no longer displayed in region 806-1. In FIG. 8D, user interface object 802-7 is selected, information 814 associated with the selected user interface object 802-7 is displayed in the associated region 806-4, and the information 812 is no longer displayed in region 806-3.

In FIGS. 8A-8C, the information displayed when a user interface object is selected includes both selectable menu items and non-selectable information associated with the user interface object. For example, non-selectable release dates 816, 820, and 824 are displayed for associated user interface objects 802-3, 802-2, and 802-5, respectively. In addition, selectable menu items "Pause" 818, "Add to Up Next" 822, and "Move" 826 are displayed for associated user interface objects 802-3, 802-2, and 802-5, respectively. In some embodiments, selectable items are different based on the particular user interface objects. For example, user interface object 802-3 is a currently playing content item, so the menu item "Pause" 818 is displayed when it is selected. User interface object 802-2 is in a history of recently played content items, so the menu item "Add to Up Next" 822 is displayed when it is selected to allow the user to play the song again. User interface object 802-5 is in a queue of upcoming content items, so the menu item "Move" 826 is displayed when it is selected to allow the user to move the position of the song within the queue.

Figure 8E:
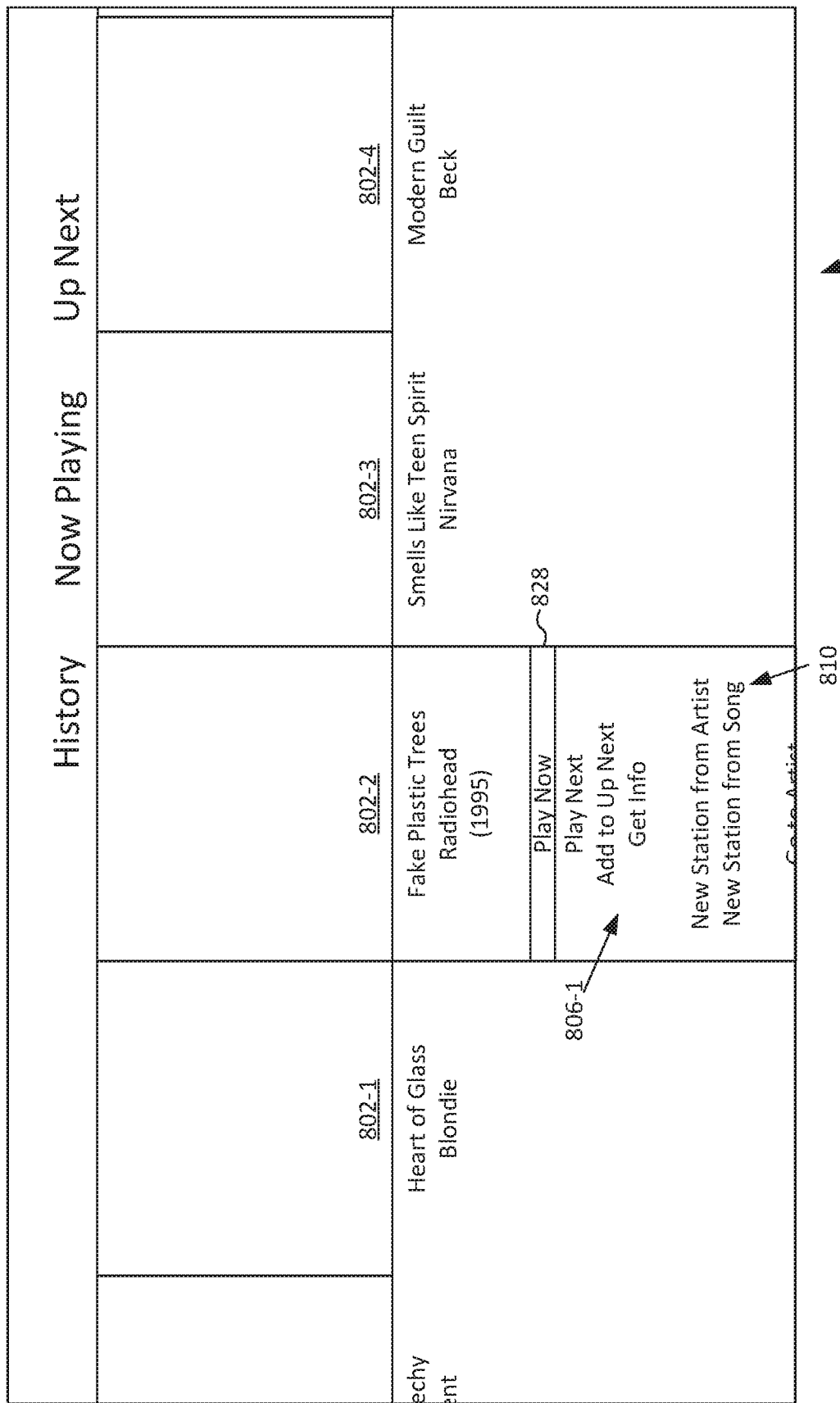
Figure 8G:
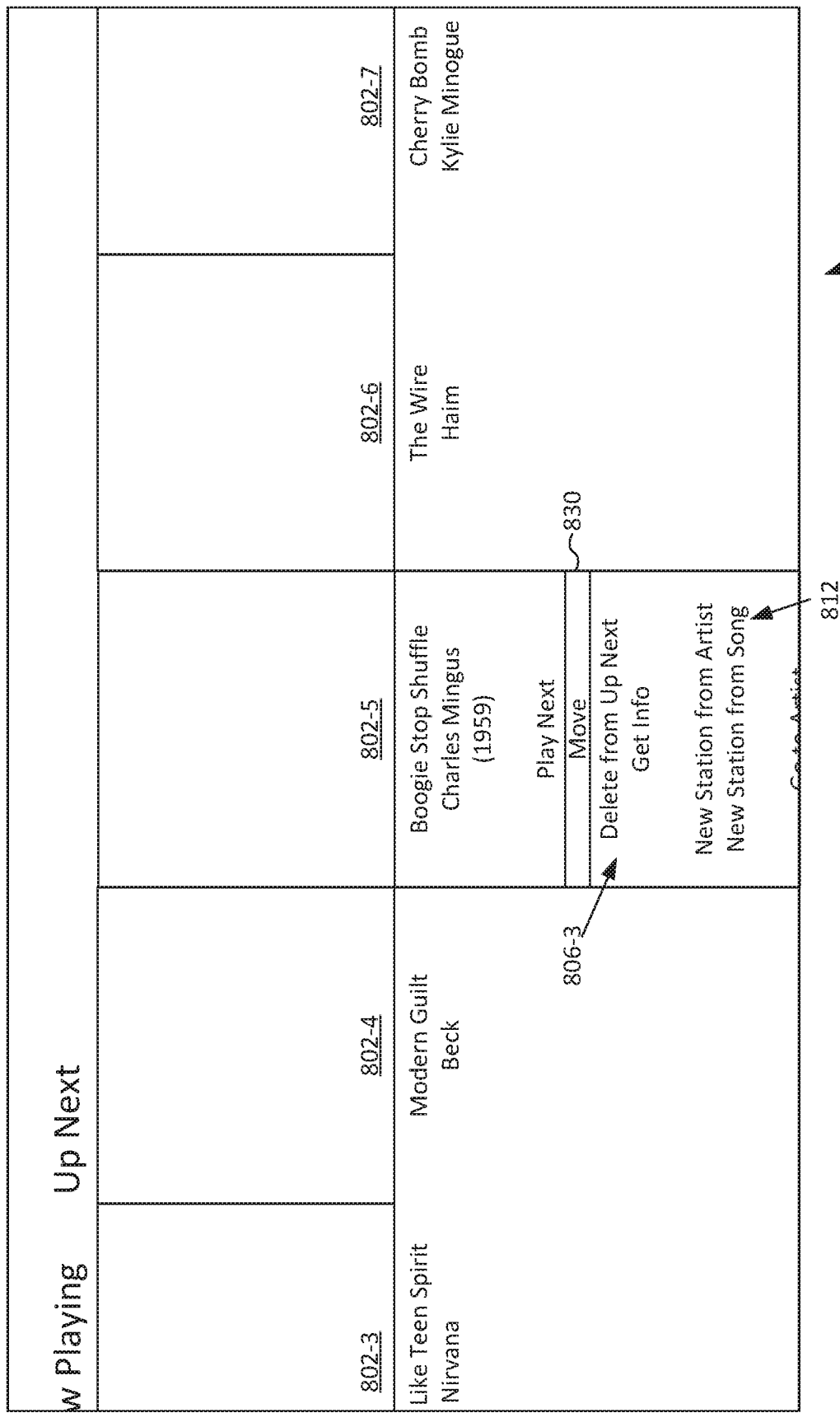
Figure 8H:

As illustrated in FIGS. 8E-8H, selectable menu items include text describing actions to be performed with respect to the selected content item. For example, in FIG. 8E, menu item "Play Now" 828 is selectable to play a content item associated with the selected user interface object 802-2 (as illustrated in FIG. 8F). In FIG. 8G, menu item "Move" 830 is selectable to move a content item associated with the selected user interface object 802-5 within the queue of content items (as illustrated in FIG. 8H).

Figure 8J:
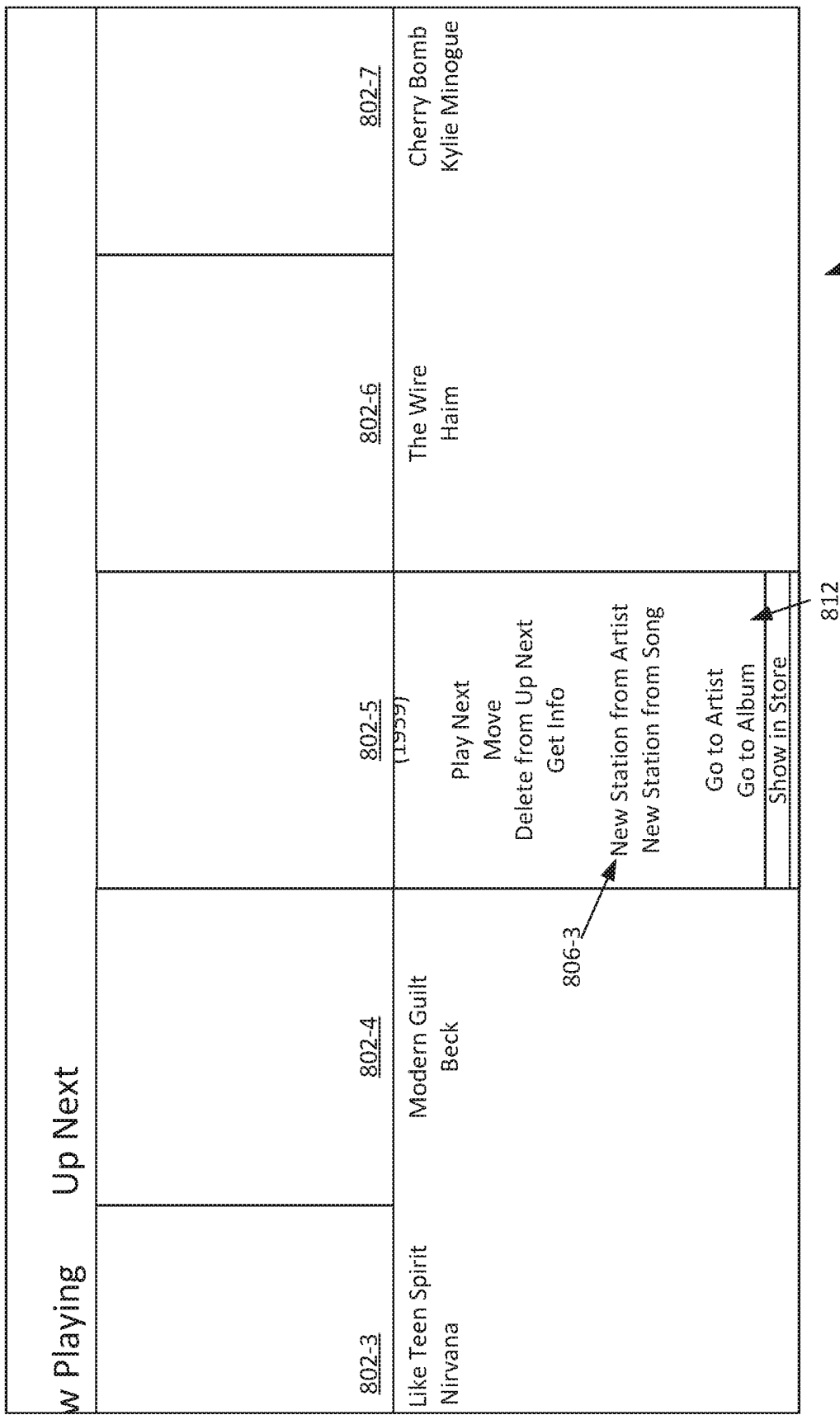
Figure 9A:
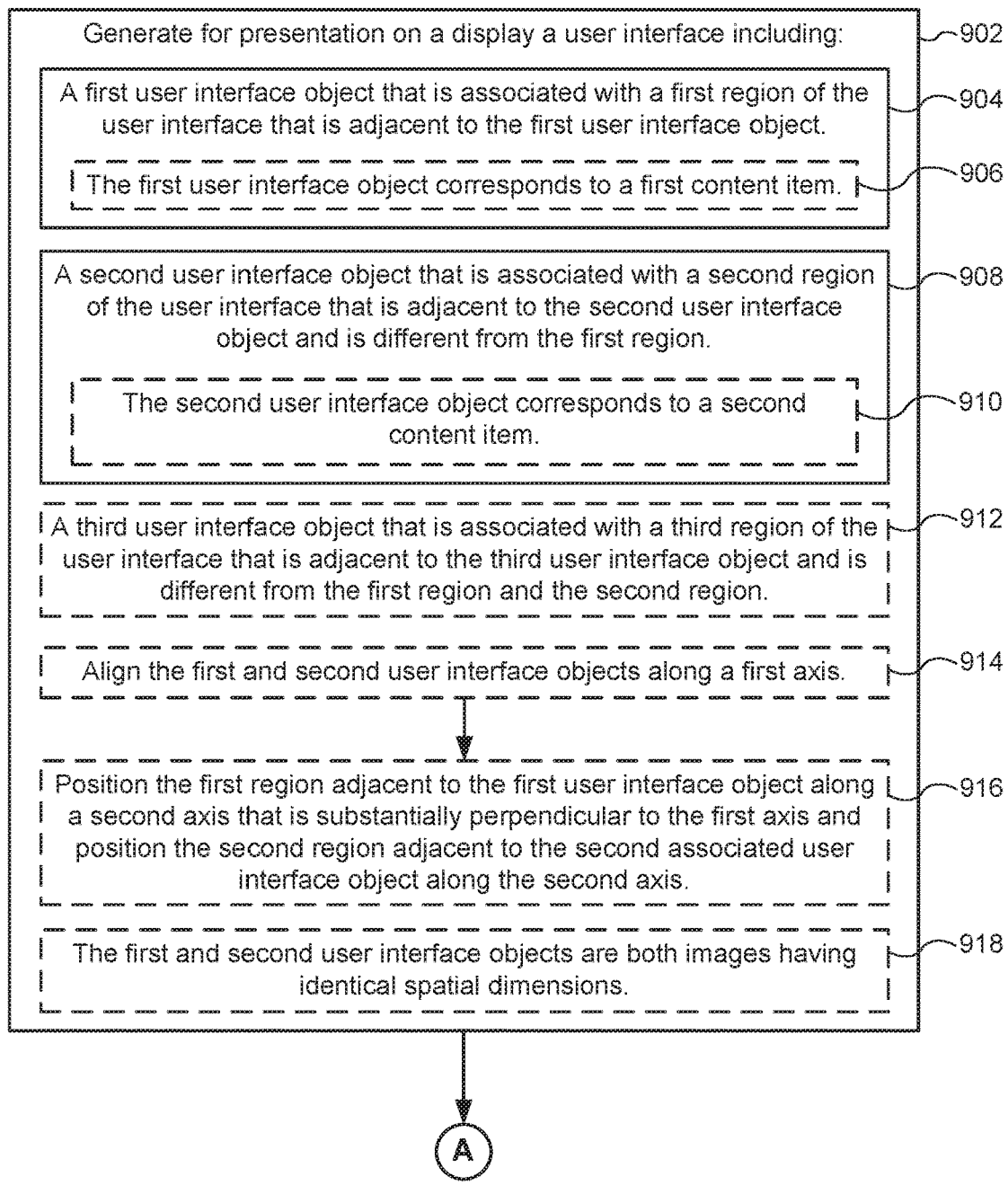
FIGS. 9A-9E are flow diagrams illustrating a method of a simplified content user interface in accordance with some embodiments.
Figure 9B:
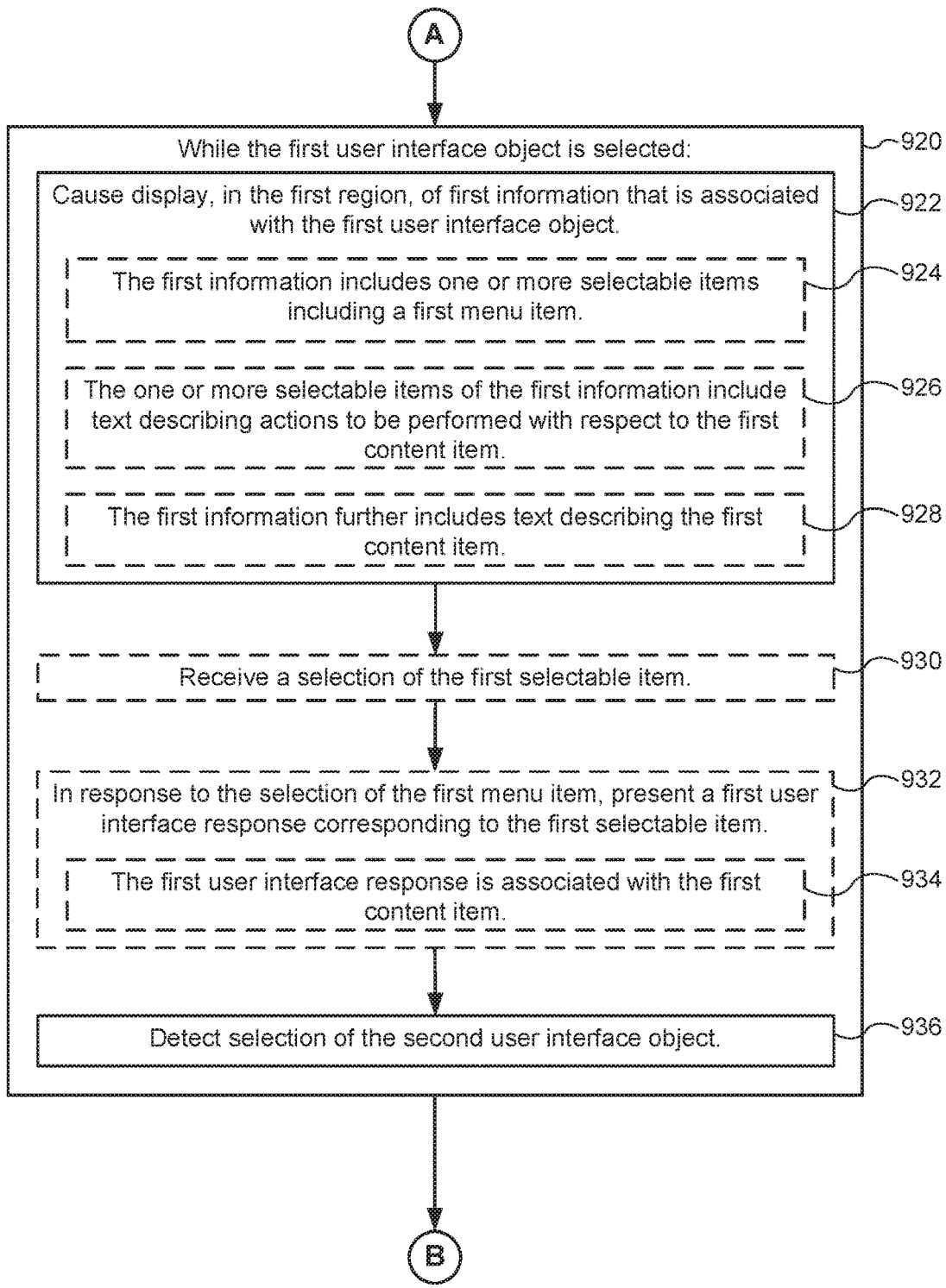
Figure 9C:
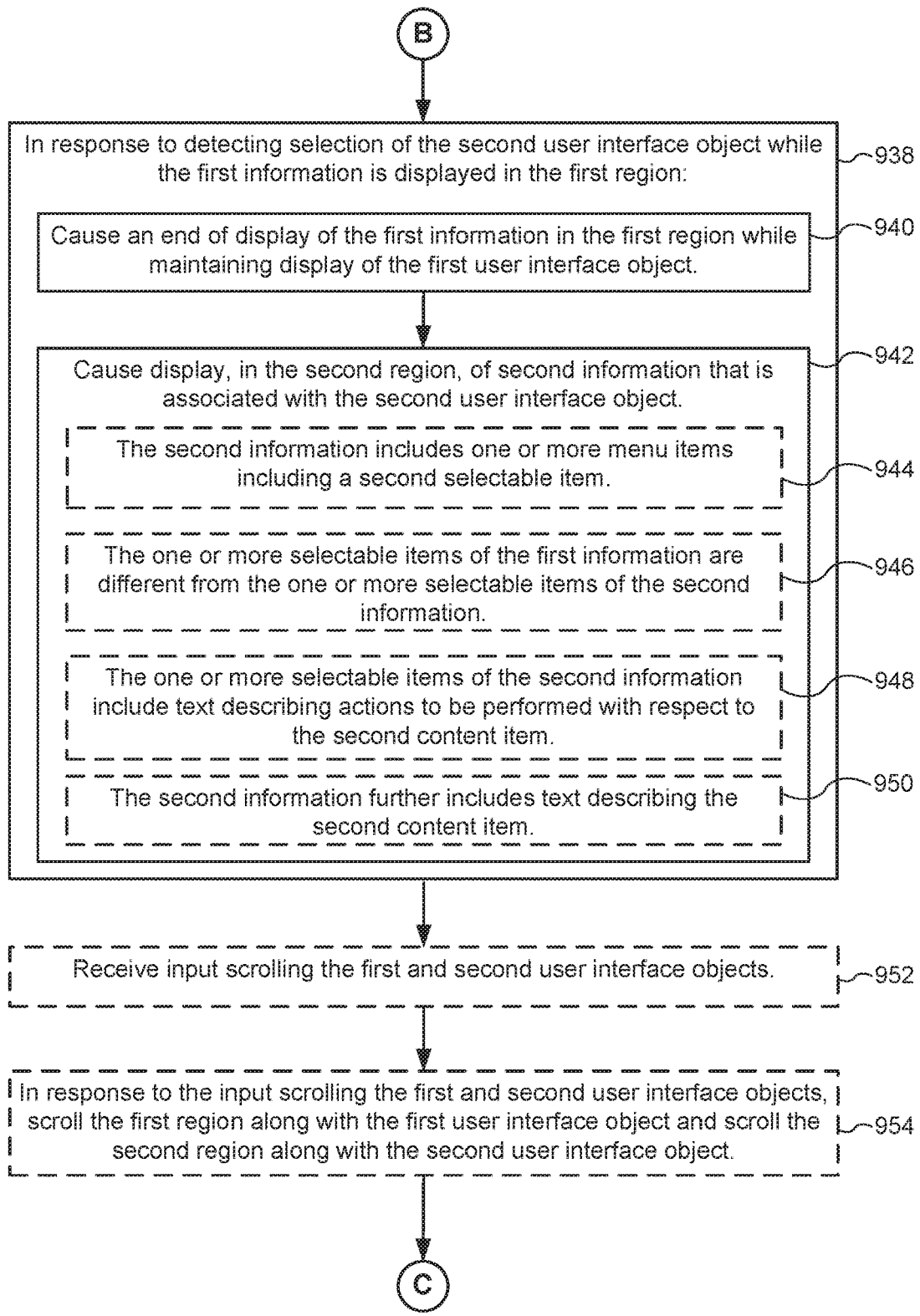
Figure 9D:
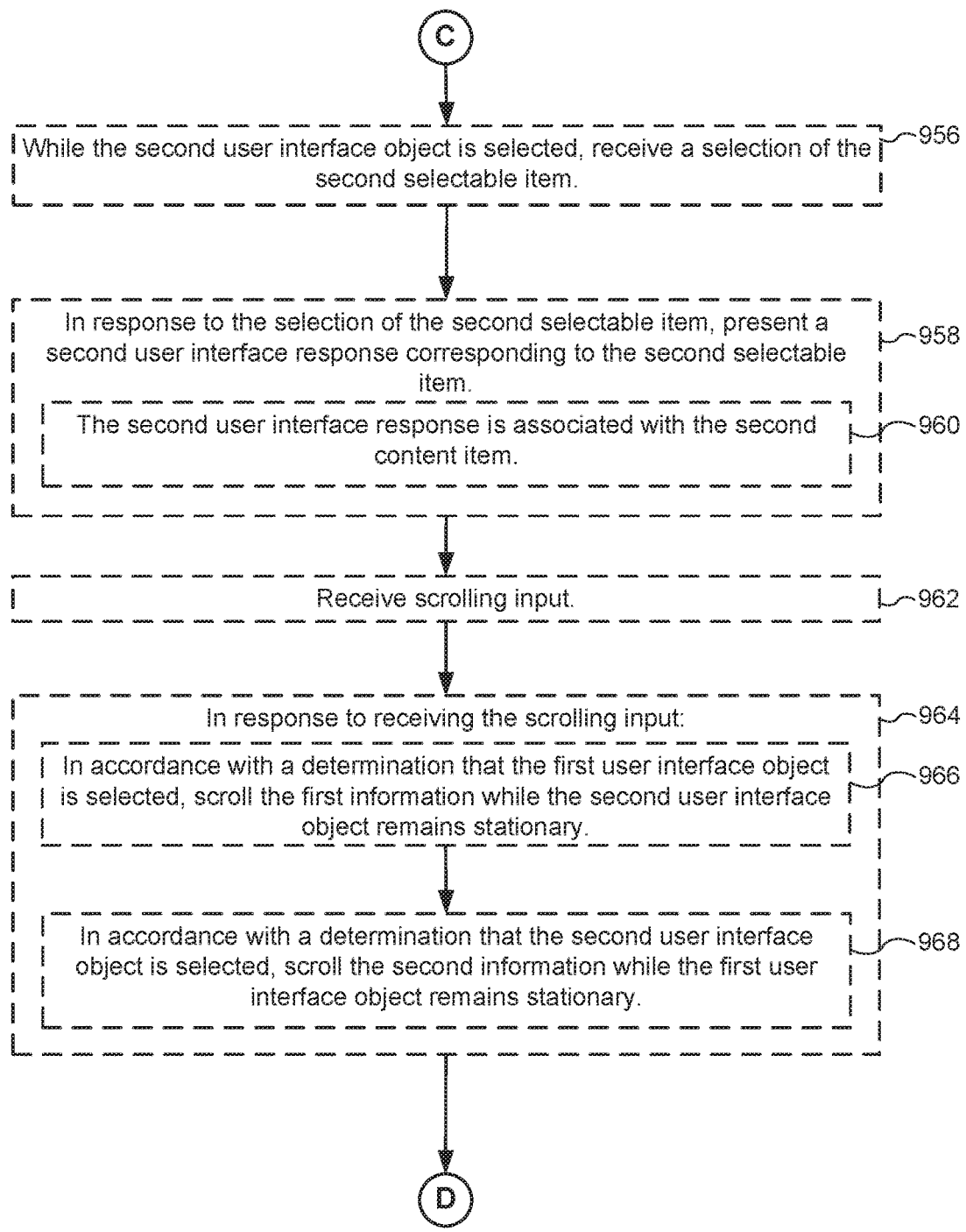
Figure 9E:
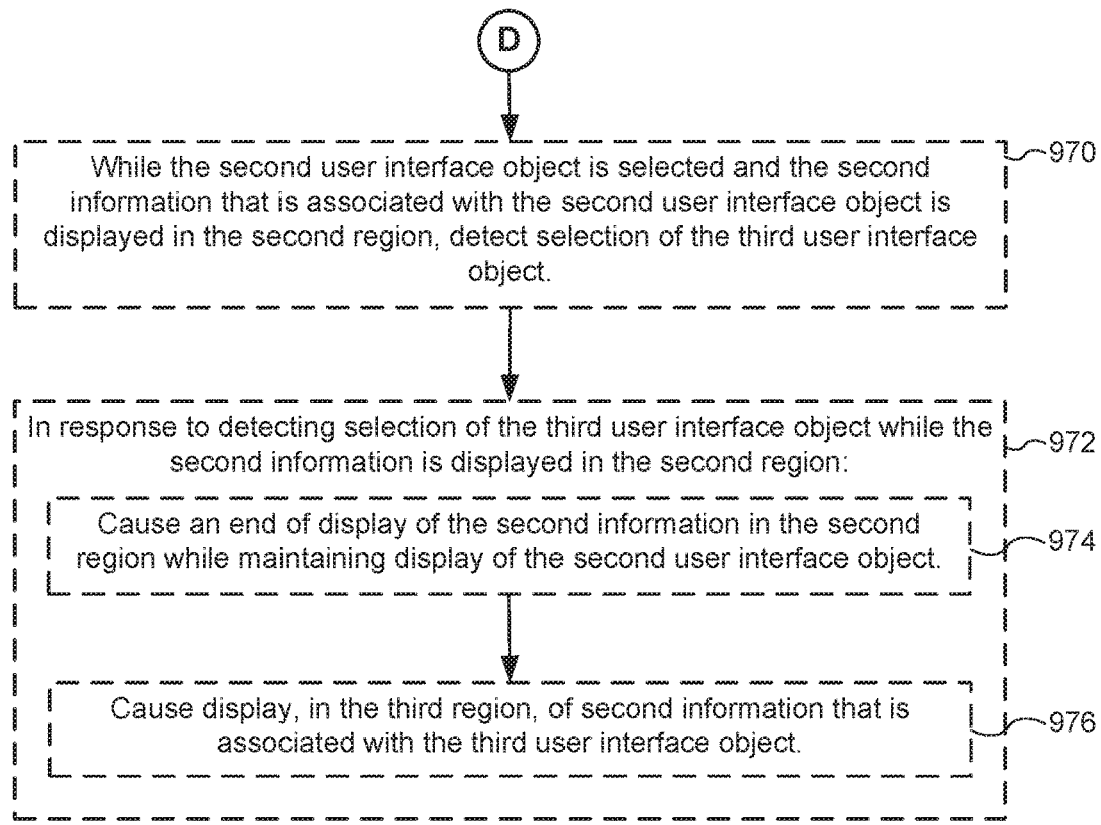

FIGS. 8I-8L illustrate scrolling information associated with user interface objects. For example, FIGS. 8I and 8J illustrate scrolling the information 812 associated with selected user interface object 802-5 while the user interface object 802-7 remains stationary. Similarly, FIGS. 8K and 8L illustrate scrolling the information 814 associated with selected user interface object 802-7 while the user interface object 802-5 remains stationary.

FIGS. 9A-9E are flow diagrams illustrating a method of a simplified content user interface in accordance with some embodiments. The method is optionally performed at an electronic device as described above with reference to FIGS. 1-5 (e.g., electronic device 100, 300, or 500, etc.). Some operations in method 900 are, optionally, combined and/or the order of some operations is, optionally, changed.

As described below, the method 900 provides a simplified content user interface. The method reduces the cognitive burden on a user when interacting with a user interface on the device by providing an intuitive user interface for selecting content items, thereby creating a more efficient human-machine interface. For battery-operated electronic devices, increasing the efficiency of the user's interaction with the user interfaces conserves power and increases the time between battery charges.

In some embodiments, an electronic device 500 with one or more processors and memory generates (902) for presentation on a display (e.g., a remote display device or a display that is integrated into the electronic device) a user interface including: a first user interface object (904) (e.g., cover art for an album, poster for a movie, etc.) that is associated with a first region of the user interface that is adjacent to the first user interface object (e.g., below the first UI object in a first column), and a second user interface object (908) (e.g., cover art for an album, poster for a movie, etc.) that is associated with a second region of the user interface that is adjacent to the second user interface object and is different from the first region (e.g., below the second UI object in a second column, different from the first column). For example, FIGS. 8A and 8B illustrate a user interface object 802-3 associated with an adjacent region 806-2, and a user interface object 802-2 associated with an adjacent region 806-1.

While the first user interface object is selected (920), the electronic device causes (922) display, in the first region, of first information that is associated with the first user interface object (e.g., information describing content associated with the first UI object and menu items for performing actions with respect to the content) and detects (936) selection of the second user interface object. For example, FIG. 8A illustrates displaying information 808 in region 806-2 while the user interface object 802-3 is selected.

In response to detecting selection of the second user interface object while the first information is displayed in the first region (938), the electronic device causes (940) an end of display of the first information in the first region while maintaining display of the first user interface object, and causes (942) display, in the second region, of second information that is associated with the second user interface object (e.g., information describing content associated with the second UI object and menu items for performing actions with respect to the content). For example, in FIG. 8B, user interface object 802-2 is selected, information 810 associated with the selected user interface object 802-2 is displayed in the associated region 806-1, and the information 808 is no longer displayed in region 806-2.

In some embodiments, the electronic device receives (952) input scrolling the first and second user interface objects (e.g., a swipe, a tap, button press, etc.), and in response to the input scrolling the first and second user interface objects, optionally scrolls (954) the first region along with the first user interface object and optionally scrolls the second region along with the second user interface object. For example, FIGS. 8A-8D illustrate scrolling the regions 806-1, 806-2, and 806-3 along with the user interface objects 802-2, 802-3, and 802-5, respectively.

In some embodiments, the first information includes (924) one or more selectable items including a first menu item. While the first user interface object is selected, the electronic device optionally receives (930) a selection of the first selectable item (e.g., user input selecting the first menu item while the first menu item is highlighted). In response to the selection of the first menu item, the electronic device optionally presents (932) a first user interface response corresponding to the first selectable item (e.g., playing a content item associated with the first user interface object, displaying a user interface associated with the first menu item, etc.). For example, in FIG. 8E, menu item "Play Now" 828 is selectable to play a content item associated with the selected user interface object 802-2 (as illustrated in FIG. 8F).

In some embodiments, the second information includes (944) one or more menu items including a second selectable item. While the second user interface object is selected, the electronic device optionally receives (956) a selection of the second selectable item (e.g., user input selecting the second selectable item while the second selectable item is highlighted). In response to the selection of the second selectable item, the electronic device optionally presents (958) a second user interface response corresponding to the second selectable item (e.g., playing a content item associated with the second user interface object, displaying a user interface associated with the second selectable item, etc.). For example, in FIG. 8G, menu item "Move" 830 is selectable to move a content item associated with the selected user interface object 802-5 within the queue of content items (as illustrated in FIG. 8H).

In some embodiments, the one or more selectable items of the first information are different (946) from the one or more selectable items of the second information (in accordance with a determination that the first user interface object belongs to a different group (e.g., "History") than the second user interface object (e.g., "Now Playing" or "Up Next")). For example, in FIG. 8A, user interface object 802-3 is a currently playing content item, so the menu item "Pause" 818 is displayed when it is selected. In FIG. 8B, user interface object 802-2 is in a history of recently played content items, so the menu item "Add to Up Next" 822 is displayed when it is selected to allow the user to play the song again. In FIG. 8C, user interface object 802-5 is in a queue of upcoming content items, so the menu item "Move" 826 is displayed when it is selected to allow the user to move the position of the song within the queue. Simplifying the user interface by forgoing displaying user interface elements that the user is not directly interacting with enables the user to more easily focus on those user interface elements and use the device more quickly and efficiently, thereby improving user experience and reducing the amount of time (and therefore energy) spent using the device, which is particularly relevant for battery powered devices.

In some embodiments, the first user interface object corresponds (906) to a first content item, the second user interface object optionally corresponds (910) to a second content item, the first user interface response is optionally associated (934) with the first content item, and the second user interface response is optionally associated (960) with the second content item. For example, in FIG. 8E, menu item "Play Now" 828 is selectable to play a content item associated with the selected user interface object 802-2 (as illustrated in FIG. 8F), and in FIG. 8G, menu item "Move" 830 is selectable to move a content item associated with the selected user interface object 802-5 within the queue of content items (as illustrated in FIG. 8H).

In some embodiments, the one or more selectable items of the first information include (926) text describing actions to be performed with respect to the first content item (e.g., playing the content item, moving the content item in a queue, purchasing the content item, etc., such as text 828 in FIG. 8E), and the one or more selectable items of the second information optionally include (948) text describing actions to be performed with respect to the second content item (e.g., playing the content item, moving the content item in a queue, purchasing the content item, etc., such as text 830 in FIG. 8G).

In some embodiments, the first information further includes (928) text describing the first content item (e.g., song title, release date, purchase price, etc., such as text 816 in FIG. 8A), and the second information optionally further includes (950) text describing the second content item (e.g., song title, release date, purchase price, etc., such as text 820 in FIG. 8B).

In some embodiments, the electronic device receives (962) scrolling input (e.g., a swipe, a tap, button press, etc.). In response (964) to receiving the scrolling input: in accordance with a determination that the first user interface object is selected, the electronic device optionally scrolls (966) the first information while the second user interface object remains stationary; and in accordance with a determination that the second user interface object is selected, the electronic device optionally scrolls (968) the second information while the first user interface object remains stationary. For example, FIGS. 8I and 8J illustrate scrolling the information 812 associated with selected user interface object 802-5 while the user interface object 802-7 remains stationary. Similarly, FIGS. 8K and 8L illustrate scrolling the information 814 associated with selected user interface object 802-7 while the user interface object 802-5 remains stationary.

In some embodiments, generating the user interface includes aligning (914) the first and second user interface objects along a first axis, and positioning (916) the first region adjacent to the first user interface object along a second axis that is substantially perpendicular (e.g., the first and second axes are within ten degrees of perpendicular) to the first axis and positioning the second region adjacent to the second associated user interface object along the second axis. For example, in FIG. 8A, the user interface objects 802-2 and 802-3 are aligned along a horizontal axis, the region 806-1 is positioned adjacent to the user interface object 802-2 along a vertical axis that is substantially perpendicular to the horizontal axis, and the region 806-2 is positioned adjacent to the user interface object 802-3 along the vertical axis.

In some embodiments, the first and second user interface objects are (918) both images having identical spatial dimensions (e.g., the first and second user interface objects have the same height and width, but are different images, such as different album covers). For example, in FIG. 8A, the user interface objects 802-2 and 802-3 are both album covers having the same height and width.

In some embodiments, the user interface includes (912) a third user interface object (e.g., cover art for an album, poster for a movie, etc.) that is associated with a third region of the user interface that is adjacent to the third user interface object and is different from the first region and the second region (e.g., below the third UI object in a third column, different from the first column and the second column). For example, the user interface object 802-5 is associated with the adjacent region 806-3 that is different from regions 806-1 and 806-2. The electronic device, while the second user interface object is selected and the second information that is associated with the second user interface object is displayed in the second region, optionally detects (970) selection of the third user interface object. In response to detecting selection of the third user interface object while the second information is displayed in the second region (972), the electronic device optionally causes (974) an end of display of the second information in the second region while maintaining display of the second user interface object and optionally causes (976) display, in the third region, of third information that is associated with the third user interface object (e.g., information describing content associated with the third UI object and menu items for performing actions with respect to the content). For example, in FIG. 8C, user interface object 802-5 is selected, information 812 associated with the selected user interface object 802-5 is displayed in the associated region 806-3, the information 810 is no longer displayed in region 806-1, and the information 808 is no longer displayed in region 806-2. In some embodiments, a plurality of additional user interface objects with corresponding regions are displayed in the user interface and share some of the characteristics of the first, second, and third user interface objects described above. In some embodiments, information corresponding to a selected one of the user interface objects is displayed in the region corresponding to the selected user interface object and information corresponding to non-selected user interface objects is not displayed, so as to enable the user to focus on the currently selected user interface object and the options available for interacting with the currently selected user interface object.

The operations in the information processing methods described above are, optionally, implemented by running one or more functional modules in an information processing apparatus such as general purpose processors (e.g., as described above with respect to FIGS. 1A and 3) or application specific chips.

The operations described above with reference to FIGS. 9A-9E are, optionally, implemented by components depicted in FIGS. 1A-1B. For example, generating operation 902, causing operation 922, detecting operation 936, causing operation 940, and causing operation 942 are, optionally implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

It should be understood that the particular order in which the operations in FIGS. 9A-9E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 900 described above with respect to FIGS. 9A-9E. For example, the user interfaces, user interface objects, queue, history, headings, regions, album art, content items, information, menu items, and electronic devices described above with reference to method 900 optionally have one or more of the characteristics of the user interfaces, user interface objects, queue, history, headings, regions, album art, content items, information, menu items, and electronic devices described herein with reference to other methods described herein (e.g., method 700). For brevity, these details are not repeated here.

Figure 10:
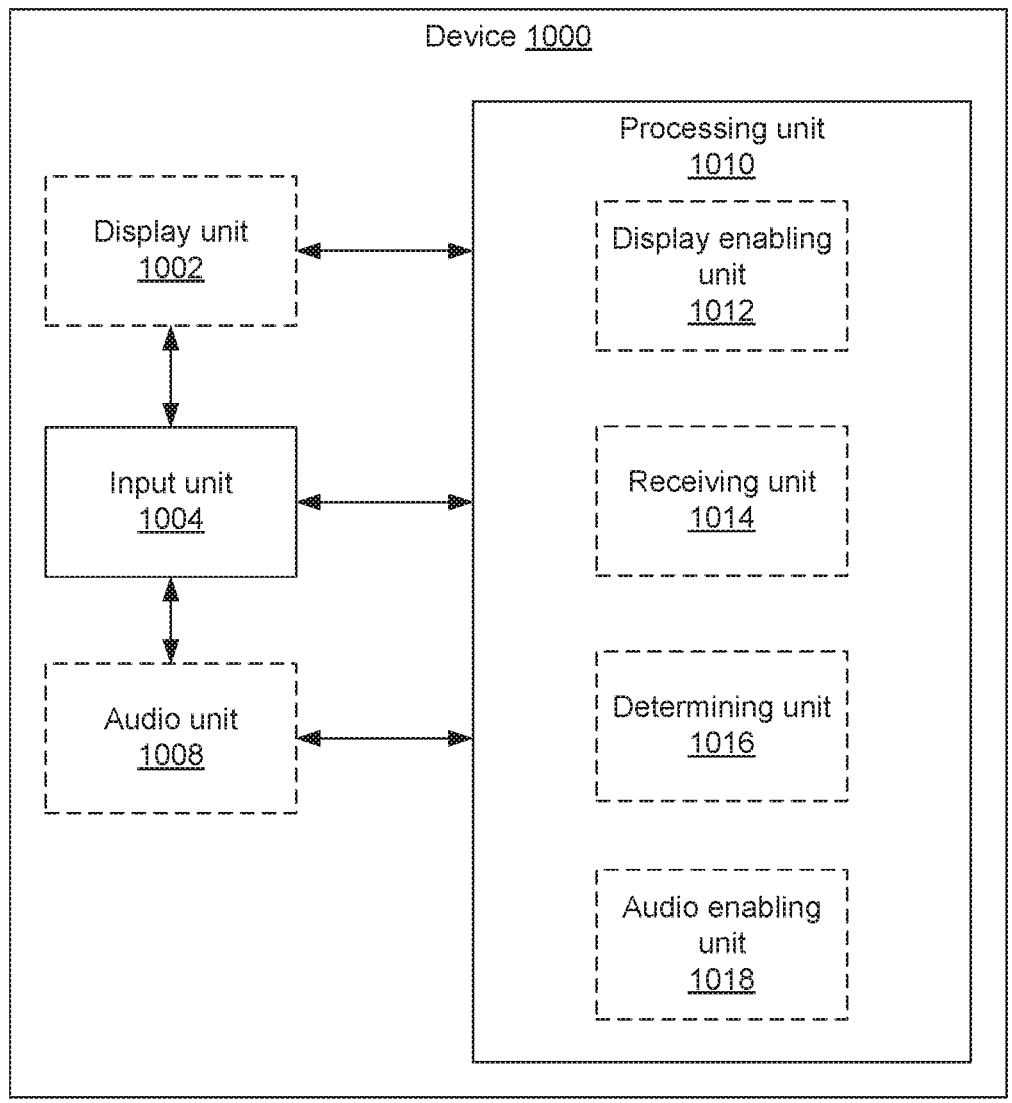
FIGS. 10-11 show functional block diagrams of electronic devices configured in accordance with the principles of the various described embodiments, in accordance with some embodiments of the disclosure.

In accordance with some embodiments, FIG. 10 shows a functional block diagram of an electronic device 1000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, an electronic device 1000 optionally includes a display unit 1002 configured to display a user interface including one or more user interface objects (e.g., content items, headings, etc.); an input unit 1004 to receive user input, selections, etc. (e.g., touch-sensitive surface, keyboard, mouse, or other input unit); an audio unit 1008 to playback audio and/or send audio to another device for audio playback; and a processing unit 1010 coupled to the display unit 1002 and the input unit 1004. In some embodiments, the processing unit 1010 optionally includes a display enabling unit 1012, a receiving unit 1014, a determining unit 1016, and an audio enabling unit 1018.

In some embodiments, the processing unit 1010 is configured to generate (e.g., with the display enabling unit 1012) for presentation on a display a user interface including a plurality of content items, a first heading, and a second heading. While the user interface is presented on the display, the processing unit 1010 is configured to receive (e.g., with the receiving unit 1014) input scrolling the plurality of content items. In response to the input, the processing unit 1010 is configured to scroll (e.g., with the display enabling unit 1012) the plurality of content items including: scrolling (e.g., with the display enabling unit 1012) the first heading with a first content item of the plurality of content items that is currently playing; and scrolling (e.g., with the display enabling unit 1012) the second heading with a second content item of the plurality of content items that is next in a queue of content items.

In some embodiments, scrolling the plurality of content items further includes: scrolling (e.g., with the display enabling unit 1012) the first heading and the first content item offscreen; and while the second heading is presented stationary on the display: scrolling (e.g., with the display enabling unit 1012) the second content item offscreen; and scrolling (e.g., with the display enabling unit 1012) onscreen a plurality of additional content items that are upcoming in the queue of content items.

In some embodiments, the processing unit 1010 is further configured to, while the user interface is presented on the display and the first content item is offscreen, receive (e.g., with the receiving unit 1014) a swipe gesture having a first characteristic. In accordance with a determination that the first characteristic of the swipe gesture exceeds a predetermined threshold, the processing unit 1010 is further configured to scroll (e.g., with the display enabling unit 1012) the plurality of content items such that the first content item is presented on the display, and in accordance with a determination that the first characteristic of the swipe gesture does not exceed a predetermined threshold, the processing unit 1010 is further configured to scroll (e.g., with the display enabling unit 1012) through the plurality of content items by an amount that is based on the first characteristic.

In some embodiments, the processing unit 1010 is further configured to, while the user interface is presented on the display and the first content item is offscreen, determine (e.g., with the determining unit 1016) a time period in which no input is received. In accordance with a determination that the time period exceeds a predetermined threshold, the processing unit 1010 is further configured to scroll (e.g., with the display enabling unit 1012) the plurality of content items such that the first content item is presented on the display.

In some embodiments, the user interface further includes a third heading that is displayed (e.g., with the display enabling unit 1012) concurrently with the first heading and the second heading before receiving the input, and scrolling the plurality of content items further includes: scrolling (e.g., with the display enabling unit 1012) the third heading with a third content item of the plurality of content items that is most recently played in a history of content items; scrolling (e.g., with the display enabling unit 1012) the first heading and the first content item offscreen; and while the third heading is presented stationary on the display: scrolling (e.g., with the display enabling unit 1012) the third content item offscreen; and scrolling (e.g., with the display enabling unit 1012) onscreen a plurality of additional content items in the history of content items.

In some embodiments, the processing unit 1010 is further configured to, while the user interface is presented on the display, receive (e.g., with the receiving unit 1014) input selecting a respective content item of the plurality of content items. In response to the input selecting the respective content item, the processing unit 1010 is further configured to play (e.g., with the audio enabling unit 1018) the respective content item and zoom in (e.g., with the display enabling unit 1012) on an image associated with the respective content item.

In some embodiments, the processing unit 1010 is further configured to, while the user interface is presented on the display, receive (e.g., with the receiving unit 1014) input requesting to move a respective content item of the queue of content items. In response to the input requesting to move the respective content item, the processing unit 1010 is further configured to update (e.g., with the display enabling unit 1012) the user interface by presenting the plurality of content items smaller in the updated user interface. While the updated user interface is presented on the display, the processing unit 1010 is further configured to move (e.g., with the display enabling unit 1012) the respective content item in the queue of content items in response to input.

In some embodiments, the processing unit 1010 is further configured to, while the user interface is presented on the display, receive (e.g., with the receiving unit 1014) a request to present an additional user interface associated with the currently playing first content item. In response to the request, the processing unit 1010 is further configured to generate (e.g., with the display enabling unit 1012) for presentation on the display the additional user interface including a first image associated with the first content item. In some embodiments, the first content item and the second content item are both associated with a same album, and the first image is associated with the same album. In some embodiments, the first content item is associated with a first album, the second content item is associated with a second album, and the additional user interface further includes a second image associated with the second content item. In some embodiments, the plurality of content items further includes a third content item that is most recently played in a history of content items played from streaming radio, and the additional user interface further includes a third image associated with the third content item. In some embodiments, the user interface further includes a background image based on album art associated with the currently playing first content item.

In some embodiments, the processing unit 1010 is further configured to advance (e.g., with the audio enabling unit 1018) playback such that the second content item is currently playing and the first content item is no longer currently playing. While the first and second headings are presented stationary on the display, the processing unit 1010 is further configured to scroll (e.g., with the display enabling unit 1012) the first and second content items such that the currently playing second content item is under the first heading.

In some embodiments, in accordance with a determination that the plurality of content items are on-demand content items, the user interface is an on-demand user interface; and in accordance with a determination that the plurality of content items are streaming content items, the user interface is a streaming user interface, different from the on-demand user interface. In some embodiments, presenting the on-demand user interface on the display includes presenting (e.g., with the display enabling unit 1012) a first quantity of the content items in the queue of content items, and presenting the streaming user interface on the display includes presenting (e.g., with the display enabling unit 1012) a second quantity of the content items in the queue of content items, the second quantity being less than the first quantity. In some embodiments, presenting the on-demand user interface on the display includes presenting (e.g., with the display enabling unit 1012) only a single content item in a history of content items, and presenting the streaming user interface on the display includes presenting (e.g., with the display enabling unit 1012) a plurality of content items in the history of content items.

Figure 11:
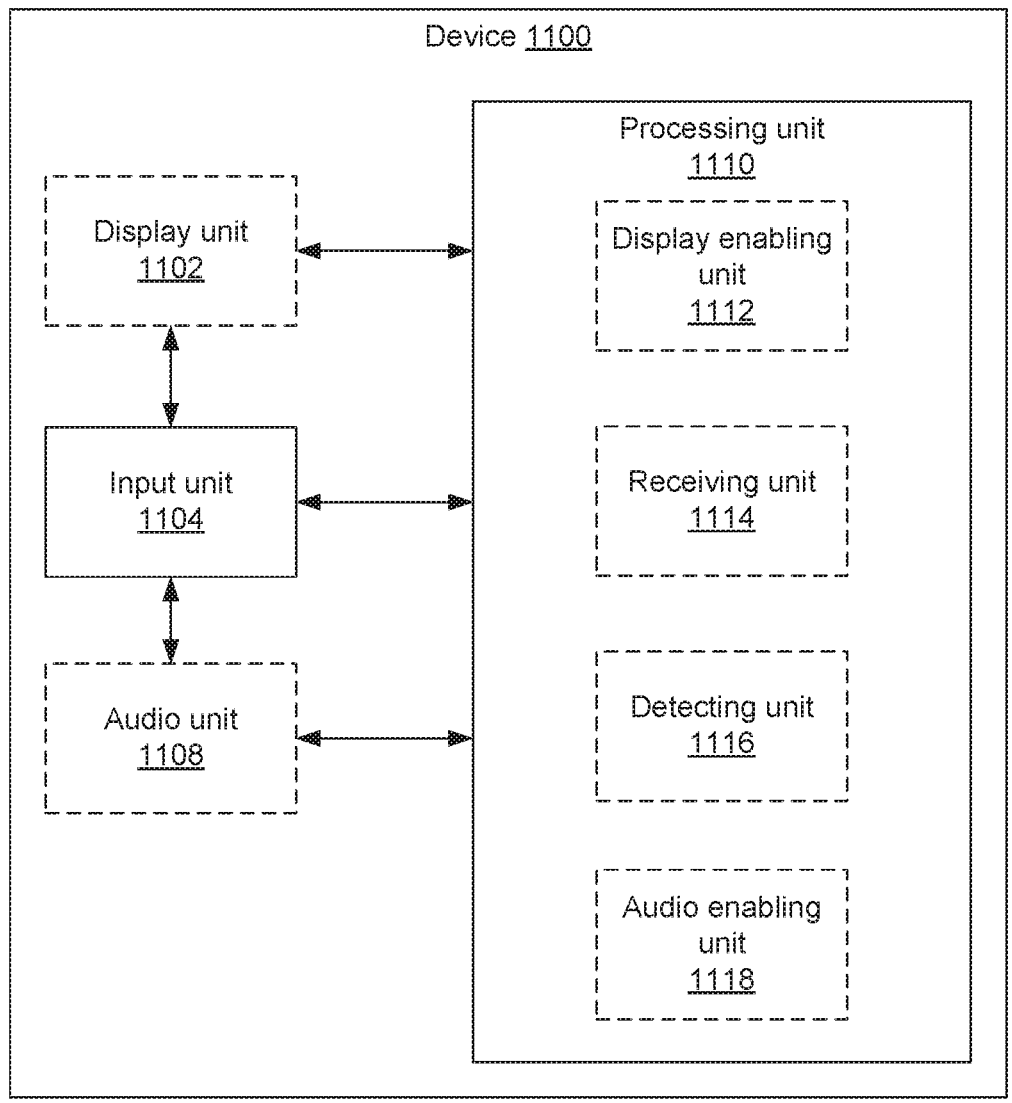

In accordance with some embodiments, FIG. 11 shows a functional block diagram of an electronic device 1100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 11 are, optionally, combined or separated into sub-blocks to implement the principles of the various described embodiments. Therefore, the description herein optionally supports any possible combination or separation or further definition of the functional blocks described herein.

As shown in FIG. 11, an electronic device 1100 optionally includes a display unit 1102 configured to display a user interface including one or more user interface objects (e.g., content items, headings, etc.); an input unit 1104 to receive user input, selections, etc. (e.g., touch-sensitive surface, keyboard, mouse, or other input unit); an audio unit 1108 to playback audio and/or send audio to another device for audio playback; and a processing unit 1110 coupled to the display unit 1102 and the input unit 1104. In some embodiments, the processing unit 1110 optionally includes a display enabling unit 1112, a receiving unit 1114, a detecting unit 1116, and an audio enabling unit 1118.

In some embodiments, the processing unit 1110 is configured to generate (e.g., with the display enabling unit 1112) for presentation on a display a user interface including: a first user interface object that is associated with a first region of the user interface that is adjacent to the first user interface object; and a second user interface object that is associated with a second region of the user interface that is adjacent to the second user interface object and is different from the first region. While the first user interface object is selected, the processing unit 1110 is configured to cause display (e.g., with the display enabling unit 1112), in the first region, of first information that is associated with the first user interface object, and detect selection (e.g., with the detecting unit 1116) of the second user interface object. In response to detecting selection of the second user interface object while the first information is displayed in the first region, the processing unit 1110 is configured to cause an end of display (e.g., with the display enabling unit 1112) of the first information in the first region while maintaining display of the first user interface object, and cause display (e.g., with the display enabling unit 1112), in the second region, of second information that is associated with the second user interface object.

In some embodiments, the processing unit 1110 is further configured to receive input (e.g., with the receiving unit 1114) scrolling the first and second user interface objects, and, in response to the input scrolling the first and second user interface objects, scroll (e.g., with the display enabling unit 1112) the first region along with the first user interface object and scroll (e.g., with the display enabling unit 1112) the second region along with the second user interface object.

In some embodiments, the first information includes one or more selectable items including a first menu item. The processing unit 1110 is further configured to, while the first user interface object is selected, receive a selection (e.g., with the receiving unit 1114) of the first selectable item, and, in response to the selection of the first menu item, present (e.g., with the display enabling unit 1112) a first user interface response corresponding to the first selectable item.

In some embodiments, the second information includes one or more menu items including a second selectable item. The processing unit 1110 is further configured to, while the second user interface object is selected, receive a selection (e.g., with the receiving unit 1114) of the second selectable item, and, in response to the selection of the second selectable item, present (e.g., with the display enabling unit 1112) a second user interface response corresponding to the second selectable item.

In some embodiments, the one or more selectable items of the first information are different from the one or more selectable items of the second information. In some embodiments, the first user interface object corresponds to a first content item, the second user interface object corresponds to a second content item, the first user interface response is associated with the first content item, and the second user interface response is associated with the second content item. In some embodiments, the one or more selectable items of the first information include text describing actions to be performed with respect to the first content item, and the one or more selectable items of the second information include text describing actions to be performed with respect to the second content item. In some embodiments, the first information further includes text describing the first content item, and the second information further includes text describing the second content item.

In some embodiments, the processing unit 1110 is further configured to receive scrolling input (e.g., with the receiving unit 1114). In response to receiving the scrolling input, the processing unit 1110 is further configured to, in accordance with a determination that the first user interface object is selected, scroll (e.g., with the display enabling unit 1112) the first information while the second user interface object remains stationary, and in accordance with a determination that the second user interface object is selected, scroll (e.g., with the display enabling unit 1112) the second information while the first user interface object remains stationary.

In some embodiments, the processing unit 1110 is further configured to align (e.g., with the display enabling unit 1112) the first and second user interface objects along a first axis, and position (e.g., with the display enabling unit 1112) the first region adjacent to the first user interface object along a second axis that is substantially perpendicular to the first axis and position (e.g., with the display enabling unit 1112) the second region adjacent to the second associated user interface object along the second axis. In some embodiments, the first and second user interface objects are both images having identical spatial dimensions.

In some embodiments, the user interface includes a third user interface object that is associated with a third region of the user interface that is adjacent to the third user interface object and is different from the first region and the second region. The processing unit 1110 is further configured to, while the second user interface object is selected and the second information that is associated with the second user interface object is displayed in the second region, detect selection (e.g., with the detecting unit 1116) of the third user interface object. In response to detecting selection of the third user interface object while the second information is displayed in the second region, the processing unit 1110 is further configured to cause an end of display (e.g., with the display enabling unit 1112) of the second information in the second region while maintaining display of the second user interface object, and cause display (e.g., with the display enabling unit 1112), in the third region, of third information that is associated with the third user interface object.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at an electronic device in communication with a display device and one or more input devices:
while a first content item is playing on the electronic device, displaying, via the display device, a first portion of a plurality of representations of content items available for playing on the electronic device, wherein the first portion does not include a representation of the first content item, a second portion of the plurality of representations of content items includes the representation of the first content item, the second portion is not currently displayed via the display device, and a first respective representation of the first portion of the plurality of representations is currently selected;
while displaying the first portion of the plurality of representations of content items available for playing on the electronic device, determining that a time period during which no input is received has exceeded a time threshold; and
in response to determining that the time period during which no input is received has exceeded the time threshold, scrolling the plurality of representations of content items to reveal, via the display device, the second portion of the plurality of representations of content items that includes the representation of the first content item.

2. The method of claim 1, further comprising:

before determining that the time period during which no input is received has exceeded the time threshold:

while the first content item is playing on the electronic device and while displaying, via the display device, the second portion of the plurality of representations of content items, wherein a second respective representation of the second portion of the plurality of representations is currently selected, receiving, via the one or more input devices, an input; and in response to receiving the input:

in accordance with a determination that the input corresponds to a request to move the current selection from the second respective representation to the first respective representation of a content item available for playing on the electronic device, wherein the first respective representation is included in the first portion of the plurality of representations, moving the current selection from the second respective representation to the first respective representation, including:

ceasing display of at least a portion of the second portion of the plurality of representations; and revealing, via the display device, at least a portion of the first portion of the plurality of representations that includes the first respective representation.

3. The method of claim 2, wherein the at least the portion of the second portion of the plurality of representations includes the representation of the first content item.

4. The method of claim 2, wherein the second respective representation is the representation of the first content item.

5. The method of claim 1, wherein scrolling the plurality of representations of content items to reveal, via the display device, the second portion of the plurality of representations of content items includes ceasing display of the first portion of the plurality of representations of content items.

6. The method of claim 1, wherein the plurality of representations of content items are selectable to initiate playback of corresponding content items.

7. A non-transitory computer-readable storage medium including instructions, which when executed by one or more processors of an electronic device in communication with a display device and one or more input devices, cause the electronic device to perform a method comprising:

while a first content item is playing on the electronic device, displaying, via the display device, a first portion of a plurality of representations of content items available for playing on the electronic device, wherein the first portion does not include a representation of the first content item, a second portion of the plurality of representations of content items includes the representation of the first content item, the second portion is not currently displayed via the display device, and a first respective representation of the first portion of the plurality of representations is currently selected;

while displaying the first portion of the plurality of representations of content items available for playing on the electronic device, determining that a time period during which no input is received has exceeded a time threshold; and in response to determining that the time period during which no input is received has exceeded the time threshold, scrolling the plurality of representations of content items to reveal, via the display device, the second portion of the plurality of representations of content items that includes the representation of the first content item.

8. The non-transitory computer-readable storage medium of claim 7, the method further comprising:

before determining that the time period during which no input is received has exceeded the time threshold:

while the first content item is playing on the electronic device and while displaying, via the display device, the second portion of the plurality of representations of content items, wherein a second respective representation of the second portion of the plurality of representations is currently selected, receiving, via the one or more input devices, an input; and in response to receiving the input:

in accordance with a determination that the input corresponds to a request to move the current selection from the second respective representation to the first respective representation of a content item available for playing on the electronic device, wherein the first respective representation is included in the first portion of the plurality of representations, moving the current selection from the second respective representation to the first respective representation, including:

ceasing display of at least a portion of the second portion of the plurality of representations; and revealing, via the display device, at least a portion of the first portion of the plurality of representations that includes the first respective representation.

9. The non-transitory computer-readable storage medium of claim 8, wherein the at least the portion of the second portion of the plurality of representations includes the representation of the first content item.

10. The non-transitory computer-readable storage medium of claim 8, wherein the second respective representation is the representation of the first content item.

11. The non-transitory computer-readable storage medium of claim 7, wherein scrolling the plurality of representations of content items to reveal, via the display device, the second portion of the plurality of representations of content items includes ceasing display of the first portion of the plurality of representations of content items.

12. The non-transitory computer-readable storage medium of claim 7, wherein the plurality of representations of content items are selectable to initiate playback of corresponding content items.

13. An electronic device comprising:

one or more processors; and memory storing instructions, which when executed by the one or more processors, cause the electronic device to perform a method comprising:

while a first content item is playing on the electronic device, displaying, via a display device, a first portion of a plurality of representations of content items available for playing on the electronic device, wherein the first portion does not include a representation of the first content item, a second portion of the plurality of representations of content items includes the representation of the first content item, the second portion is not currently displayed via the display device, and a first respective representation of the first portion of the plurality of representations is currently selected;

while displaying the first portion of the plurality of representations of content items available for playing on the electronic device, determining that a time period during which no input is received has exceeded a time threshold; and in response to determining that the time period during which no input is received has exceeded the time threshold, scrolling the plurality of representations of content items to reveal, via the display device, the second portion of the plurality of representations of content items that includes the representation of the first content item.

14. The electronic device of claim 8, the method further comprising:

before determining that the time period during which no input is received has exceeded the time threshold:

while the first content item is playing on the electronic device and while displaying, via the display device, the second portion of the plurality of representations of content items, wherein a second respective representation of the second portion of the plurality of representations is currently selected, receiving, via one or more input devices, an input; and in response to receiving the input:

in accordance with a determination that the input corresponds to a request to move the current selection from the second respective representation to the first respective representation of a content item available for playing on the electronic device, wherein the first respective representation is included in the first portion of the plurality of representations, moving the current selection from the second respective representation to the first respective representation, including:

ceasing display of at least a portion of the second portion of the plurality of representations; and revealing, via the display device, at least a portion of the first portion of the plurality of representations that includes the first respective representation.

15. The electronic device of claim 14, wherein the at least the portion of the second portion of the plurality of representations includes the representation of the first content item.

16. The electronic device of claim 14, wherein the second respective representation is the representation of the first content item.

17. The electronic device of claim 13, wherein scrolling the plurality of representations of content items to reveal, via the display device, the second portion of the plurality of representations of content items includes ceasing display of the first portion of the plurality of representations of content items.

18. The electronic device of claim 13, wherein the plurality of representations of content items are selectable to initiate playback of corresponding content items.

* * * * *

UNITED STATES PATENT AND TRADEMARK OFFICE
CERTIFICATE OF CORRECTION

| | |
|---|---|
| PATENT NO. | : 11,294,539 B2 |
| APPLICATION NO. | : 17/013281 |
| DATED | : April 5, 2022 |
| INVENTOR(S) | : Taylor G. Carrigan et al. |

It is certified that error appears in the above-identified patent and that said Letters Patent is hereby corrected as shown below:

In the Claims

In Column 43, Line 11, in Claim 14, delete "claim 8," and insert --claim 13,--.

Signed and Sealed this
Seventeenth Day of May, 2022

*Katherine Kelly Vidal*

Katherine Kelly Vidal
*Director of the United States Patent and Trademark Office*